US011805157B2

(12) United States Patent
Gronau et al.

(10) Patent No.: US 11,805,157 B2
(45) Date of Patent: Oct. 31, 2023

(54) SHARING CONTENT DURING A VIRTUAL 3D VIDEO CONFERENCE

(71) Applicant: TRUE MEETING INC., Los Altos, CA (US)

(72) Inventors: Yuval Gronau, Ramat Hasharon (IL); Ran Oz, Maccabim (IL); Nery Strasman, Los Altos, CA (US)

(73) Assignee: TRUE MEETING INC., Los Altos, CA (US)

( * ) Notice: Subject to any disclaimer, the term of this patent is extended or adjusted under 35 U.S.C. 154(b) by 0 days.

(21) Appl. No.: 17/304,378

(22) Filed: Jun. 20, 2021

(65) Prior Publication Data

US 2021/0392175 A1 Dec. 16, 2021

Related U.S. Application Data

(63) Continuation-in-part of application No. 17/249,468, filed on Mar. 2, 2021.

(Continued)

(51) Int. Cl.
*H04L 65/401* (2022.01)
*H04L 65/403* (2022.01)
(Continued)

(52) U.S. Cl.
CPC .......... *H04L 65/4015* (2013.01); *G06F 3/013* (2013.01); *G06N 3/04* (2013.01); *G06N 3/045* (2023.01); *G06T 7/11* (2017.01); *G06T 7/70* (2017.01); *G06T 15/04* (2013.01); *G06T 15/20* (2013.01); *G06T 15/205* (2013.01); *G06T 17/20* (2013.01); *G06T 19/00* (2013.01); *G06T 19/20* (2013.01); *H04L 12/1818* (2013.01);
(Continued)

(58) Field of Classification Search
CPC ............ H04L 65/4015; H04L 12/1818; H04L 63/101; H04L 63/108; H04L 65/403; H04L 12/1822; H04L 63/102; H04N 7/157; H04N 7/147
See application file for complete search history.

(56) References Cited

U.S. PATENT DOCUMENTS 6,549,200 B1   4/2003   Mortlock
9,424,678 B1   8/2016   Enakiev
(Continued)

OTHER PUBLICATIONS

Zhang M, Haung L, Zhu M. Occluded face restoration based on Generative Adversarial Networks. In2020 3rd International Confrence on Advanced Electronic Materials, Computers and Software Engineering (AEMCSE) Apr. 24, 2020 (pp. 315-319. IEEE.
(Continued)

*Primary Examiner* — Phung-Hoang J Nguyen
(74) *Attorney, Agent, or Firm* — Reches Patents

(57) ABSTRACT

A method for sharing content during a virtual 3D video conference, the method may include inviting multiple participants to join a virtual 3D video conference; creating a shared folder dedicated for storing shared content items, wherein the shared content is accessible during at least during the virtual 3D video conference; enabling access, to the multiple participants, to the shared folder; wherein the access is governed by one or more access control rule; and conducting the virtual 3D video conference; wherein the conducting comprises sharing at least one of the content items.

24 Claims, 37 Drawing Sheets

Related U.S. Application Data

(60) Provisional application No. 63/201,713, filed on May 10, 2021, provisional application No. 63/199,014, filed on Dec. 1, 2020, provisional application No. 63/081,860, filed on Sep. 22, 2020, provisional application No. 63/023,836, filed on May 12, 2020.

(51) Int. Cl.

| | | |
|---|---|---|
| *H04N 7/15* | (2006.01) | |
| *H04L 9/40* | (2022.01) | |
| *H04L 12/18* | (2006.01) | |
| *G06T 7/11* | (2017.01) | |
| *G06T 7/70* | (2017.01) | |
| *G06F 3/01* | (2006.01) | |
| *G06N 3/04* | (2023.01) | |
| *G06T 15/04* | (2011.01) | |
| *G06T 15/20* | (2011.01) | |
| *G06T 17/20* | (2006.01) | |
| *G06T 19/00* | (2011.01) | |
| *G06T 19/20* | (2011.01) | |
| *H04N 7/14* | (2006.01) | |
| *G06N 3/045* | (2023.01) | |

(52) U.S. Cl.
CPC .......... *H04L 63/101* (2013.01); *H04L 63/108* (2013.01); *H04L 65/403* (2013.01); *H04N 7/144* (2013.01); *H04N 7/147* (2013.01); *H04N 7/152* (2013.01); *H04N 7/157* (2013.01); *G06T 2200/08* (2013.01); *G06T 2207/30201* (2013.01); *G06T 2219/2004* (2013.01)

(56) References Cited

U.S. PATENT DOCUMENTS

| | | | |
|---|---|---|---|
| 10,652,565 | B1 | 5/2020 | Zhang |
| 10,841,537 | B2 | 11/2020 | Valli |
| 11,070,768 | B1 | 7/2021 | Krol |
| 11,076,128 | B1 | 7/2021 | Krol |
| 11,095,857 | B1 | 8/2021 | Krol |
| 2003/0068098 | A1 | 4/2003 | Rondinelli |
| 2004/0104935 | A1 | 6/2004 | Williamson |
| 2005/0179695 | A1 | 8/2005 | Saito |
| 2006/0066717 | A1 | 3/2006 | Miceli |
| 2007/0237119 | A1* | 10/2007 | Boch ................ H04W 28/0247 370/335 |
| 2010/0253495 | A1 | 10/2010 | Asano |
| 2011/0246658 | A1* | 10/2011 | Dettori ................ H04L 67/1008 709/233 |
| 2011/0296324 | A1 | 12/2011 | Goossens |
| 2012/0063573 | A1* | 3/2012 | Sylvain ............... H04L 65/4038 379/67.1 |
| 2014/0023340 | A1* | 1/2014 | Civiletto .......... H04N 21/47202 386/E5.009 |
| 2014/0160239 | A1 | 6/2014 | Tian |
| 2014/0204084 | A1 | 7/2014 | Corazza |
| 2014/0267567 | A1* | 9/2014 | Mihara ............... H04L 65/4023 348/14.08 |
| 2015/0215351 | A1 | 7/2015 | Avaya |
| 2015/0381939 | A1 | 12/2015 | Cunico |
| 2016/0234475 | A1 | 8/2016 | Courchesne et al. |
| 2016/0285795 | A1* | 9/2016 | Beausoleil ............ G06F 16/178 |
| 2016/0316170 | A1 | 10/2016 | Smith |
| 2016/0352721 | A1* | 12/2016 | Ota ...................... H04L 67/1097 |
| 2017/0243387 | A1 | 8/2017 | Li |
| 2017/0339372 | A1 | 11/2017 | Valli |
| 2018/0027307 | A1 | 1/2018 | Ni |
| 2018/0035079 | A1 | 2/2018 | Hui |
| 2018/0144535 | A1 | 5/2018 | Ford |
| 2018/0302610 | A1 | 10/2018 | Masuda |
| 2018/0321738 | A1 | 11/2018 | Jassal |
| 2018/0341374 | A1* | 11/2018 | Faulkner ............. H04L 65/4015 |
| 2019/0025587 | A1 | 1/2019 | Osterhout et al. |
| 2019/0124316 | A1 | 4/2019 | Yoshimura |
| 2019/0130629 | A1 | 5/2019 | Chand |
| 2019/0188895 | A1 | 6/2019 | Miller, IV et al. |
| 2019/0219700 | A1 | 7/2019 | Coombe |
| 2019/0253667 | A1 | 8/2019 | Valli |
| 2019/0384404 | A1 | 12/2019 | Raghoebardajal |
| 2020/0051304 | A1 | 2/2020 | Choi |
| 2020/0184721 | A1 | 6/2020 | Ge |
| 2020/0201512 | A1* | 6/2020 | Faulkner ............. H04L 12/1827 |
| 2020/0273247 | A1 | 8/2020 | Lim |
| 2021/0035307 | A1 | 2/2021 | Shih |
| 2021/0052138 | A1 | 2/2021 | Bevis |
| 2021/0104063 | A1 | 4/2021 | Kassis |
| 2021/0149189 | A1 | 5/2021 | Hux |

OTHER PUBLICATIONS

Roberts, David, et al. "Communicating eye-gaze across a distance: Comparing an eye-gaze enabled immersive collaborative virtual environment, aligned video conferencing, and being together." 2009 IEEE Virtual Reality Conference. IEEE, 2009.
Arrington Research, "ViewPoint EyeTracker", published 2010.

* cited by examiner

Receiving direction of gaze information regarding a direction of gaze of each participant within a representation of a virtual 3D video conference environment that may be associated with the participant. 210

Determining, for each participant, updated 3D participant representation information within the virtual 3D video conference environment, that reflects the direction of gaze of the participant. 220

Generating, for at least one participant, an updated representation of virtual 3D video conference environment, the updated representation of virtual 3D video conference environment represents the updated 3D participant representation information for at least some of the multiple participants. 230

Displaying, by a device of a participant of the multiple participants, an updated representation of the virtual 3D video conference environment, the updated representation may be associated with the participant. 240

Transmitting the updated representation of virtual 3D video conference environment to at least one device of at least one participant. 250

One or more additional steps. 290

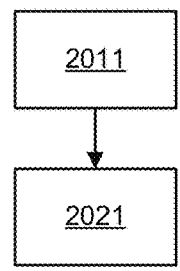
2001
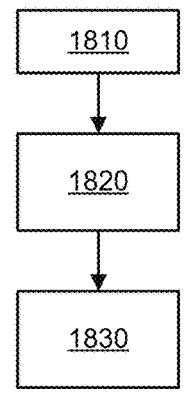
1800
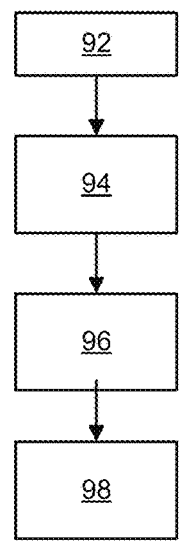
90
FIG. 6

2.5 D Illusion
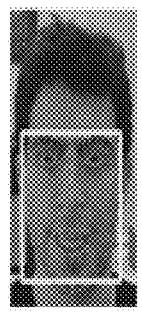
Track viewer's eyes and change opposite person's view based on viewer's location
35
View when head moves left
View when head at center
View when head moves right
31
32
33
FIG. 9

3D View for 3D Screen or VR Headset
38
39
FIG. 10

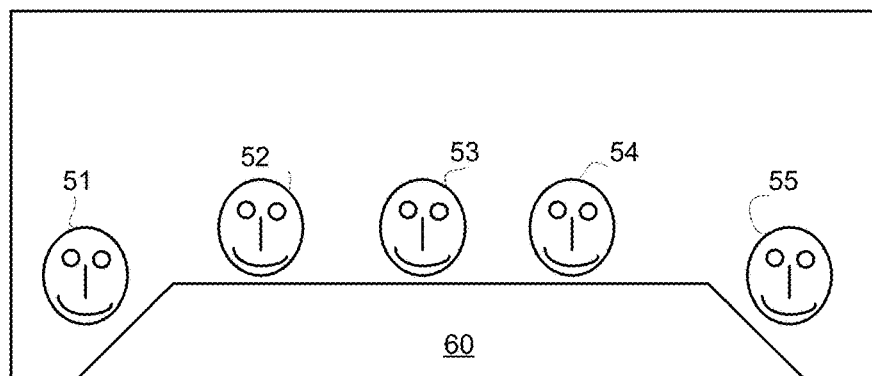
PANORAMIC VIEW 41
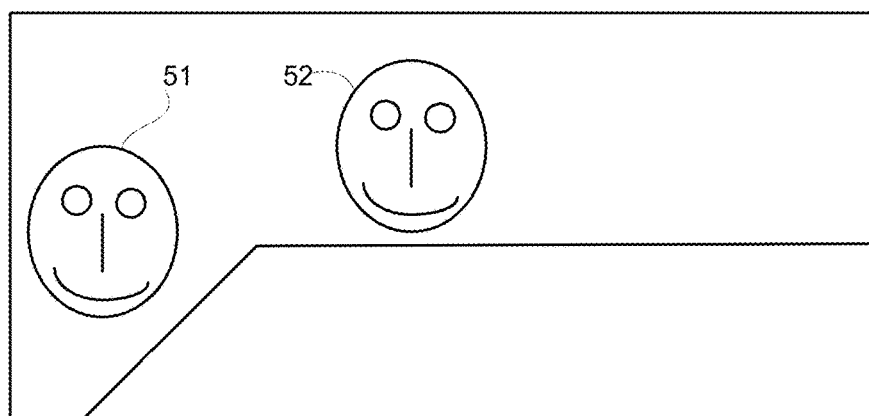
PARTIAL VIEW 42
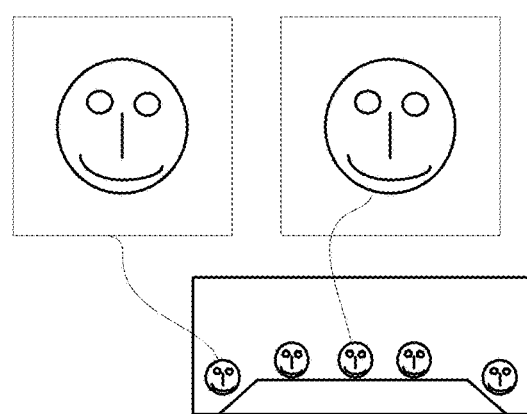
Hybrid view 43
FIG. 11

121   122   123   124   125   126

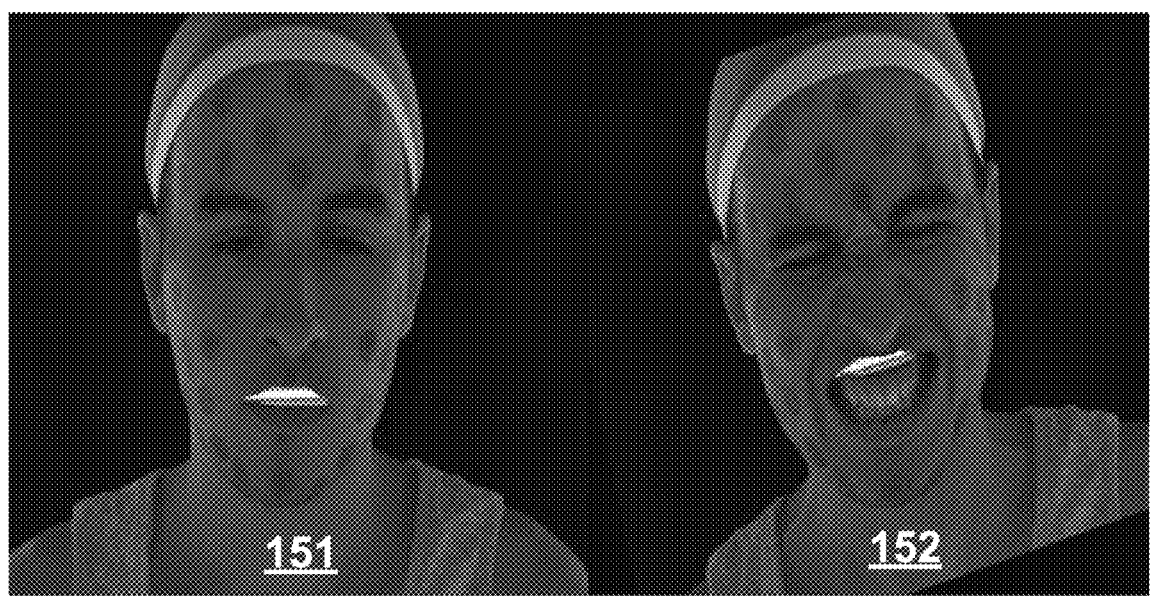
FIG. 16

2222

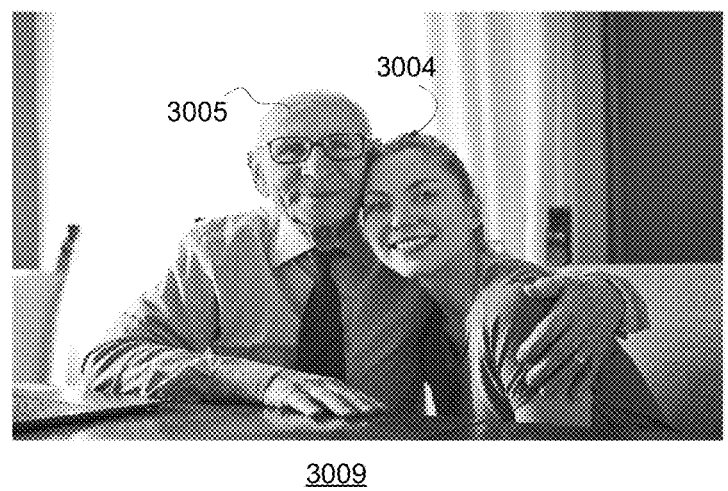
3009
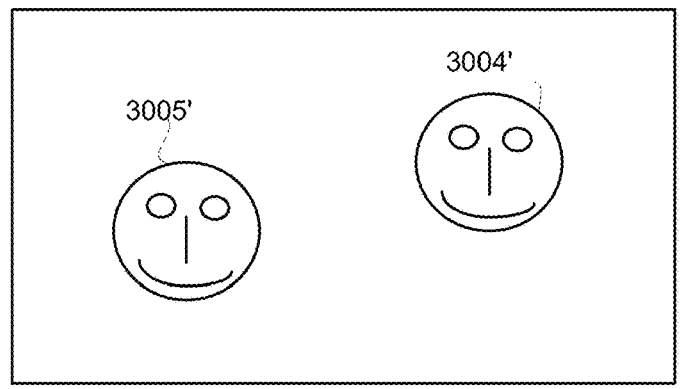
3009'
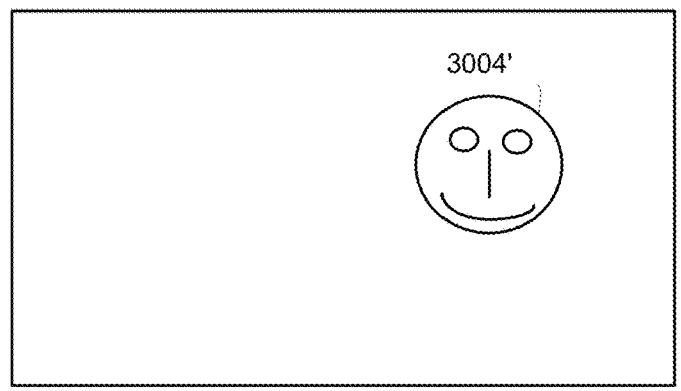
3009"
FIG. 22

3700

SHARING CONTENT DURING A VIRTUAL 3D VIDEO CONFERENCE

CROSS REFERENCE

This application claims priority from U.S. provisional patent Ser. No. 63/201,713 filing date May 10, 2021.

This application is a continuation in part of U.S. patent application Ser. No. 17/249,468 filing date Mar. 2, 2021 which claims priority from (a) U.S. provisional patent application Ser. No. 63/023,836 filing date May 12, 2020, (b) U.S. provisional patent application Ser. No. 63/081,860 filing date Sep. 22, 2020, (c) U.S. provisional patent application Ser. No. 63/199,014 filing date Dec. 1, 2020. All patent applications are being incorporated herein by reference.

BACKGROUND

Video conference calls are very popular. They require that each participant has their own computerized system with a camera that is usually located close to a display.

Typically, several participants in a meeting are presented in separate small tiles and another tile may be used for sharing one of the participants' screen.

Each participant is typically shown with the background of their own office or with a virtual background of their selection.

Participants are displayed from different angles and in different sizes.

As a result, people may feel disconnected and not as if they were all present in the same room.

As the user typically looks at the screen where the faces of the opposite person are displayed and not at the camera which may be above or below the screen, for example, the appearing image is of a person that is looking downwards or upwards respectively and not towards the other person. Hence, eye contact between the participants of the conversation is lost. This enhances the feeling of not being connected.

Furthermore, as on each participant's screen the other users' images may be located at different positions and in varying order, it is not clear who is looking at who.

Since all the audio streams from all the participants are merged into one single mono-track audio stream, it is impossible to know from what direction the sound arrives, and this may make it difficult to determine who is talking at any given moment.

As most webcams grab an image of the face from the middle of the chest and upwards, the participants' hands are frequently not shown and therefore hand gestures that are a significant part of normal conversations are not conveyed in a typical video conference.

Furthermore—the quality of traffic (bit rate, packet loss and latency) may change over time and the quality of the video conference calls may fluctuate accordingly.

Typically, video conferencing images tend to be blurry due to the limited resolution of the camera (1080×720 pixels in common laptop cameras), motion blur, and video compression. In many cases the video freezes and audio sounds metallic or is lost.

All these limitations cause an effect that is widely known as Zoom fatigue (https://hbr.org/2020/04/how-to-combat-zoom-fatigue) which results in participants becoming more tired after many hours of video conferencing meetings than they typically do in normal meetings in the same room.

There is a growing need to enhance the virtual interaction between participants and to overcome various other problems associated with current video conference call services.

BRIEF DESCRIPTION OF THE DRAWINGS

FIG. 1 illustrates an example of a method;
FIG. 6 includes examples of methods;
FIG. 9 illustrates an example of a 2.5-dimension illusion;
FIG. 10 illustrates an example of 3D content for a 3D screen or virtual reality headset;
FIG. 11 is an example of a panoramic view of a virtual 3D environment populated by five participants, a partial view of the some of the participants within the virtual 3D environment, and a hybrid view;
FIG. 16 is an example of 2D-to-2D dense correspondences computation on upper and lower lips;
FIG. 22 illustrates examples of an image that captures two persons, and examples of avatars that represents one or more persons or even more participants.

DESCRIPTION OF THE DRAWINGS

Figure 2:
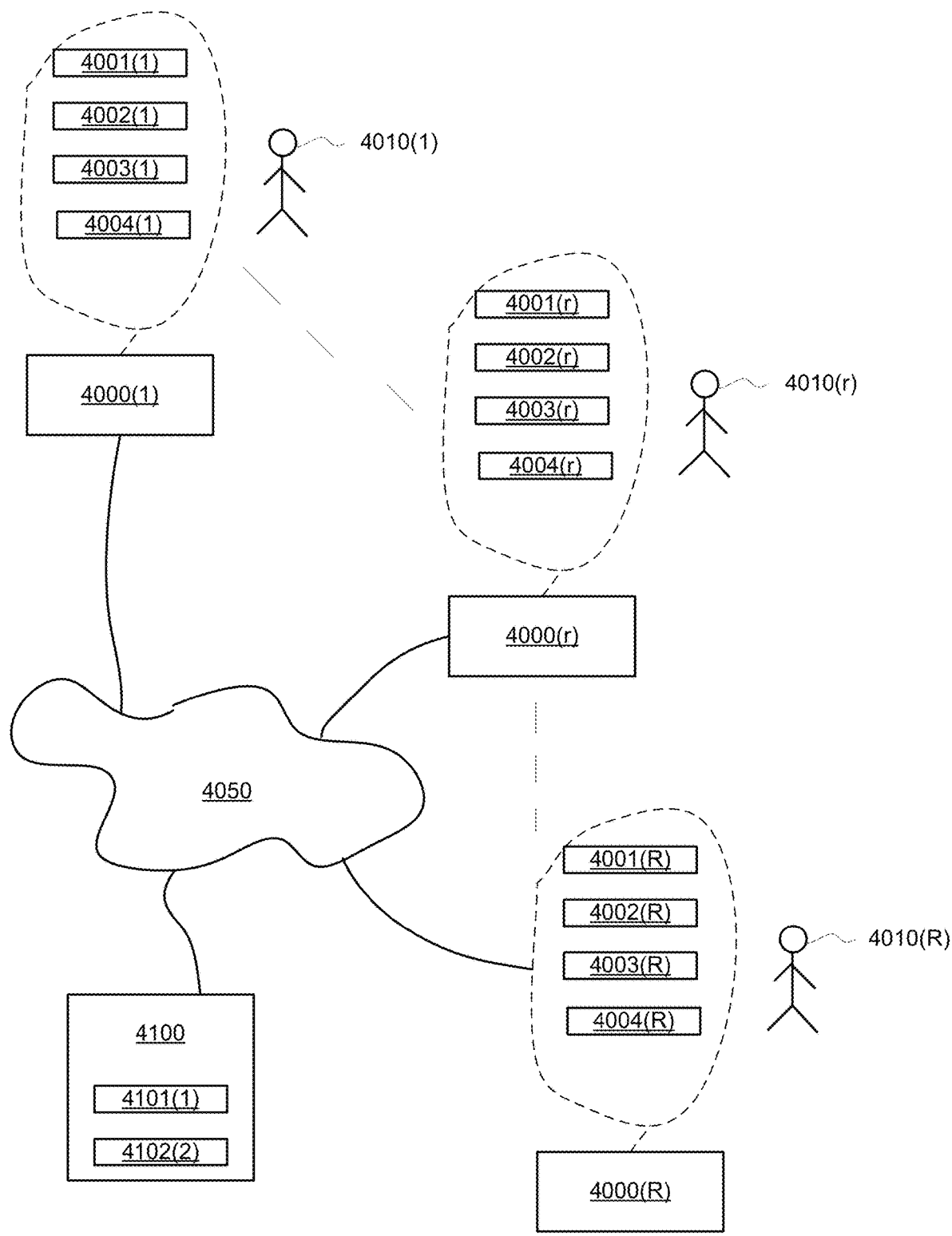
FIG. 2 illustrates an example of a computerized environment.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method and should be applied mutatis mutandis to a computer readable medium that is non-transitory and stores instructions for executing the method.

Any reference in the specification to a system should be applied mutatis mutandis to a method that may be executed by the system and should be applied mutatis mutandis to a computer readable medium that is non-transitory and stores instructions executable by the system.

Any reference in the specification to a computer readable medium that is non-transitory should be applied mutatis mutandis to a method that may be applied when executing instructions stored in the computer readable medium and should be applied mutatis mutandis to a system configured to execute the instructions stored in the computer readable medium.

The term "and/or" means additionally or alternatively.

Any reference to a "user" should be applied mutatis mutandis to the term "participant"—and vice versa.

There is provided a method, a non-transitory computer readable medium and a system related to video and may, for example be applicable to 3D video conference calls. At least some of the examples and/or embodiments illustrated in the applications may be applied mutatis mutandis for other purposes and/or during other applications.

For example, referring to a 3D video conference that involves multiple participants. A first participant is imaged, and a second participant wishes to view a first avatar (or any other 3D visual representation) of the first participant within a virtual 3D video conference environment.

The generation of the first avatar (or any other 3D visual representation) may be executed in various manners—for example—only by a device of the second participant, only by the device of the first participant, partially by the device of the second participant, partially by the device of the first participant, by a cooperation between the devices of the first and second participants, by another computerized system (such as but not limited to a cloud system or a remote system), and/or any combination of one or more devices.

The inclusion of the avatar (or any other 3D visual representation) within the virtual 3D video conference environment may be executed in various manners—for example—only by a device of the second participant, only by the device of the first participant, partially by the device of the second participant, partially by the device of the first participant, by a cooperation between the devices of the first and second participants, by another device (such as but not limited to a cloud device or a remote device), and/or any combination of one or more devices.

Any reference to one manner of execution of any step of the generation of the first avatar and/or any reference to one manner of execution of any step of the inclusion of the avatar within the virtual 3D video conference environment may be applied mutatis mutandis to any other manner of execution.

The generation of the first avatar and/or the inclusion of the first avatar may be responsive to information gained by the device of the first user or to a camera or sensor associated with the device of the first user. A non-limiting example of information may include information regarding the first participant and/or information regarding to the acquisition of images of the first participant (for example camera setting, illumination and/or ambient conditions).

The system may include multiple user devices and/or intermediate devices such as servers, cloud computers, and the like.

FIG. 1 illustrates an example of method 200.

Method 200 is for conducting a three-dimensional video conference between multiple participants.

Method 200 may include steps 210, 220 and 230.

Step 210 may include receiving direction of gaze information regarding a direction of gaze of each participant within a representation of a virtual 3D video conference environment that is associated with the participant.

The representation of a virtual 3D video conference environment that is associated with the participant is a representation that is shown to the participant. Different participants may be associated with different representation of a virtual 3D video conference environment.

The direction of gaze information may represent a detected direction of gaze of the participant.

The direction of gaze information may represent an estimated direction of gaze of the participant.

Step 220 may include determining, for each participant, updated 3D participant representation information within the virtual 3D video conference environment, that reflects the direction of gaze of the participant. Step 220 may include estimating how the virtual 3D video conference environment will be seen from the direction of gaze of the participant.

Step 230 may include generating, for at least one participant, an updated representation of virtual 3D video conference environment, the updated representation of virtual 3D video conference environment represents the updated 3D participant representation information for at least some of the multiple participants. Step 230 may include rendering images of the virtual 3D video conference environment for at least some of the multiple participants. Alternatively—step 230 may include generating input information (such as 3D model and/or one or more texture maps) to be fed to a rendering process.

Method 200 may also include step 240 of displaying, by a device of a participant of the multiple participants, an updated representation of the virtual 3D video conference environment, the updated representation may be associated with the participant.

Method 200 may include step 250 of transmitting the updated representation of virtual 3D video conference environment to at least one device of at least one participant.

The multiple participants may be associated with multiple participant devices, wherein the receiving and determining may be executed by at least some of the multiple participant devices. Any step of method 200 may be executed by at least some of the multiple participant device or by another computerized system.

The multiple participants may be associated with multiple participant devices, wherein the receiving and determining may be executed by a computerized system that differs from any of the multiple participant devices.

Method 200 may include one of more additional steps—collectively denoted 290.

The one or more additional steps may include at least one out of:
- a. Determining a field of view of a third participant within the virtual 3D video conference environment.
- b. Setting a third updated representation of the virtual 3D video conference environment that may be sent to a third participant device to reflect the field of view of the third participant.
- c. Receiving initial 3D participant representation information for generating the 3D representation of the participant under different circumstances. The different circumstances may include at least one out of (a) different image acquisition conditions (different illumination and/or collection conditions), (b) different directions of gaze, (c) different expressions, and the like.
- d. Receiving in run time, circumstances metadata; and amending, in real time, the updated 3D participant representation information based on the circumstances metadata.
- e. Repetitively selecting for each participant, a selected 3D model out of multiple 3D models of the participant.
- f. Repetitively smoothing a transition from one selected 3D model of the participant to another 3D model of the participant.
- g. Selecting an output of at least one neural network of the multiple neural networks based on a required resolution.
- h. Receiving or generating participants appearance information about head poses and expressions of the participants.
- i. Determining the updated 3D participant representation information to reflect the participant appearance information.
- j. Determine a shape of each of the avatars that represent the participants.
- k. Determining relevancy of segments of updated 3D participant representation information.
- l. Selecting which segments to transmit, based on the relevancy and available resources.
- m. Generating a 3D model and one or more texture maps of 3D participant representation information of a participant.
- n. Estimating 3D participant representation information of one or more hidden areas of a face of a participant.
- o. Estimating 3D model hidden areas and one or more hidden parts texture maps.
- p. Determining a size of the avatar.
- q. Receiving audio information regarding audio from the participants and appearance information.
- r. Synchronizing between the audio and the 3D participant representation information.
- s. Estimating face expressions of the participants based on audio from the participants.
- t. Estimating movements of the participants.

The receiving of the 3D participant representation information may be done during an initialization step.

The initial 3D participant representation information may include an initial 3D model and one or more initial texture maps.

The 3D participant representation information may include a 3D model and one or more texture maps.

The 3D model may have separate parameters for shape, pose and expression.

Each of the one or more texture maps may be selected and/or augmented based on at least one out of shape, pose and expression.

Each of the one or more texture maps may be selected and/or augmented based on at least one out of shape, pose, expression and angular relationship between a face of the participant and an optical axis of a camera that captures an image of face of the participant.

The determining, for each participant, of the updated 3D participant representation information may include at least one of the following:
- a. Using one or more neural network for determining the updated 3D participant representation information.
- b. Using multiple neural networks for determining the updated 3D participant representation information, wherein different neural networks of the multiple neural networks may be associated with different circumstances.
- c. Using multiple neural networks for determining the updated 3D participant representation information, wherein different neural networks of the multiple neural networks may be associated with different resolutions.

The updated representation of the virtual 3D video conference environment may include an avatar per participant of the at least some of the multiple participants.

A direction of gaze of an avatar within the virtual 3D video conference environment may represent a spatial relationship between a (a) direction of gaze of a participant that may be represented by the avatar and (b) a representation of the virtual 3D video conference environment displayed to the participant.

The direction of gaze of an avatar within the virtual 3D video conference environment may be agnostic to an optical axis of a camera that captured a head of the participant.

An avatar of a participant within the updated representation of the virtual 3D video conference environment may appear in the updated representation of the virtual 3D video conference environment as being captured by a virtual camera located on a virtual plane that crosses the eyes of the first participant. Accordingly—the virtual camera and the eye may be located, for example at the same height.

The updated 3D participant representation information may be compressed.

The updated representation of the virtual 3D video conference environment may be compressed.

The generating of the 3D model and one or more texture maps may be based on images of the participant that were acquired under different circumstances.

The different circumstances may include different viewing directions of a camera that acquired the images, different poses, and different expressions of the participant.

The estimating of the 3D participant representation information of one or more hidden areas may be executed by using one or more generative adversarial networks.

The determining, for each participant, of the updated 3D participant representation information may include at least one out of:
   a. Applying a super-resolution technique.
   b. Applying noise removal.
   c. Changing an illumination condition.
   d. Adding or changing wearable item information.
   e. adding or changing make up information.

The updated 3D participant representation information may be encrypted.

The updated representation of virtual 3D video conference environment may be encrypted.

The appearance information may be about head poses and expressions of the participants and/or be about lip movements of the participants.

The estimating face expressions of the participants based on audio from the participants may be executed by a neural network trained to map audio parameters to face expression parameters.

FIG. 2 illustrates an example of a computational environment that include users devices 4000(1)-4000(R) of users 4010(1)-4010(R). Index r ranges between 1 and R, R being a positive integer. The r'th user device 4000(r) may be any computerized device that may include one or more processing circuit 4001(r), a memory 4002(r), a man machine interface such as a display 4003(r), and one or more sensors such as camera 4004(r). The r'th user 4010(r) is associated with (uses) the r'th user device 4000(r). The camera may belong to the man machine interface.

The users devices 4000(1)-4000(R) and a remote computerized system 4100 may communicate over one or more networks such as network 4050. The one or more networks may be any type of networks—the Internet, a wired network, a wireless network, a local area network, a global network, and the like.

The remote computerized system may include one or more processing circuits 4101(1), a memory 4101(2), and may include any other component.

Any one of the users devices 4000(1)-4000(R) and a remote computerized system 4100 may participate in the execution of any method illustrated in the specification. Participate means executing at least one step of any of said methods.

Any processing circuit may be used—one or more network processors, non-neural network processors, rendering engines, image processors and the like.

One or more neural networks may be located at a user device, at multiple users devices, at a computerized system outside any of the user devices, and the like.

Figure 3:
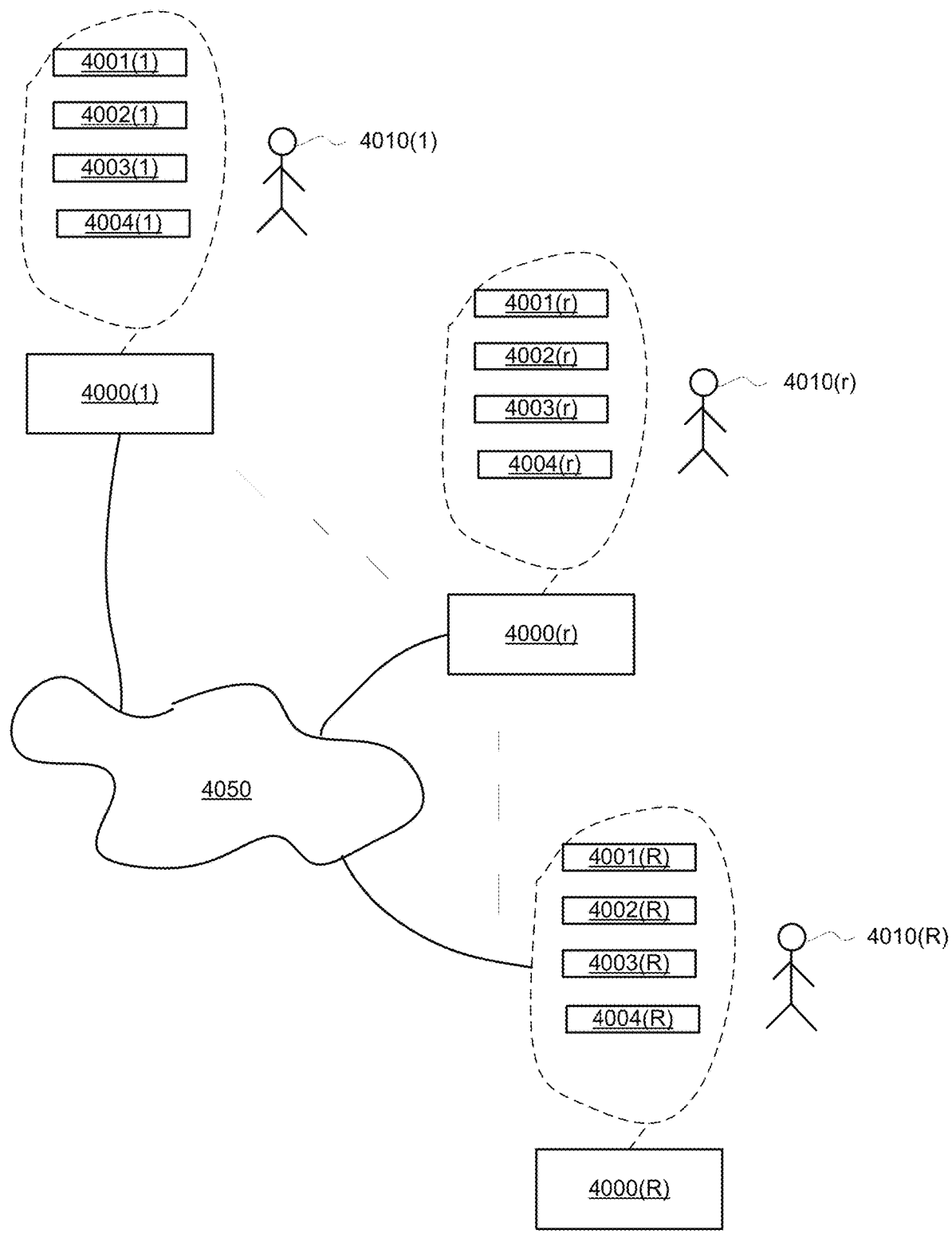
FIG. 3 illustrates an example of a computerized environment.

FIG. 3 illustrates an example of a computational environment that include users devices 4000(1)-4000(R) of users 4010(1)-4010(R). Index r ranges between 1 and R, R being a positive integer. The r'th user device 4000(r) may be any computerized device that may include one or more processing circuit 4001(r), a memory 4002(r), a man machine interface such as a display 4003(r), and one or more sensors such as camera 4004(r). The r'th user 4010(r) is associated with (uses) the r'th user device 4000(r).

The users devices 4000(1)-4000(R) may communicate over one or more networks such as network 4050.

Any one of the users devices 4000(1)-4000(R) may participate in the execution of any method illustrated in the specification. Participate means executing at least one step of any of said methods.

Figure 4:
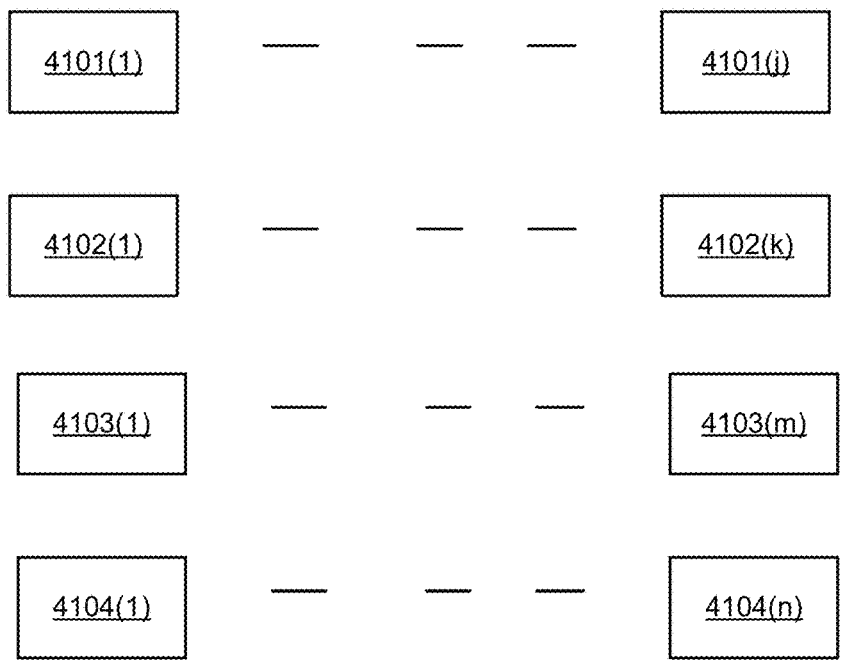
FIG. 4 illustrates an example of data structures.

FIG. 4 illustrates an example of various data structures. The data structures may include user avatars 4101(1)-4101(j), texture maps 4102(1)-4102(k), 3D models 4103(1)-4103(m), 3D representations of objects 4104(1)-4104(n), and any mapping or other data structures mentioned in the application.

Any user may be associated with one or more data structure of any type—avatar, 3D model, texture map, and the like.

Some of the examples refer to a virtual 3D video conference environment such as a meeting room, restaurant, cafe, concert, party, external or imaginary environment in which the users are set. Each participant may choose or be otherwise associated with a virtual or actual background and/or may select or otherwise receive any virtual or actual background in which avatars related to at least some of the participants are displayed. The virtual 3D video conference environment may include one or more avatars that represents one or more of the participants. The one or more avatars may be virtually located within the virtual 3D video conference environment. One or more features of the virtual 3D video conference environment (that may or may not be related to the avatars) may differ from one participant to another.

Either the full body, the upper part of the body or just the face of the users are seen in this environment—thus an avatar may include full body of a participant, the upper part of a body of the participant body or just the face of the participant.

Within the virtual 3D video conference environment there may be provided an improved visual interaction between users that may emulate the visual interaction that exists between actual users that are actually positioned near each other. This may include creating or ceasing to have eye-contact, expressions directed at specific users and the like.

In a video conference call between different users, each user may be provided with a view of one or more other users—and the system may determine (based on gaze direction and the virtual environment)—where the user looks (for example at one of the other users—at none of the users, at a screen showing a presentation, at a whiteboard, etc.)—and this is reflected by the virtual representation (3D model) of the user within the virtual environment—so that other users may determine where the user is looking.

Figure 5:
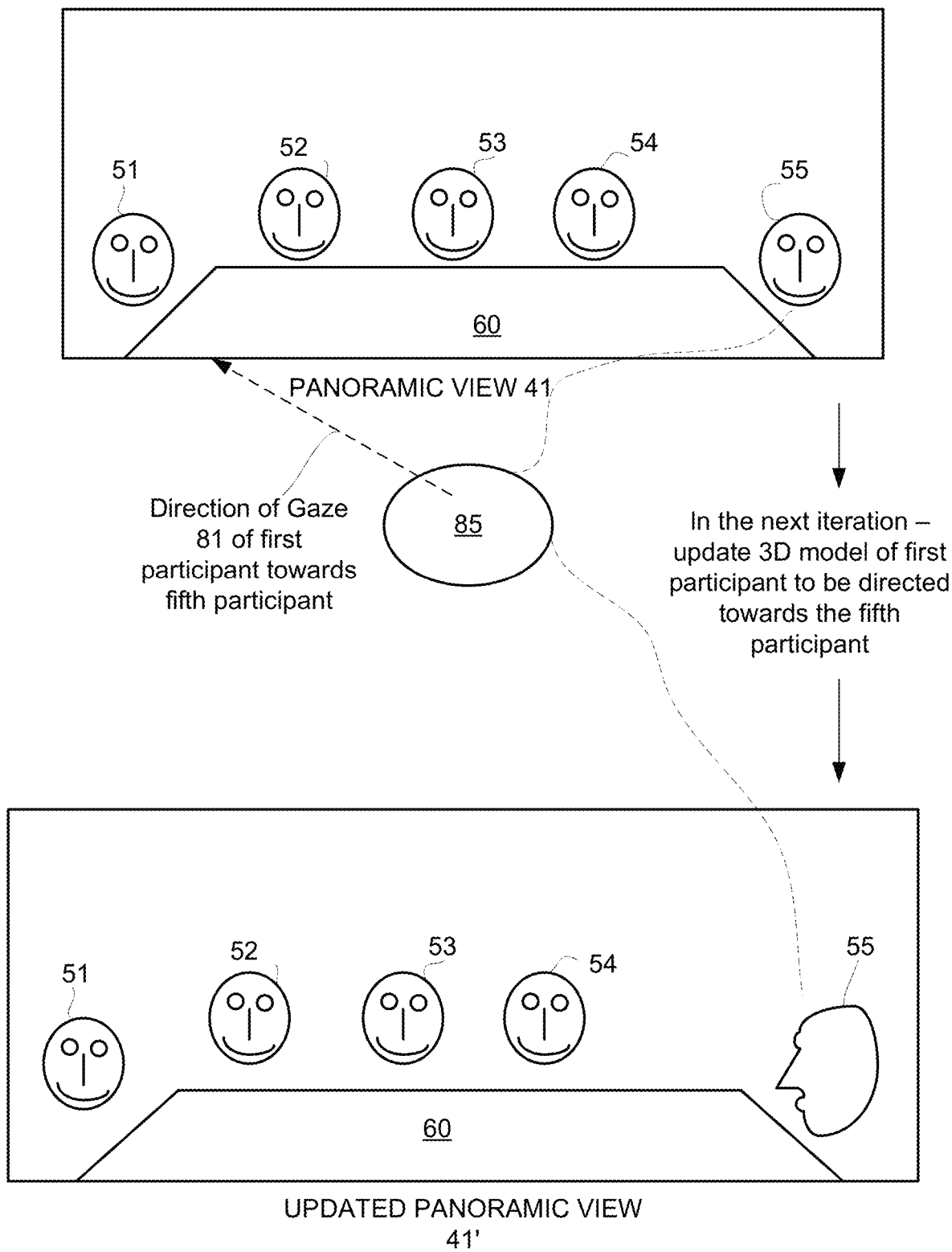
FIG. 5 illustrates an example of a process for amending a direction of view of a 3D model of a part of a participant according to a direction of gaze of the participant.

FIG. 5 illustrates an example of a process for amending a direction of view of an avatar of a part of a participant according to a direction of gaze of the participant. The upper part of FIG. 5 is a virtual 3D video conference environment—represented by a panoramic view 41 of five participants 51, 52, 53, 54 and 55 sitting near table 60. All participants face the same direction—the screen.

In the lower image the avatar of the fifth participant faces the avatar of first participant—as the fifth participant was detected to look at the 3D model of the first participant within the environment as presented to the fifth participant.

Tracking the user's eyes and gaze direction may also be used to determine the direction in which the user is looking (direction of gaze) and at which person or object the user is looking. This information can be used to rotate the avatar's head and eyes so that in the virtual space it also appears as if the user is looking at the same person or object as in the real world.

Tracking the user's head pose and eye gaze may also be used to control the virtual world's appearance on the user's screen. For example, if the user looks at the right side of the screen, the point of view of the virtual camera may move to the right, so that the person or object at which the user is looking is located at the center of the user's screen.

The rendering of a user's head, body, and hands from a certain point of view that is different than the original point of view of the camera may be done in different ways, as described below:

In one embodiment, a 3D model and texture maps are created before the beginning of the meeting and this model is then animated and rendered at run time according to the user's pose and expressions that are estimated from the video images.

Figure 20:
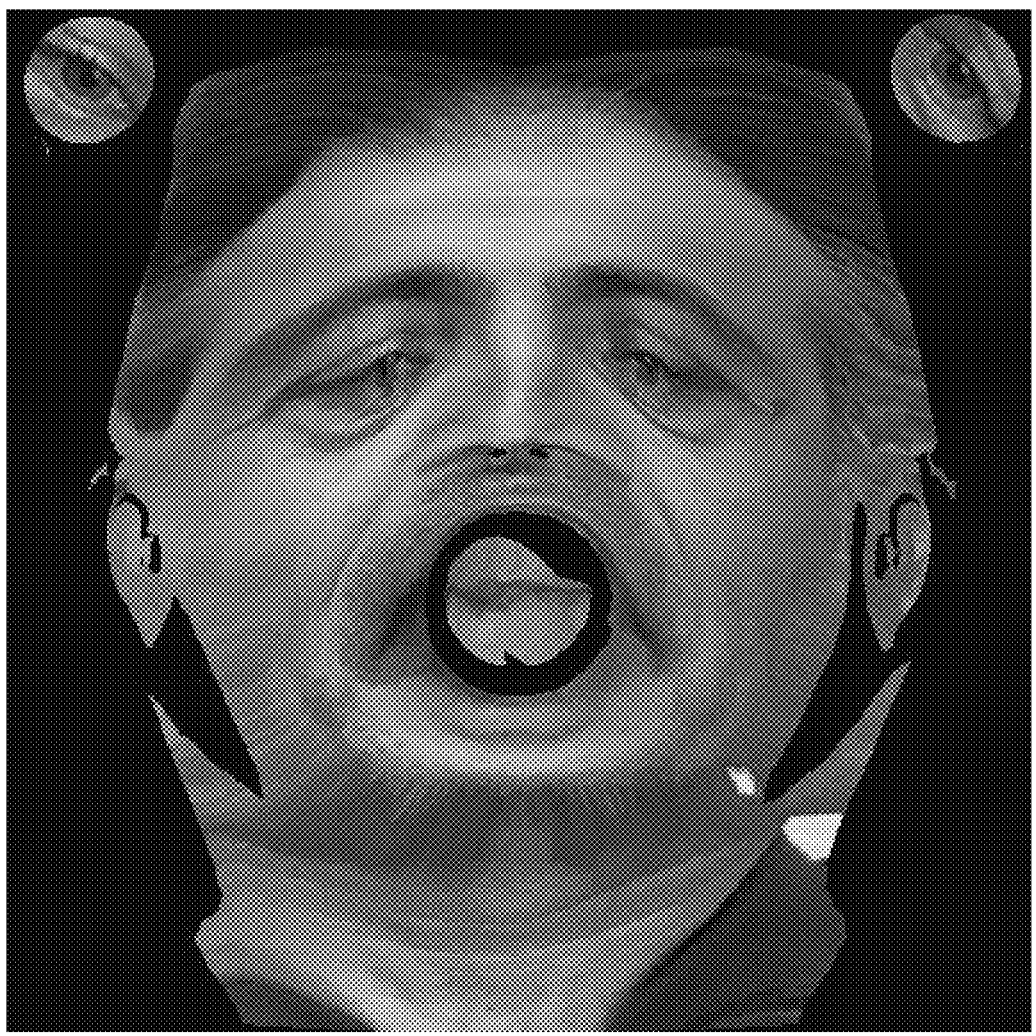
FIG. 20 illustrates a texture map of a face.

A texture map is a 2D image in which each color pixel represents the red, green and blue reflectance coefficients of a certain area in the 3D model. An example of a texture map is shown in FIG. 20. Each color pixel in the texture map corresponds to certain coordinates within a specific polygon (e.g., triangle) on the surface of the 3D model.

Figure 15:
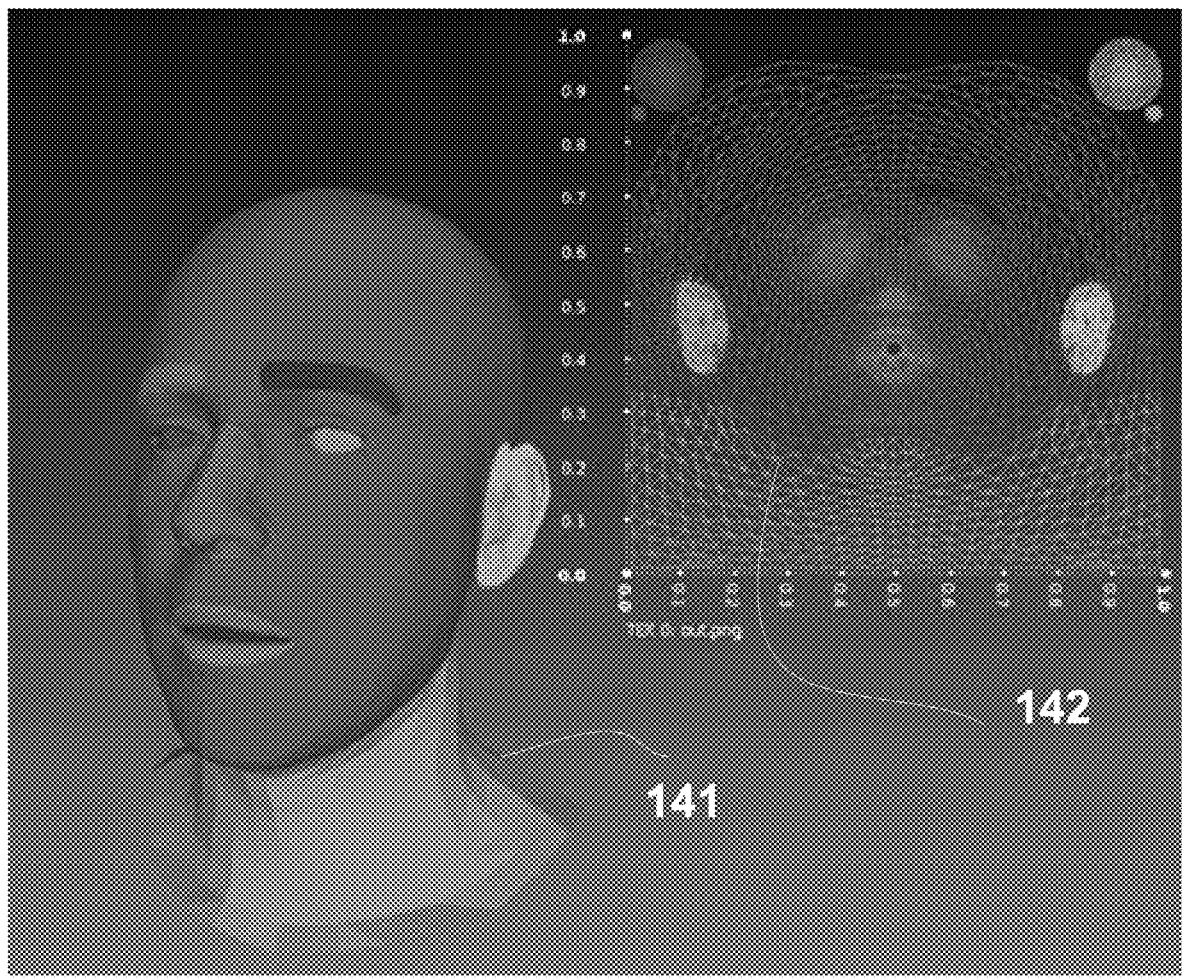
FIG. 15 is an example of a 3D model and a UV map.

An example of a 3D model composed of triangles and the mapping of the texture map to these triangles is shown in FIG. 15.

Generally, each pixel in the texture map has an index of the triangle to which it is mapped and 3 coordinates defining its exact location within the triangle.

A 3D model composed of a fixed number of triangles and vertices may be deformed as the 3D model changes. For example, a 3D model of a face may be deformed as the face changes its expression. Nevertheless, the pixels in the texture map correspond to the same locations in the same triangles, even though the 3D locations of the triangles change as the expression of the face changes.

Texture maps may be constant or may vary as a function of time, expression or of viewing angle. In any case, the correspondence of a given pixel in a texture map and a certain coordinate in a certain triangle in the 3D model doesn't change.

In yet another embodiment, a new view is created based on a real-time image obtained from a video camera and the position of the new point of view (virtual camera).

In order to best match between the audio and the lip movement and facial expressions, the audio and video that is created from the rendering of the 3D models based on the pose and expressions parameters are synchronized. The synchronization may be done by packaging the 3D model parameters and the audio in one packet corresponding to the same time frame or by adding time stamps to each of the data sources.

To further improve the natural appearance of the rendered model, a neural network may be trained to estimate the facial expression coefficients based on the audio. This can be done by training the neural network using a database of videos of people talking and the corresponding audio of this speech. The videos may be of the participant that should be represented by an avatar or of other people. Given enough examples, the network learns the correspondence between the audio (i.e. phonemes) and the corresponding face movements, especially the lip movements. Such a trained network would enable to continuously render the facial expressions and specifically the lip movements even when the video quality is low or when part of the face is obstructed to the original video camera.

In yet another embodiment, a neural network can be trained to estimate the audio sound from the lip and throat movements or from any other facial cues, as is done by professional lip readers. This would enable to create or improve the quality of the audio when the audio is broken or when there are background noises that reduce its quality.

In yet another embodiment a neural network is trained to compress audio by finding a latent vector of parameters from which the audio can be reconstructed at a high quality. Such a network could serve to compress audio at a lower bit rate than possible with standard audio compression methods for a given audio quality or obtain a higher audio quality for a given bit rate.

Such a network may be trained to compress the audio signal to a fixed number of coefficients, subject to the speech being as similar as possible to the original speech under a certain cost function.

The transformation of the speech to a set of parameters may be a nonlinear function and not just a linear transformation as is common in standard speech compression algorithms. One example would be that the network would need to learn and define a set of basis vectors which form a spanning set of spoken audio.

The parameters then would be the vectorial coefficients of the audio as spanned by this set.

FIG. 6 illustrates method 2001.

Method 2001 is for conducting a 3D video conference between multiple participants, the method may include steps 2011 and 2021.

Step 2011 may include determining, for each participant, updated 3D participant representation information within the virtual 3D video conference environment, that represents participant. The determining may be based on audio generated by the participants and appearance information about appearance of the participants.

Step 2021 may include generating, for at least one participant, an updated representation of virtual 3D video conference environment, the updated representation of virtual 3D video conference environment represents the updated 3D participant representation information for at least some of the multiple participants. For example, any movement by the participant may expose or collude parts of the environment. Additionally, movements by participant may affect lighting in the room as the movements may modify the exposure to light of different parts of the environment.

The method may include matching between the audio from a certain participant and appearance information of a certain participant.

The appearance information may be about head poses and expressions of the participants.

The appearance information may be about lip movements of the participants.

Creation of 3D Models

The 3D models and texture maps of the users can be created on the fly from a 2D or 3D video camera or can be prepared before the beginning of the 3D video conference call. They can also be a combination of a high-quality model prepared before the meeting and a real-time model created during the meeting. For example, changes in the appearance of the participant relative to the high-quality model, such as a newly grown beard, may be adjusted using information from the on-the-fly camera. As another example, a new texture map can be created from the video during the meeting based on the current look of the person. However, this texture map may include dead zones (hidden areas) due to obstructions of areas that may be not currently seen by the camera. Such dead zones can be filled by using a previously created texture map.

Filling these zones is performed by matching landmarks in the two texture maps using a method known as registration. Once matching is performed, data for the hidden areas is taken from the previously prepared texture map.

Illumination corrections between the current and previous texture maps can be calculated based on the areas that may be shown in both maps. These corrections may be applied to the current texture map, so that there may be no distinct border line between the textures captured at different times. In addition, in order to avoid sharp transitions between textures from different times, a continuous blending of the textures can be applied, e.g., by using a weighted average of the two texture maps, where the weights change along a transition zone between the textures. The methods mentioned above may be used for merging texture maps, material maps and also 3D models.

If the video camera is a 2D camera, then computerized models, such as convolutional neural networks may be used to create a 3D model from the 2D images. These models may be parametric models where the parameters determine the shape, expression and pose of the face, body, and hands. Such a model can be trained by using sets of 2D images and corresponding 3D models. The corresponding 3D models can be created in several ways. In the rendering process different illuminations can be used in order to make the model robust to varying illuminations.

In another method, many 2D images of real people can be obtained and then a 3D model can be created from these multiple 2D images by using photogrammetric software. In yet another method a depth camera that also includes an RGB camera, such as the Kinnect camera or the Intel RealSense camera can be used to obtain both 3D depth models and corresponding 2D images. After training the network using the methods described above, at run time it may be supplied with a 2D image as an input and the network outputs the 3D model. The 3D model can be output as a point cloud, a mesh or a set of parameters that describe a 3D model in a given parametric space.

If the camera is a 3D depth camera, then the depth data can be used to make the models more accurate and solve ambiguities. For example, if one obtains only a front facing image of a person's head, it may be impossible to know the exact depth of each point in the image, i.e. the length of the nose. When more than one image of the face from different angles exist, then such ambiguities may be solved. Nevertheless, there may remain occluded areas seen in only one image or inaccuracies. The depth data from a depth camera may assist in generating a 3D model with depth information in every point that solves the ambiguity problems described above.

If an offline 3D model creation process may be used, then this can be done using a single image, multiple images, a video, or several videos. The user may be asked to rotate the head, hands, and body so that it may be seen from many angles in order to cover all views and avoid missing areas in the model.

If such areas still exist, then they may be extrapolated or guessed from the modelled areas or by a neural network that was trained using many examples.

Specifically, a Generative Adversarial Network (GAN) may be trained based on many images of a certain person or on many images of multiple people to generate images of people from angles that may be different than the angle at which the camera may be currently seeing the person.

At runtime, such a network would receive an image of a person as an input and a camera position from which the person should be rendered. The network would render an image of that person from the different camera position including parts that may be obscured in the input image or may be at a low resolution in the input image due to being almost parallel to the camera's line of sight (i.e. cheeks at a frontal image).

Figure 7:
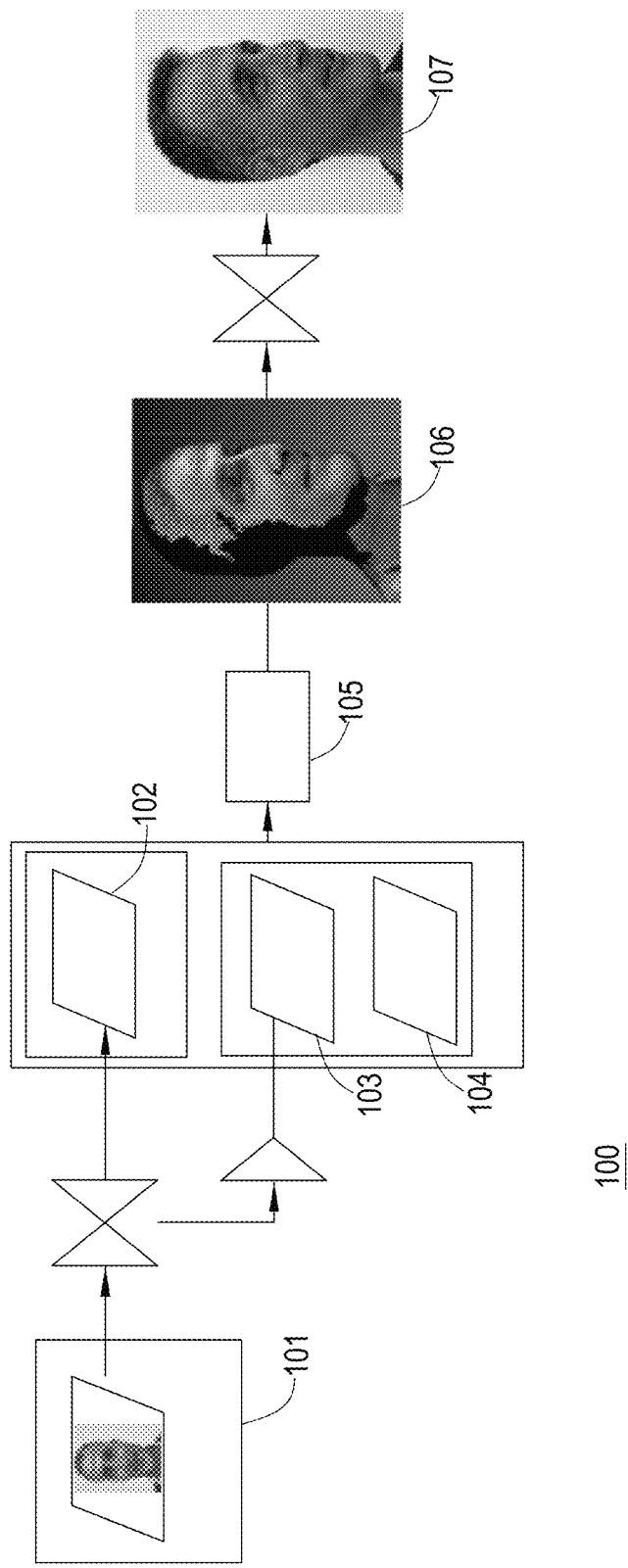
FIG. 7 is an example of images and a process.

FIG. 7 shows an example of a process 100 that uses a Generative Adversarial Network 109 complete textures in areas that may be not seen in the original image. With GANs there may be no need to build a complete and accurate 3D model with a full texture map and then render it.

An image 101 is input into a neural network 103 that outputs characteristics 105 of the image (that may include texture parameters, expression parameters and/or shape parameters)—for example the neural network may expands texture parameters into a texture map. The neural network may also receive additional information 102 and generate characteristics 105 also based on the additional information.

A differentiable renderer 107 may renders an image 108 from the texture map, expression and shape parameters. This image may have missing parts due to occlusions of parts of the head that were not seen in the original input image. A Generative Adversarial Network 109 (GAN) may complete the rendered image into a full image 110 without any missing parts.

A generative Adversarial Network (GAN) may also be used in order to correct illumination in the texture map of the model, for example in cases where the user's face may be not illuminated uniformly, e.g. there exists a strong illumination from a window at the side of the face or from a spot projector above the user's head.

GAN networks may also be used to correct the 3D model, e.g. create ears that may be not properly seen in the images, for example, due to obstruction by the cheeks or by hair.

The user may also be requested to pose or do different facial expressions so that a comprehensive model of poses and expressions can be created. Examples of such poses and expressions may be smiling, frowning, opening and closing the mouth and eyes.

The 3D model may have separate parameters for shape, pose and expression. The shape parameters may depend only on the specific person and may be independent of the pose and expression. Therefore, they remain constant even when a person moves his head and talks or makes various facial expressions. Therefore, during the modelling process of a certain person, the expression and pose of the person being modelled do not have to be static or frozen during the capturing of the video or images that may be used to create the 3D model. Since the shape of the 3D model is considered to be static, there is no need to use a 3D camera or a set of 2D cameras which would otherwise be needed to create a 3D model. This relieves the requirement to use several multi-view cameras that may be temporally synchronized. All the models created from multiple images may be merged into one 3D model or into several different models that vary with the expression or illumination conditions, but all have common shape parameters.

During the real time rendering process, the closest model or models in terms of viewing angle or illumination may be chosen as a starting point for the model transformation and rendering process.

For example, if different models that refer to viewing angles of 0, 10, 20, 30 and 40 degrees are available, and at a given moment the user wants to view a model at a 32 degrees angle, then the model corresponding to 30 degrees viewing angle may be chosen as a starting point for the model transformation.

Furthermore, several such models may be interpolated or extrapolated to obtain a model at a state that may be not part of the pre-recorded states.

During the process of creating the 3D avatar, the 3D model and the 2D texture maps, the quality of the 3D model that may be created may be evaluated by projecting it onto two dimensional images from different angles using a simple linear geometrical projection or a more complex model of a camera that includes optical distortions. The projections of the 3D model to 2D images may be compared to the images grabbed by the camera or cameras. In doing so, it may be useful to model the camera that may be used to grab the images so that the geometrical distortions of the camera may be modelled in the projection process. The modelling may include, but may be not limited to modelling the focal length of the camera, the pixel size, the total Field of View, nonlinear geometrical distortions such as a barrel or pincushion distortion or any other distortions of optics and especially for cameras with a wide field of view such as a fisheye camera.

The modelling may also include modelling blurring due to the optics and color distortions. The projections of the 3D model can be compared to the grabbed 2D images in order to verify that the 3D geometrical structure may be accurate and also that the reflection maps may be accurate.

Several methods may be used to compare the projections and the grabbed images such as:
a. Comparing the location of facial landmarks such as the corners of the eyes and lips, the tip and edges of the nose and the edges of the cheeks and chin, that may be found in the image pairs.
b. Comparing the location of silhouettes.
c. Comparing the location of corners and lines detected in both images.
d. Comparing the grey levels of the two images.

Any differences that may be found may be used to update the 3D model and the reflectance maps in a manner that reduces the differences between the projected images and the grabbed images. For example, if it may be found that the corner of an eye may be positioned too far to the left in the projection of the 3D model compared to its location in a grabbed 2D image, then the model can be revised so that the location of the corner of the eye will move to the right in order to reduce the error between the location of that landmark in the projection and grabbed images.

This can be done by changing the location of 3D points in a 3D mesh or by changing the parameters in a parametric model that affect the location of that landmark.

This process may be used to reduce the errors in the rendered and grabbed images and thus improve the quality of the models that may be created.

Specifically, it may be useful to project images at different angles such as 0, 45 and 90 degrees in order to capture any geometrical or grey level differences between the model and the grabbed images.

The quality of the 3D model and the texture maps may be analysed during or after the process of the creation of the avatar and specifically inspected to verify that all or some of the following cases may be covered:
a. There may be no obscured areas in the facial, body or hands models.
b. All relevant expressions may be covered.
c. Both open and closed eyes may be modelled.
d. Both closed and open mouths with teeth showing may be covered.
e. There may be no areas with low resolution due to imaging of a facial structure that may be nearly parallel to the line of sight, e.g. imaging the cheeks from a front view.
f. The illumination may be appropriate and there may be no areas that may be too dark or too bright and saturated.
g. There may be no areas that may be too noisy.

The model may be not significantly different from the current appearance of the user in the video images, e.g. due to shaving or adding a beard or changing hairstyles.

In case the inspection process discovers that there may be missing information, the user may be requested to add additional photos or video sequences in order to complete the missing information.

Before the beginning of a call between users, but after the user's camera has started to grab images of the user, the 3D model and texture maps may be enhanced to reflect the new appearance of the user as seen at that moment.

Information from a previously created model and texture map may be merged with updated information obtained before the start of the meeting or during the meeting. For example new information regarding the illumination of the person's body and face, the user's hair, shaving, makeup, clothes, etc. may be used to update the 3D model and texture maps. Areas that were not seen before such as the top of the head or bottom of the chin or other parts of the body that may be seen before or during the session may also be used to update the 3D model or texture maps.

The new information may be used to replace previous information, may be averaged with previous information, or otherwise merged with previous information.

In order to scale the 3D model, i.e., know its exact dimensions from a 2D camera where the camera parameters may be unknown and the range to the modelled object may be unknown, several methods may be used. For example:
a. Using an object of known size that may be placed next to the object, e.g., place a credit card on the forehead of the user. Such objects can include but may be not limited to credit cards, driver's license, bills, coins, rulers, etc. In such cases a classification method may classify the object used and determine its size from a database. For example, a method may detect a bill as originating from one of multiple countries and/or denominations, recognize it and obtain its size from a database. Similarly, a method may detect a ruler and determine its size from the readings on the ruler.
b. Asking the user to specify his/her height. The height of the face may be known to be approximately 13% of the height of an adult. This may be an accurate enough approximation for the requirements of many applications. In addition, it may be known that children and babies have different body proportions. For babies, the height of the face may be known to be approximately 25% of its height. The size of the face may be a nonlinear function of the height, e.g., 25% of the height for people who may be 60 cm high, 20% of the height for people that may be 100 cm high and 13% of the height for people that may be 150 cm or higher.

The 3D model of the user may include, but may be not limited to:
a. A parametric model of the face and body i.e. shape, expression and pose.
b. A high frequency depth map detailing such fine details as wrinkles, skin moles, etc.
c. A reflectance map detailing the color of each part of the face or body. Multiple reflectance maps may be used to model the change of appearance from different angles.
d. An optional material map detailing the material from which each polygon may be made, e.g. skin, hair, cloth, plastic, metal, etc.
e. An optional semantic map listing what part of the body each part in the 3D model or reflectance map represents.

f. These models and maps may be created before the meeting, during the meeting or may be a combination or models created before and during the meeting.

The user's model may be stored on the user's computer, phone or other device. It may also be transmitted to the cloud or to other users, possibly in an encrypted manner in order to preserve the user's privacy.

FIG. 6 may also illustrate method 90 for generating and using a parametric model.

Method 90 may include steps 92, 94, 96 and 98.

Step 92 may include generating, by a user device, a 3D model related to a user, the 3D model may be a parametric model.

Step 94 may include sending the parameters of the 3D model to a computerized system.

Step 96 may include monitoring each participant by a user device of the participant, during the conference call, updating parameters of 3D model of each participant accordingly and sending updated parameters (sending may be subjected to communication parameters).

Step 98 may include receiving by a user device of each participant updated parameters of 3D models related to other participants and updating the display accordingly to reflect the changes to the model.

FIG. 6 also illustrates method 1800 for generating a 3D visual representation of a sensed object that may be three dimensional.

Method 1800 may include steps 1810, 1820 and 1830.

Step 1810 may include obtaining at least one 3D visual representation parameter, the visual representation parameters may be selected out of a size parameter, a resolution parameter, and a resource consumption parameter.

Step 1820 may include obtaining object information that represents the sensed object; and selecting, based on the at least one parameter, a neural network for generating the visual representation of the sensed object. For example, the information that represents the sensed object may be the viewing angle of the object.

Steps 1810 and 1820 may be followed by step 1830 of generating the 3D visual representation of the 3D object by the selected neural network.

Step 1830 may include at least one out of:
a. Generating a 3D model of the 3D object and at least one 2D texture map of the 3D object.
b. Further processing the 3D model and the 2D texture map during a rendering process of at least one rendered image.

The generating may be executed by a first computerized unit, wherein the generating may be followed by sending the 3D model and the at least one 2D texture map to a second computerized unit configured to render at least one rendered image based on the 3D model and the at least one 2D texture map.

The 3D object may be a participant of a 3D video conference.

The method may include outputting the 3D visual representation from the selected set of neural network outputs.

The 3D object may be a participant of a 3D video conference.

Super Resolution and Performing Touch-Ups on a 3D Model.

In order to enhance the resolution of the 3D model, super resolution techniques may be used. The super-resolution technique is used to enhance the resolution of the 3D model or the deformable texture map of the 3D model. For example, several images of the model with some translation or rotation between them may be used in order to create a grid at a higher resolution than the grid that can be created from a single image. Note that the color values of the model may be related to polygons in a 3D mesh or to pixels in a 2D texture map.

This process may be done using a recursive process. At the first stage a 3D model and a texture map that are an up-sampled interpolation of the low-resolution model and texture map are used as an initial guess. These 3D model and texture map have more vertices and pixels than in the original 3D model and texture map but do not include more details. The up-sampled model and texture map are then used to render an image of the textured model from a viewpoint that is similar to that of the camera.

The rendered image is compared to the 2D image that was taken with the camera.

The comparison may be performed by, but not limited to, subtraction of the two images or by subtraction after global alignment of the image or by subtraction after a local alignment of areas in the images. The result of the comparison, which is a difference image obtained by this process, includes details from the original camera image that do not exist in the rendered image. The differences may be used as a feedback to enhance the resolution of the initial 3D model and texture map.

The enhancement may be done by, but not limited to, adding the difference image to the initial guess in order to get a new guess with more details. The new 3D model and texture map may be again rendered to obtain a second rendered image that is compared to the original camera image to create a second difference image that may be used as feedback for enhancing the resolution of the 3D model and texture map.

This process may be repeated a given number of times or until a certain criterion is met, e.g., the difference between the actual camera image and the rendered image is below a certain threshold. The process is repeated where the comparison of the rendered textured 3D model is performed with several camera images from a set of images, such as from a video sequence. Since there may be many images in the image set or video, at each image the 3D model and texture map may be sampled by the camera at different positions.

Hence, the process can create a 3D model and texture map that is based on an effectively higher sampling rate than is available from a single image. As a result of this process, a 3D model with more vertices and a texture map with more pixels are created and these 3D model and texture map exhibit high resolution details that are not apparent in the original low resolution 3D model and texture map.

Multiple images of the face and body may also be acquired from the same or different angles in order to average these images and by this means to improve the signal to noise ratio, i.e., create a model with a lower level of pixel noise. This may be especially useful if the images may be acquired at low illumination conditions and the resulting images may be noisy.

Super resolution techniques based on learning methods may also be applied. In such schemes a machine learning method such as a Convolutional Neural Network may be trained based on pairs of high resolution and low-resolution images or 3D models, so that the correspondence between low- and high-resolution images or models may be learned. During the rendering process, the method receives a low-resolution image or model as input and outputs a corresponding high-resolution image or model. These types of methods may be especially useful for generating sharp edges at the transition between different facial organs, such as sharp edges along the eyes or the eyebrows.

Note that the transformation from low to high resolution may be performed based on a single image or multiple images and that it may be performed in the process of creating a 3D model, a texture map or when rendering the final image that may be presented to the user.

Reducing the random noise in the 3D model and the 2D texture maps may also be performed using denoising methods. Such methods may include linear filtering techniques, but preferably nonlinear, edge-preserving techniques, such as a bilateral filter, anisotropic diffusion or convolutional neural networks, that reduce random noise while preserving edges and fine details in the image of the 3D model.

The user's appearance may be altered and improved by manipulating the resulting 3D model or the reflectance maps. For example, different kinds of touch-ups may be applied such as removing skin wrinkles, applying makeup, stretching the face, lip filling or changing the eyes' color.

The shape of the user's body may also be altered, and the user's clothes may be changed from the real clothes to other clothes according to the user's wish. Accessories such as earrings, glasses, hats, etc. may also be added to the user's model.

Alternatively objects such as glasses or headphones may be removed from the user's model.

Communications System Based on the 3D Models.

During the communication session, i.e., a 3D video conference call between several users, a 2D or 3D camera (or several cameras) grabs videos of the users. From these videos a 3D model (for example—the best fitting 3D model) of the user may be created at a high frequency, e.g., at a frame rate of 15 to 120 fps.

Temporal filters or temporal constraints in the neural network may be used to assure a smooth transition between the parameters of the model corresponding to the video frames in order to create a smooth temporal reconstruction and avoid jerkiness of the result.

The real-time parametric model together with the reflectance map and other maps may be used to render a visual representation of the face and body that may be very close to the original image of the face and body in the video.

Since this may be a parametric model, it may be represented by a small number of parameters. Typically, less than 300 parameters may be used to create a high-quality model of the face including each person's shape, expression and pose.

These parameters may be further compressed using quantization and entropy coding such as a Huffman or arithmetic coder.

The parameters may be ordered according to their importance and the number of parameters that may be transmitted and the number of bits per parameter may vary according to the available bandwidth.

In addition, instead of coding the parameters' values, the differences of these values between consecutive video frames may be coded.

The model's parameters may be transmitted to all other user devices directly or to a central server. This may save a lot of bandwidth as instead of sending the entire model of the actual high-quality image during the entire conference call—much fewer bits representing the parameters may be transmitted. This may also guarantee a high quality of the video conference call, even when the current available bandwidth may be low.

Transmitting the model parameters directly to the other users instead of via a central server may reduce the latency by about 50%.

The other user devices may reconstruct the appearance of the other users from the 3D model parameters and the corresponding reflectance maps. Since the reflectance maps, representing such things as a person's skin color change very slowly, they may be transmitted only once at the beginning of the session or at a low updating frequency according to changes that occur in these reflectance maps.

In addition, the reflectance maps and other maps may be updated only partially, e.g., according to the areas that have changed or according to semantic maps representing body parts. For example, the face may be updated but the hair or body that may be less important for reconstructing emotions may not be updated or may be updated at a lower frequency.

In some cases, the bandwidth available for transmission may be limited. Under such conditions, it may be useful to order the parameters to transmit according to some prioritization and then transmit the parameters in this order as the available bandwidth allows. This ordering may be done according to their contribution to the visual perception of a realistic video. For example, parameters related to the eyes and lips may have higher perceptual importance than those related to cheeks or hair. This approach would allow for a graceful degradation of the reconstructed video.

The model parameters, video pixels that may be not modelled and audio may be all synchronized.

As a result, the total bandwidth consumed by the transmission of the 3D model parameters may be several hundred bits per second and much lower than the 100 kbps-3 Mbps that may be typically used for video compression.

A parametric model of the user's speech may also be used to compress the user's speech beyond what may be possible with a generic speech compression method. This would further reduce the required bandwidth required for video and audio conferencing. For example, a neural network may be used to compress the speech into a limited set of parameters from which the speech can be reconstructed. The neural network is trained so that the resulting decompressed speech is closest to the original speech under a specific cost function. The neural network may be a nonlinear function, unlike linear transformations used in common speech compression algorithms.

The transmission of bits for reconstructing the video and audio at the receiving end may be prioritized so that the most important bits may be transmitted or receive a higher quality of service. This may include but may not be limited to prioritizing audio over video, prioritizing of the model parameters over texture maps, prioritizing certain areas of the body or face over others, such as prioritizing information relevant to the lips and eyes of the user.

An optimization method may determine the allocation of bitrate or quality of service to audio, 3D model parameters, texture maps or pixels or coefficients that may be not part of the model in order to ensure an overall optimal experience. For example, as the bitrate is reduced, the optimization algorithm may decide to reduce the resolution or update frequency of the 3D model and ensure a minimal quality of the audio signal.

Encryption and Security of a 3D Model

A user's 3D model and corresponding texture maps may be saved on a user's device, a server on the cloud or on other users' devices. These models and texture maps may be encrypted in order to secure the personal data of the user. Before a call between several users, a user's device may request access to other users' 3D models and texture maps so that the device will be able to render the models of the other users based on their 3D geometry.

This process may include exchange of encryption keys at a high frequency, e.g., once every second, so that after the call ends, users will not be able to access other users' 3D models and texture maps or any other personal data.

A user will be able to determine which other users may have access to his/her 3D model and texture maps or any other personal data.

Furthermore, a user may be able to delete personal data that may be saved on the user's device, a remote computer, or other users' devices.

The 3D model and texture maps of a user that may be stored on the user's device or on a central computer may be used to authenticate that the person in front of the 2D or 3D camera may indeed be the user, and this may save the need to log in to the system or service with a password.

Another security measure may involve protecting access and usage (for example a display of the avatar during the 3D video conference) one or more avatars of one or more participant—this can be done by applying a Digital Rights Management method which enables the access and usage of avatar (or avatars)—or by using any other authentication-based access control to the access and/or usage of the avatar. The authentication may occur multiple times during a 3D video conference. The authentication may be based on biometrics, may require a password, may include face identification methods based on either 2D images, 2D videos (with motion) or based on 3D features.

Parallax Correction, Eye-Contact Creation and 3D Effects Based on a 3D Model.

The mentioned below correction may correct any deviations between the actual optical axis of the camera and a desired optical axis of a virtual camara. While some of the example refer to the height of the virtual camera, any of the following may also refer to the lateral location of the camera—for example positioning the virtual camera at the center of the display (both height and lateral location, positioning the virtual camara to have a virtual optical axis that is directed to the eyes of a participant (for example via a virtual optical axis that may be perpendicular to the display or have any other spatial relationship with the display).

Assuming that a certain user is imaged by a camera of the user—the other user devices may reconstruct the 3D model of that user from different angles than the angle that in which the original video (of the user) was grabbed by the camera.

For example, in many video conferencing situations, the video camera may be placed above or below the user's eye level. When a first user looks at the eyes of a second user as they are presented on the first user's screen, the first user does not look directly into the camera. Therefore, the image as captured by the camera and as presented to other users, would show the first user's eyes as gazing downwards or upwards (depending on the location and optical axis of the camera).

By rendering the 3D model from a point directly ahead of the user's gaze, the resulting image of the user may seem to look directly at the eyes of the other user.

Figure 8:
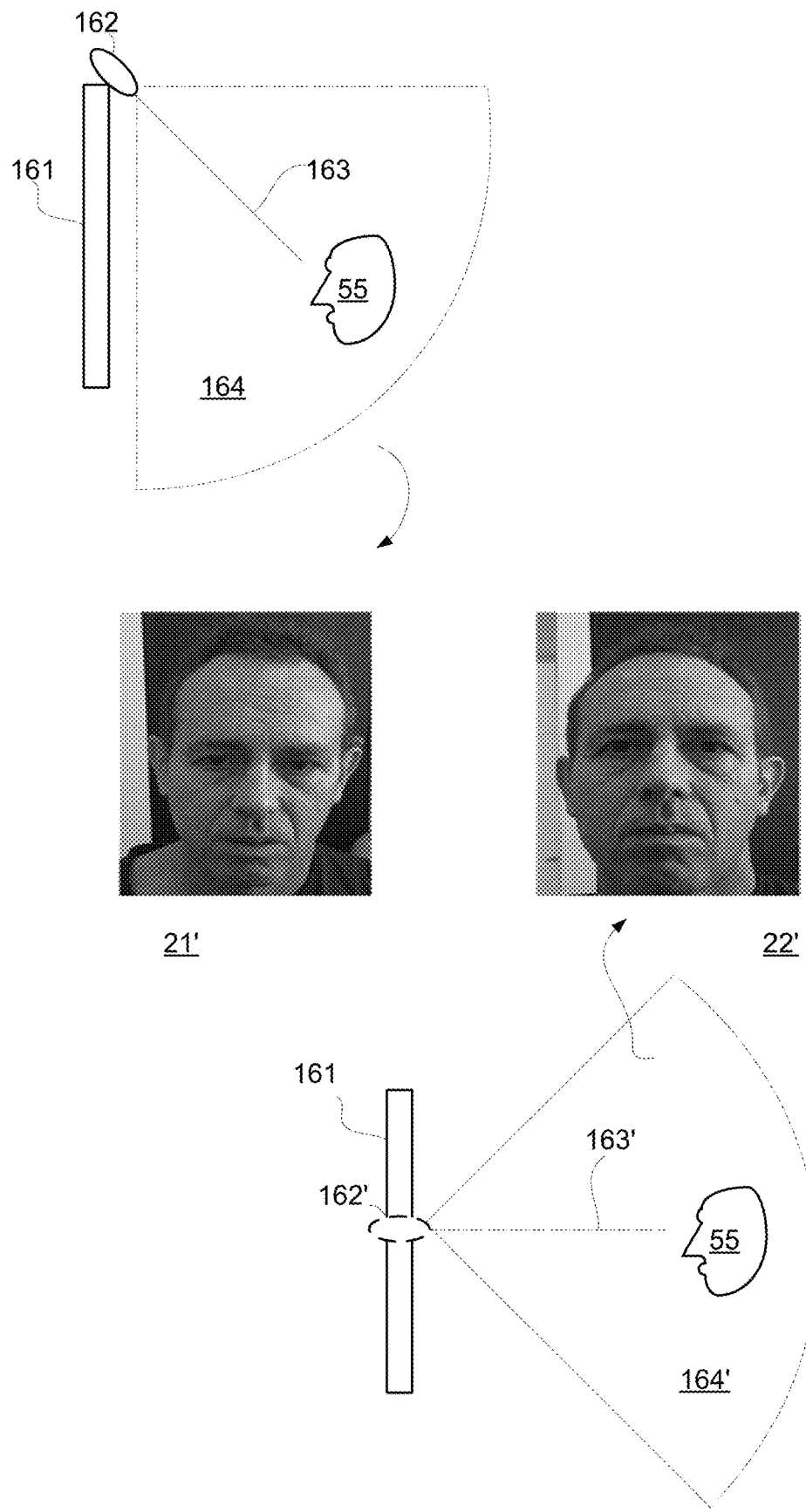
FIG. 8 is an example of parallax correction.

FIG. 8 illustrates an example of a parallax correction. Image 21' may be the image acquired by a camera 162 while the camera 162 is located on top of display 161 and has an actual optical axis 163 (directed towards a downright direction) and actual field of view 163 that may be directed towards fifth participant 55.

The corrected image 22' may be virtually acquired by a virtual camera 162' having a virtual optical axis 163' and a virtual field of view 163' the virtual camera may be located at the point of the screen at the height of the eyes and directly in front of the fifth participant 155.

A face location tracker may track the location of viewer's face and change the rendering point of view accordingly. For example, if the viewer moves to the right, he/she may see more of the left side of the opposite person and if he/she moves to the left, he/she may see more of the right side of the opposite person.

This may create a 3D sensation of viewing a 3-dimensional person or object, even while using a 2D screen.

FIG. 9 illustrates an example of a 3D illusion created by a 2D device. The image acquired by the camera (and the tracker's FOV) may be denoted 35 and various virtual images may be denoted 31, 32 and 33.

This may be obtained by modifying the rendered image according to movements of the viewer and the viewer's eyes, thus creating a 3D effect. In order to do this, an image of the viewer is acquired by a camera such as a webcam.

A face detection algorithm detects and tracks the face within the image. Additionally, the eyes of the viewer are detected and tracked within the face. As the face of the viewer moves, the algorithm detects the location of the eyes and calculates their position in a 3D world. A 3D environment is rendered from a virtual camera according to the location of the viewer's eyes.

If the rendered image is presented on a 2D screen, then only one image is rendered. This image of the 3D environment may be rendered from the point of view of a camera that is positioned in between the eyes of the viewer.

If the viewer uses a 3D display such as a 3D display or a virtual reality (VR) headset or glasses, then two images corresponding to the viewpoint of the right and left eyes may be generated to create a stereoscopic image.

FIG. 10 illustrates an example of two stereoscopic images (denoted 38 and 39) presented on a 3D screen or VR headset.

Some 3D displays such as auto-stereoscopic displays do not require glasses to present a 3D image. In such 3D displays the different images may be projected at different angles, e.g., using lenticular arrays, so that each eye views a different image. Some auto-stereoscopic displays, such as the Alioscopy Glasses-Free 3D Displays project more than 2 images at different angles, and up to 8 different images in the case of some Alioscopy displays. If using such a display, more than two images may be rendered to create the 3D effect on the screen. This brings a significant improvement over traditional 2D video conferencing systems in creating a more realistic and intimate sensation.

To enhance the 3D sensation, 3D audio can also be used. For each user, his/her location in the virtual 3D setting relative to all other users may be known. A stereophonic signal of each user's speech can be created from a monophonic audio signal by creating a delay between the audio signals for the right and left ears according to the relative position of the audio source. In such a manner, each user gets a sensation of the direction from which the sound originated and therefore who may be talking.

Furthermore, the images of the face of the users and specifically their lips may be used to perform lip reading.

Analysis of consecutive images of lips can detect movement of the lips. Such movement can be analyzed, for example, by a neural network that is trained to detect when lip movement is associated with talking. As input for the training phase, it is possible to have a sound analyzer or a human being tag input video sequences as having human sound. If the person is not talking, then the system may automatically mute that user and thus reduce background noise that may be coming from the environment of the user.

The lip reading may also be used to know which sounds may be expected to be produced by the user. This may be used to filter external noise that does not correlate with those expected sounds, i.e. not in the expected frequency range, and use this to filter background noise when the user may be talking.

Lip reading may also be used to assist in the transcription of conversations that may be carried on the system in addition to speech recognition methods that may be based only on audio.

This can be performed, for example by a neural network. The network is trained using video sequences of people speaking and associated text that was spoken during the sequences. The neural networks can be Recurrent Neural Networks, with or without LSTM or any other type of neural network. A method that may be based both on the audio and the video may result in improved speech recognition performance.

A face, body, and hands may be modelled using a limited number of parameters as explained above.

However, in real world video conferencing not all the pixels in the image correspond to the model of the face, body and hands. Objects that may be not part of the body may appear in the image.

As an example, a person speaking in a conference may be holding an object that is significant to the specific conference call or may not be significant at all. The speaker may be holding a pen which has no significance to the meeting or a diagram which is very significant to the meeting. To transmit these objects to the other viewers, they may be recognized and modelled as 3D objects. The model may be transmitted to the other users for reconstruction.

Some parts of the video image may not be modelled as 3D objects and may be transmitted to the other users as pixel values, DCT coefficients, wavelet coefficients, wavelet zerotrees or any other efficient method for transmitting these values. Examples include flat objects placed in the background such as a white board or a picture on a wall.

The video image and the model of the user may be compared, for example, but not limited to subtracting the rendered image of the model and the video image. This is done by rendering the model as if it was taken from the exact location of the actual camera. With perfect model and rendering the rendered image and the video image should be identical. The difference image may be segmented to areas in which the model accurately enough estimates the video image and areas in which the model may be not accurate enough or does not exist. All the areas that may be not modelled accurately enough may be transmitted separately as described above.

Under some circumstance, the system may decide that some objects viewed would not be modelled as mentioned above. In these cases the system may decide to transmit to viewers a video stream that would include at least some of the non-modelled parts and then the 3D models that exist would be rendered on top of the transmitted video in their respective locations.

The users may be provided with one or more views of the virtual 3D video conference environment—whereas the user may or may not select the field of view—for example, a field of view that includes all of the other users or only one or some of the users, and/or may select or may view one or some objects of the virtual 3D video conference environment such as TV screens, whiteboards, etc.

When combining the video pixels and the rendered 3D models, the areas corresponding to the model, the areas corresponding to the video pixels or both may be processed so that the combination may appear natural and a seam between the different areas would not be apparent. This may include but may be not limited to relighting, blurring, sharpening, denoising or adding noise to one or some of the image components so that the whole image appears to originate from one source.

Each user may use a curved screen or a combination of physical screens to that the user in effect can see a panoramic image showing a 180 or 360 degree view (or any other angular range view) of the virtual 3D video conference environment and/or a narrow field of view image focusing on part of the virtual 3D video conference environment such as a few people, one person, only part of a person, i.e. the person's face, a screen or a whiteboard or any one or more parts of the virtual 3D video conference environment.

The user will be able to control the part or parts of the narrow field of view image or images by using a mouse, a keyboard, a touch pad or a joystick or any other device that allows to pan and zoom in or out of an image.

The user may be able to focus on a certain area in the virtual 3D video conference environment (for example a panoramic image of the virtual 3D video conference environment) by clicking on the appropriate part in the panoramic image.

FIG. 11 illustrates an example of a panoramic view 41 of the virtual 3D video conference environment populated by five participants and a partial view 42 of the some of the participants within the virtual 3D video conference environment. FIG. 11 also illustrates a hybrid view 43 that includes a panoramic view (or a partial view) and expanded images of faces of some of the participants.

The user may be able to pan or zoom using head, eyes, hands, or body gestures. For example, by looking at the right or left part of the screen, the focus area may move to the left or right, so it appears at the center of the screen, and by leaning forward or backwards the focus area may zoom in or out.

The 3D model of the person's body may also assist in correctly segmenting the body and the background. In addition to the model of the body, the segmentation method will learn what objects may be connected to the body, e.g., a person may be holding a phone, pen or paper in front of the camera. These objects will be segmented together with the person and added to the image in the virtual environment, either by using a model of that object or by transmitting the image of the object based on a pixel level representation. This may be in contrast to existing virtual background methods that may be employed in existing video conferencing solutions that may not show objects held by users as these objects are not segmented together with the person but rather as part of the background that has to be replaced by the virtual background.

Segmentation methods typically use some metric that needs to be exceeded in order for pixels to be considered as belonging to the same segment. However, the segmentation method may also use other approaches, such as Fuzzy Logic, where the segmentation method only outputs a probability that pixels belong to the same segment. If the method detects an area of pixels with a probability that makes it unclear if it and it is not sure whether the area should be segmented as part of the foreground or background, the user may be asked how to segment this area.

As part of the segmentation process, objects such as earphones, cables connected to the earphones, microphones, 3D glasses or VR headsets may be detected by a method. These objects may be removed in the modelling and rendering processes so that the image viewed by viewers does not include these objects. The option to show or eliminate such objects may be selected by users or may be determined in any other manner—for example based on selection previously made by the user, by other users, and the like.

If the method detects more than one person in the image, it may ask the user whether to include that person or people in the foreground and in the virtual 3D video conference environment or whether to segment them out of the image and outside of the virtual 3D video conference environment.

In addition to using the shape or geometrical features of objects in order to decide whether they may be part of the foreground or background, the method may also be assisted by knowledge about the temporal changes of the brightness and color of these objects. Objects that do not move or change have a higher probability of being part of the background, e.g., part of the room in which the user may be sitting, while areas where motion or temporal changes may be detected may be considered to have a higher probability of belonging to the foreground. For example, a standing lamp would not be seen as moving at all and it would be considered part of the background. A dog walking around the room would be in motion and considered part of the foreground, In some cases periodic repetitive changes or motion may be detected, for example where a fan rotates, and these areas may be considered to have a higher probability of belonging to the background.

The system will learn the preferences of the user and use the feedback regarding which objects, textures or pixels may be part of the foreground and which may be part of the background and use this knowledge in order to improve the segmentation process in the future. A learning method such as a Convolutional Neural Network or other machine learning method may learn what objects may be typically chosen by users as parts of the foreground and what objects may be typically chosen by users as part of the background and use this knowledge to improve the segmentation method.

Automatic Exposure Control for Digital Still and Video Cameras

The segmentation of the user's face and body from the background may assist in setting the user's camera's exposure time so that the exposure may be optimal for the face and body of the user and may be not affected by bright or dark areas in the background.

Specifically, the exposure may be set according to the brightness of the user's face, so that the face may be neither too dark nor too bright and saturated.

Figure 12:
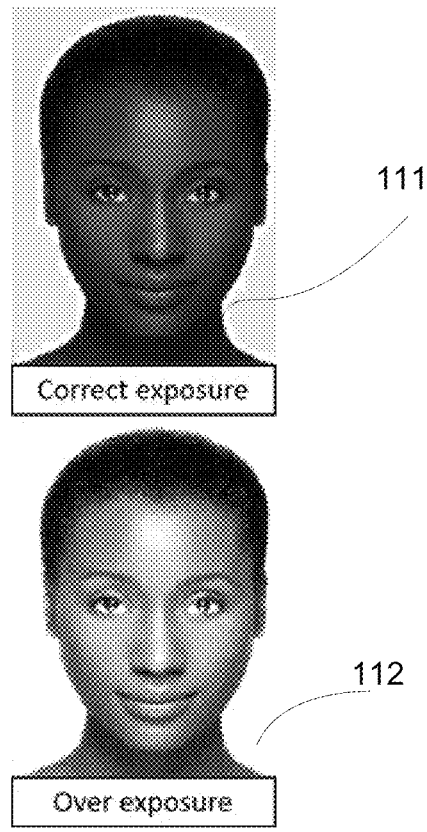
FIG. 12 is an example of images of different exposure and an example of images of faces of different shades.

In determining the correct exposure for a face that may be detected, there may be a challenge of knowing the actual brightness of the person's skin. It may be preferable not to over-expose the skin of people with naturally dark skins (see image 111 of FIG. 12) and turn them into fair-skinned faces in the over-exposed image—see image 112 of FIG. 12.

In order not to over-expose images of people with dark skin, the auto-exposure method may set the exposure according to the brightness level of the white of the eyes or the teeth of the user. The exposure of the camera may vary slowly and not change abruptly form frame to frame using some temporal filtering. Such a method would ensure that the resulting video may be not jittery. Furthermore, such a method may allow to set the exposure based on the brightness level of the eyes or teeth even when the eyes or teeth appear in some frames and are not appear in several other frames.

The detection of the face, eyes or teeth may be based on the 3D model and texture maps, on a method that detects these parts of the body or on a tracking method. Such methods may include algorithms such as the Viola Jones algorithm or neural networks that were trained to detect faces and specific facial parts. Alternatively, a fitting of the 2D image to a 3D model of the face may be performed, where the location of all the facial parts in the 3D model is known beforehand.

In another embodiment, the correct darkness of the skin can be estimated in a Hue, Saturation and Brightness color coordinate system. In such a coordinate system, the Hue and Saturation do not change as a function of the exposure and only the Brightness coordinate changes. It has been found that a correspondence can be found between the Hue and Saturation values of people in adequate exposures and the respective Brightness values of their skin. For example, pinkish skin tints correspond to fair-skinned faces and brownish tints correspond to dark skins—see for example images 121-126 of FIG. 12.

In yet another embodiment, a neural network such as a Convolutional Neural Network or any other network can be trained to identify the correspondence between the shape of the face and other attributes of the face and the skin brightness. Then at run time, images of a face at various exposures can be analysed independently of the chosen exposure and the detected attributes can be used to estimate the correct brightness of the skin which may be then used to determine the exposure of the camera that results in such a skin brightness.

A neural network may be trained to find this relation-function or correlation between the Hue and Saturation of the skin and the respective Brightness in properly exposed images. At the inference stage, the neural network would suggest the appropriate exposure for a picture based on the Hue and Saturation of the skin in an image that is not necessarily at the optimal exposure, e.g., is too bright or too dark. This calculated exposure may be used to grab an appropriately exposed image that is neither too dark nor too bright.

In yet another embodiment, users of a photographic device such as a mobile phone, professional camera, or webcam may be asked once to take a photo of themselves or other people with a white paper or other calibration object for reference. This calibration process may be used to determine the correct hue, saturation and brightness values of the skin of those people. Then at run time, a computation device can run a method that recognizes the given person and adjusts the exposure and white balance so that the person's skin corresponds to the correct skin color as found in the initial calibration process.

Performing Calculations on the Cloud

The processing of this system may be performed on the user's device such as a computer, a phone or a tablet or on a remote computer such as a server on the cloud. The computations may also be divided and/or shared between the user's device and a remote computer, or they may be performed on the user's device for users with appropriate hardware and on the cloud (or in any other computation environment) for other users.

The estimation of the body and head parameters may be done based on compressed or uncompressed images. Specifically, they can be performed on compressed video on a remote computer such as a central computer on the cloud or another user's device. This would allow normal video conferencing systems to send compressed video to the cloud or another user's computer where all the modelling, rendering and processing would be performed.

Using Multiple Screens and Channels to Present Information in a Video Conferencing Application and Methods for Increasing the Efficiency of Meetings The virtual meeting may appear to take place in any virtual environment such as a room, any other closed environment, or in any open environment. Such an environment may include one or more screens, whiteboards or flipcharts for presenting information. Such screens may appear and disappear, may be moved, enlarged and reduced in size according to the users' desire.

Multiple participants may share their screen (or any other content) to more than one screen. This means that multiple sources of information may be viewed simultaneously.

Materials for sharing or presentation may be pre-loaded to such screens or to a repository before the meeting begins for easy access during the meeting.

One possible method of presenting the different materials is by transmitting them over dedicated streams—one for each presented material. In this setting, streams may be assigned to viewers based on many criteria. For example, a stream may be assigned specifically to one or more viewers. Alternatively, streams may be assigned according to topics or other considerations. In such cases, the viewed stream may be selected by each viewer. This can be quickly done by using the keyboard, the mouse or any other device. Such selection may be much faster than the common practice of sharing one's content which currently may require requesting permission to share a screen from the meeting's manager, receiving such permission, clicking a "screen share" button and selecting the relevant window to share.

Such "screen sharing" processes may take (for example) up to a minute. In various applications "screen sharing" may be repeated many times by many different participants that present their material and a lot of valuable time may be lost. The suggested solution may reduce the duration to several seconds.

In some instances, not all the participants in a meeting or the screens or other interesting objects in the 3D virtual environment may appear concurrently on the viewer's screen. This might happen, for example, if the field of view of the screen is smaller than a field of view needed to view all the participants. In such a case it may be necessary to move the field of view of a viewing user to the right, left, forwards, backwards, up or down in order to change the point of view and see different participants or objects. This can be achieved by different means, such as but not limited to:
  a. Using the keyboard arrows or other keys to pan and tilt the viewpoint or to zoom in and out.
  b. Using the mouse or other keys to pan and tilt the viewpoint or to zoom in and out.
  c. Using a method that tracks the user's head position or eye gaze direction or a combination of both to pan and tilt the viewpoint or to zoom in and out. The input to the method can be a video of the user from a webcam or any other 2D or 3D camera or any other sensor such as an eye-gaze sensor.
  d. Using a method that tracks the user's hands to pan and tilt the viewpoint or to zoom in and out. The input to the method can be a video of the user from a webcam or any other 2D or 3D camera or any other sensor such as an eye-gaze sensor.
  e. Determining who may be the speaker at any moment and pan, tilt and zoom in on that speaker at any given moment. If several people may be speaking at the same time, then the method can determine who may be the dominant speaker and pan and tilt to that speaker or may zoom out to a wide field of view in which several speakers may be shown.

The calculations required for creating the avatars in the virtual 3D video conference environment may be performed on a user's computing device, in the cloud or in any combination of the two. Specifically, performing the calculations on the user's computing device may be preferable to ensure faster response time and less delay due to communications with a remote server.

Two or more 2D or 3D cameras may be placed in different positions around the user's screen, e.g., integrated at the borders or corners of the user's screen, so that there may be simultaneous views of the user from different directions in real time. The 2D or 3D views from different directions can be used to create a 3D textured model that corresponds to the user's appearance in real time.

If the cameras are 3D cameras, then the 3D depth obtained by the cameras can be merged into a 3D model which would be more complete than a model obtained from only one camera, as the two or more cameras capture additional areas to what can be captured with only one camera.

Since the cameras are located at different places, they obtain slightly different information about the user and each camera may be able to capture areas that are hidden and unseen by other cameras. If the cameras are 2D cameras, then different methods may be used to estimate a 3D model of the user's face. For example, photogrammetric methods may be used to achieve this task. Alternatively, a neural network may be used to estimate a 3D model which would produce the images as captured by the cameras.

The color images, as captured by the cameras, may be used to create a complex texture map. This map would then cover more areas than can be captured by only one camera. Multiple texture maps as obtained from each camera, may be stitched together while averaging the overlapping areas, to create one more comprehensive texture map. This may also be performed by a neural network.

This real-time 3D textured model can then be used to render the view of the user from various angles and camera positions and specifically may be used to correct the viewing position of the virtual camera as if it were virtually located inside the screen of the user—for example—at a virtual location positioned at location that a height and/or lateral location coordinate of at the participant's eyes.

The virtual location may be positioned within an imaginary plane that virtually crosses the eyes of the participant—the imaginary plane may (for example) be normal or substantially normal to the display. In this way, a sensation of eye contact may be created for the real time video of the users. The real-time 3D textured model may also be relighted differently than the lighting of the real person in the real environment, to create a more pleasant illumination, e.g., an illumination with less shadowing.

A speech recognition or Text to Speech method or neural network may be applied to the audio streams to summarize the contents of the conversation taking place in a virtual meeting. For example, a neural network may be trained on full body texts and their respective summaries. Similarly, a neural network can be trained to produce a list of action items and assignees.

In order to facilitate the process, and assist the neural network in reaching decisions, a human may signify the relevant parts of the text for the summary of the task list. This may be done in real time, in proximity to when the relevant text is spoken. The summary and list of action items may be distributed to all the meeting's attendees or to any other list of recipients. This can be used to enhance the meeting and increase its productivity.

A digital assistant may also assist in controlling the application, e.g., to assist in inviting recipients, presenting information to screens or to control other settings of the application.

A digital assistant may be used to transcribe the meeting in real time and present the transcription on users' screens. This may be very useful when the audio received at the remote participants' side may be deteriorated due to echoes or to an accent that may be hard to understand or to problems with the communications network such as low bandwidth or packet loss.

A digital assistant may be used to translate the speech from one language to another language in real time and present the translation on users' screens. This may be very useful when the participants speak different languages. Furthermore, a Text To Speech (TTS) engine may be used to create an audio representation of the translated speech. A neural network, such as a Generative Adversarial Network or Recursive Neural Network can be used to create a naturally sounding speech and not a robotic speech. Such a network may also be trained and then used to create a translated speech that has the same intonation as in the original speech in the original language.

Another neural network such as a Convolutional Neural Network may be used to animate 3D models' faces and lips to move according to the generated translated speech. Alternatively, a GAN or other network may be used to generate 2D image sequences of faces and lips moving according to the generated translated speech. For this, a neural network can be trained to learn lip movement and face distortions as they relate to speech. Combining all the processes described above, an image sequence and corresponding audio of a person speaking in one language may be transformed into an image sequence and corresponding audio of a person speaking in another language, where the audio sounds natural and the image sequence corresponds to the new audio, i.e. the lip movements may be in synchronization with the phonemes of the speech.

Such a system as described above may be used but may be not limited to video conferencing applications, television interviews, automatic dubbing of movies or e-learning applications.

Method for Precise 3D Tracking of Faces Via Monocular RGB Video

To track the user's facial pose and expressions a method for precise 3D tracking of faces via monocular RGB video input (without depth) may be beneficial. The method needs to detect 3D movements of faces in a video in relation to the camera as well as various expressions, e.g., smiles, frowns and neck pose changes.

Typically monocular video based face tracking may be done using a sparse set of landmarks (as in dlib based landmarks, HR-net facial landmarks and Google's media pipe landmarks).

These landmarks may be typically created using a sparse set of user annotated images, or synthetically using parametric 3D models.

The limitations of these traditional methods are:
a. Lack of landmarks in certain areas (ears, neck).
b. Sparseness of landmarks.
c. Precision and stability of the landmarks.
d. Temporal coherence.
e. Mapping the landmarks to a 3D model.

The input to the suggested method may be a 2D monocular video, a templated 3D model of a face (general) with deformation model (per person or general) for this 3D template (specified below) together with an approximation (specific parameters) of the tracked parameters of the first frame of the video: approximated deformation parameters (of the person) in the video and an approximated camera model.

A 3D face template mesh (templated 3D model)—may include a coarse triangular mesh of a generic human face. By coarse, we mean in the order of 5K or 10K polygons, which may be sufficient to represent the general shape but not wrinkles, microstructures or other fine details.

A 3D face deformation model for the template may include a standard parametric way to deform the template and change the general shape of the 3D mesh (jaw structure, nose length, etc), the expression of the face (smile, frown, etc) or the rigid position and orientation of it, based on positions and cues found in the images. The user of the method can choose to use a statistical 3DMM as a deformation model, such as the Basel Face Model/Facewarehouse/Flame models and/or use deformation priors such as As-Rigid-As-Possible, elasticity or isometry objectives.

Approximated deformation parameters of the person in the video and an approximated camera model can be found by standard 3DMM fitting techniques, for example by using a face landmark detection method to detect known face parts parameters and optimize the camera and pre-annotated landmarks in a least-squared sense. The initialization does not need to be precise but only approximated and can be generated via commonly known techniques.

The output of our method may be the geometry (deformation parameters and mesh models) per-frame, and a set of approximated camera parameters for each image.

At each frame, the deformed mesh will be referred to as the current 3D face mesh, and its deformation parameters on top of the template may be chosen based on a set of landmarks deduced from the 2D face parts segmentation and the pre-annotated segmentation. To that end, the suggested method may use a 2D face parts segmentation method, in conjunction with a classical 2D rigid registration technique utilizing an ICP (Iterative Closest Point) method to track and deform a model of a 3D face based on an input RGB monocular video.

The suggested method builds upon common face parts segmentation networks, that annotate each pixel with a given face part.

Figure 13:
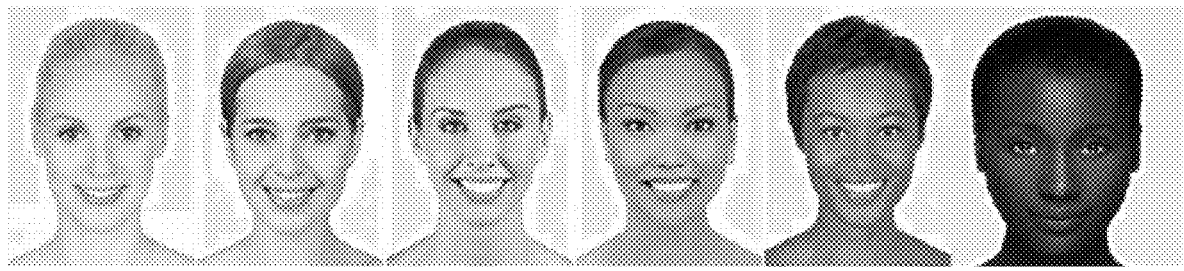
FIG. 13 is an example of an image of a face and a segmentation of the image.

FIG. 13 illustrates face segmentation. Input image 131 may be a color image acquired by a camera. Image 132 illustrates a segmentation of different face parts, visualized by different colors.

In addition, the triangular mesh template may be pre-annotated with a predefined annotation of face parts (e.g. nose, eyes, ears, neck, etc). The mesh annotation may assist in finding correspondences between various face parts on the 3D model to face parts on a given target image. The face parts annotation may be done only once on the 3D template, such that the same annotation can be used for multiple people automatically. The annotation can be specified by listing the triangle belonging to each face part, or by using UV coordinates for the mesh along with a 2D texture map for colouring face parts in different colors as in FIG. 12.

Figure 14:
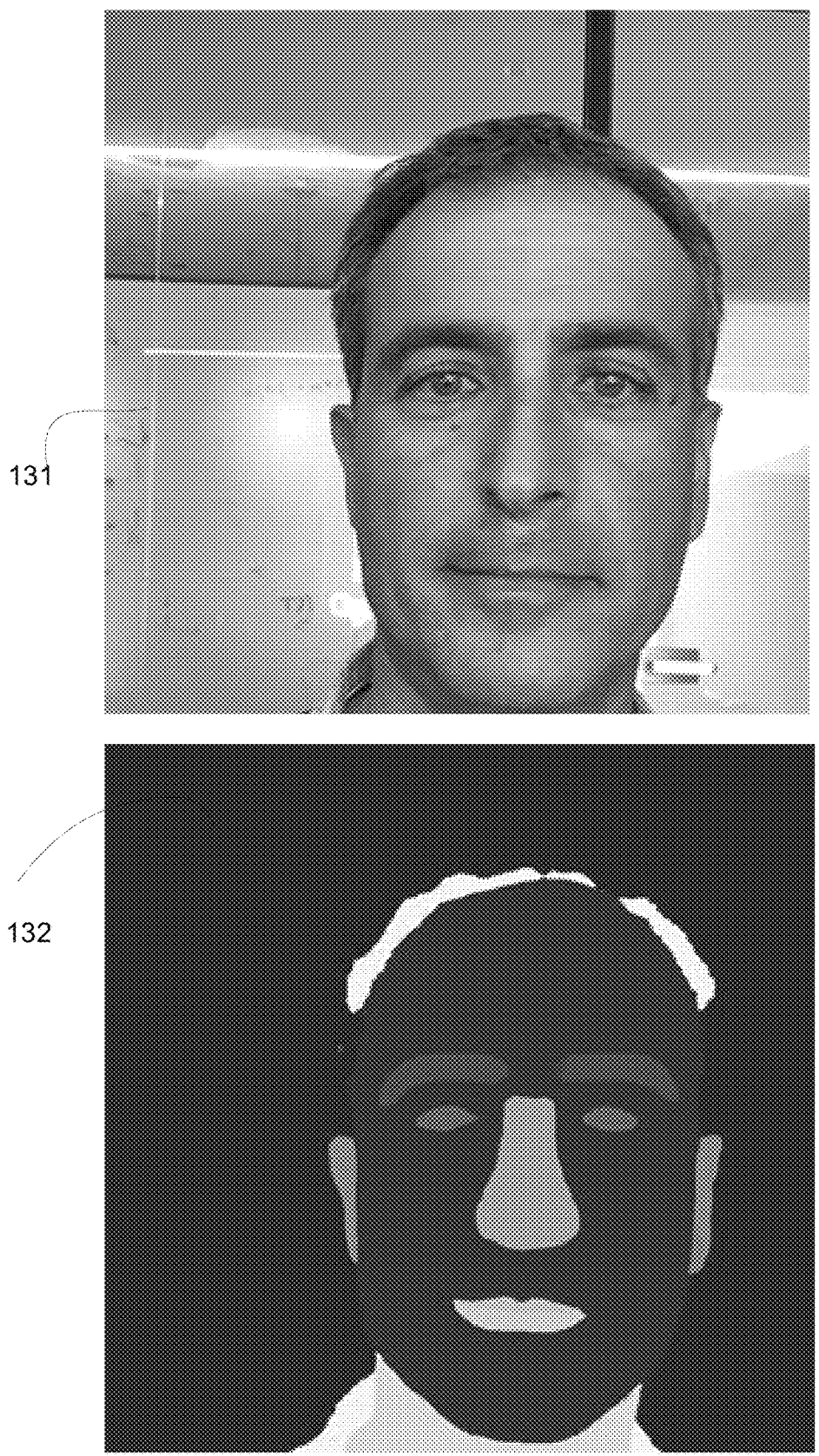
FIG. 14 illustrates an example of a method.

FIG. 14 illustrates method 1700.

The method may perform the following process for each pair of consecutive video frames (noted as first image and second image)—including one or more iterations of steps 171-175.

Step 171 may include computing the current 2D positions of various face parts landmarks in first image given the current 3D face mesh and camera parameters.

Step 171 may include using the previous iteration's model of the deformed face mesh and the camera screen space projection parameters, the method uses the camera's extrinsic and intrinsic parameters to perform a perspective projection on the 3D face mesh to get the 2D screen space pixel locations of each visible annotated face part vertex. Using the 3D pre-annotation (FIG. 15—see 3D model 141 and UV map 142) the method finds the 2D position of vertices in each face part by matching the annotations.

Step 172 may include computing the 2D location of various face parts landmarks in second image.

Step 172 may include performing a face parts segmentation method to annotate each pixel of the image—if the pixel doesn't belong to the background the method saves the specified face part it belongs to (eyes, nose, ears, lips, eyebrows, etc) as an annotation.

Step 173 may include computing 2D→2D dense correspondences between the first image face parts' 2D locations and the second image face parts 2D locations.

Step 173 may include finding, for each face part, correspondences between the first image face part points and the second image ones by running a symmetric ICP method (https://en.wikipedia.org/wiki/Iterative_closest_point). The ICP method iteratively goes between two steps: in the first step one finds correspondences between a first image shape and a second image shape, greedily by choosing for each point in the first image shape, the closest point on the second image shape. In the second step one optimizes and finds a rotation and translation that optimally transforms the first image points to the second image points in the least-squares sense. To find an optimal solution, the process repeats these two steps until convergence which occurs when a convergence metric is satisfied.

Here the first image shape may be the current 2D positions of various face parts and the second image may be the 2D locations given by the segmentation map (see explanation above). The ICP rigid fit may be done separately for each face part. For example, for each visible projected nose pixel in first image we find a corresponding pixel on the second image nose, given by the face parts segmentation on the target image.

Step 174 may include computing 3D→2D dense correspondences between first image 3D locations and second image 2D locations.

Step 175 may include deforming the face mesh to match the correspondences.

Step 174 may include using a rasterizer and the given camera parameters to back-project 2D pixels rendered from the 3D face mesh and first image camera model back to their 3D location on the mesh, specified by barycentric coordinates. Thus, the method creates correspondences between face part points in 3D on the mesh, to a second image location in 2D under the camera's perspective projection.

Step 175 may include using a deformation model (e.g., a 3DMM as explained above) to deform the face mesh and change the camera parameters such that the projection of the first image 3D features matches the 2D locations of the second image 2D locations, as in a typical sparse landmarks and camera fitting.

Steps 171-175 may be repeated until a convergence metric is satisfied.

For example—as in a correspondence and fitting procedures, the above steps may be repeated until convergence: at each step we find different and better correspondences and optimize for them. Convergence is achieved when a convergence metric is satisfied.

This method creates a set of landmarks in areas and face parts that may not be covered by traditional landmark methods, like ears, necks and forehead and this is due to the use of the 3D mesh. The method creates a dense set of landmarks and the dense correspondences require almost no annotation except for a one-time annotation of the face parts in the 3D model template. The method creates a dense set of high-quality landmarks, that may be temporarily coherent due to the regression which is performed. Coherence in this context means that the landmarks do not jitter between frames.

It also allows to get landmarks on various faces or body parts e.g., ears and neck, by simply employing common segmentation/classification methods.

FIG. 16 may be an illustration of the 2D-to-2D dense correspondences computation on the upper lips (pixels colored the same in both images correspond to each other).

Figure 17:
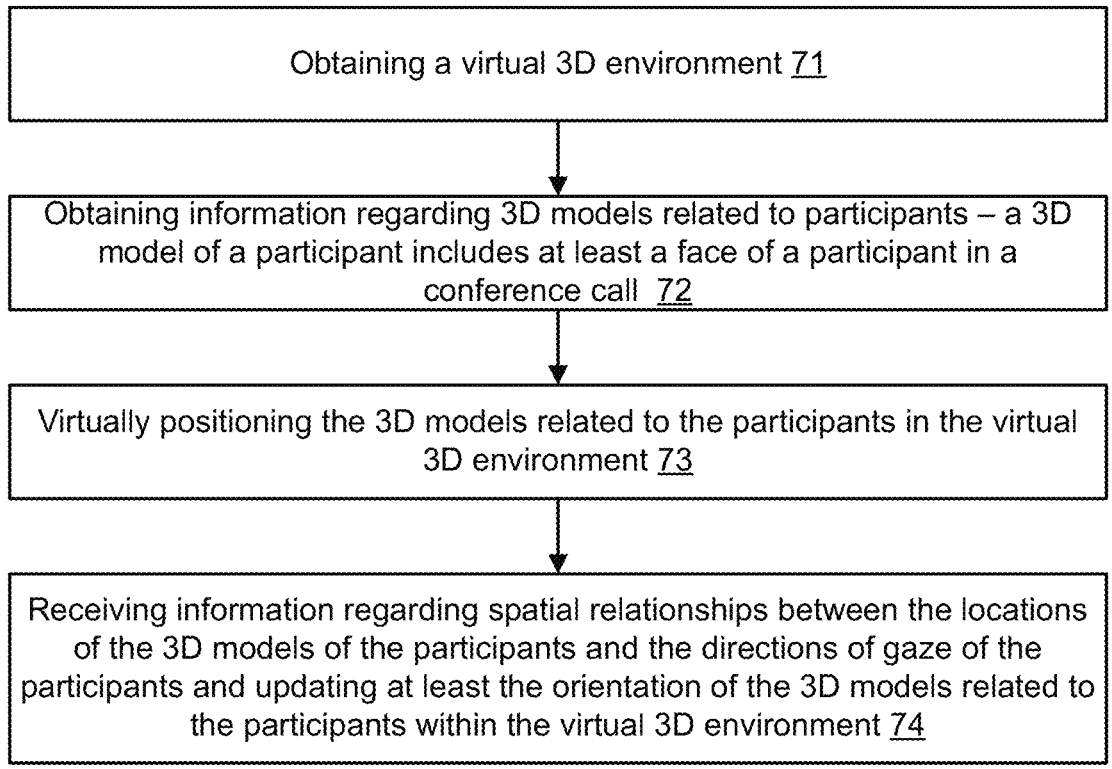
FIG. 17 is an example of a method.

FIG. 17 illustrates a method that include a sequence of steps, 71, 72, 73 and 74.

Step 71 may include obtaining a virtual 3D environment. This may include generating or receiving instructions that once executed will cause the virtual 3D environment to be displayed to users. The virtual 3D environment can be a virtual 3D video conference environment or may differ from a virtual 3D video conference environment.

Step 72 may include obtaining information regarding avatars related to participants—an avatar of a participant includes at least a face of a participant in a conference call. An avatar of the participant may be received once, once or more per period, once or more per conference call.

Step 73 may include virtually positioning the avatars related to the participants in the virtual 3D environment. This can be done in any manner, based on previous sessions of the participants, based on metadata such as job title and/or priority, based on the roles in the conference call—for example initiator of the call, based on preferences of the participants, and the like. Step 73 may include generating a virtual representation of the virtual 3D environment populated by the avatars of the participants.

Step 74 may include receiving information regarding spatial relationships between the locations of the avatars of the participants and the directions of gaze of the participants and updating at least the orientation of the avatars related to the participants within the virtual 3D environment.

Figure 18:
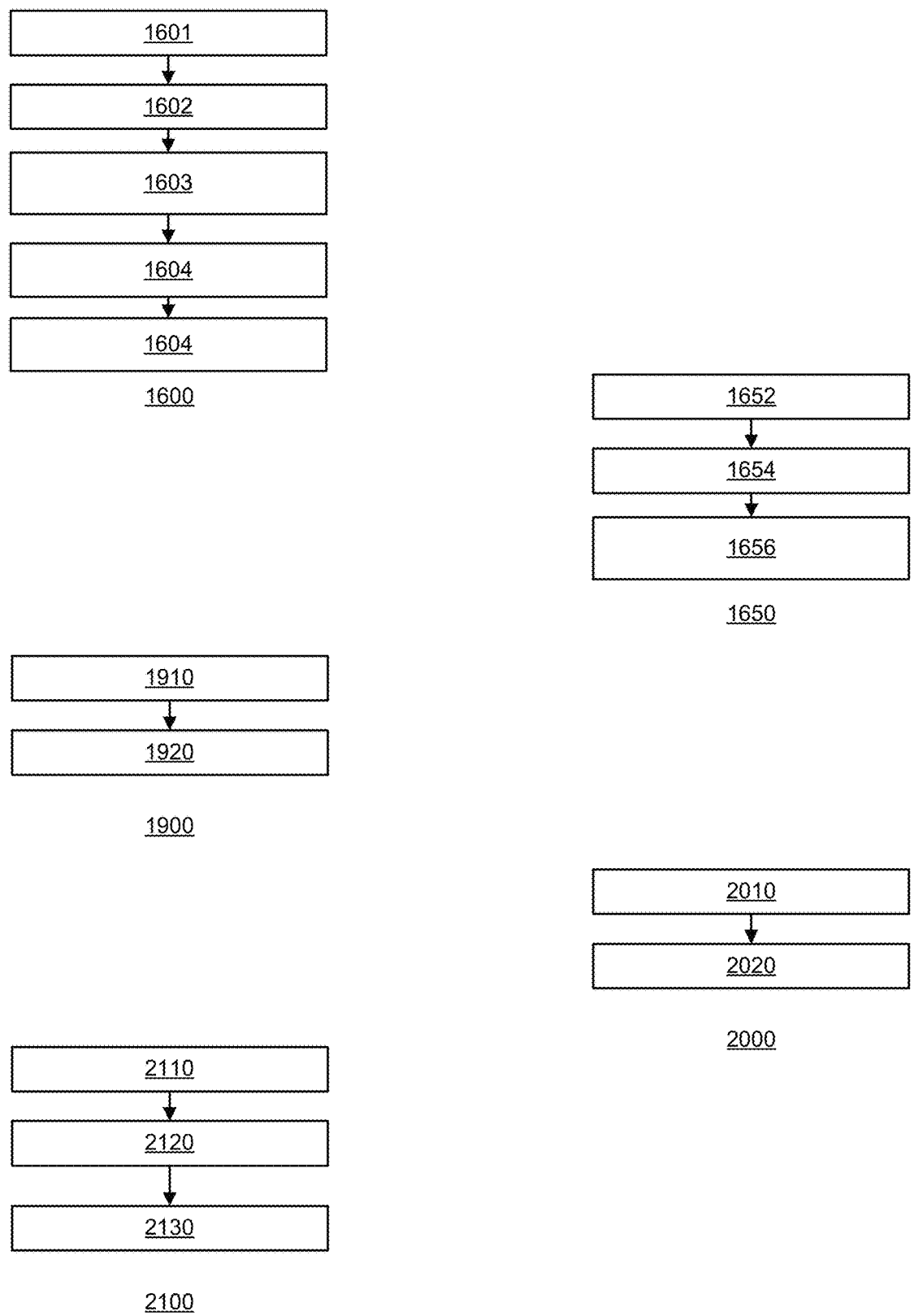
FIG. 18 is an example of methods.

FIG. 18 illustrates method 1600.

Method 1600 may be for updating a current avatar of a person, and may include steps 1601, 1602, 1603, 1604 and 1605.

Step 1601 may include calculating current locations, within a two dimensional (2D) space, of current face landmark points of a face of a person. The calculating may be based on the current avatar, and one or more current acquisition parameters of a 2D camera; wherein the current avatar of the person may be located within a 3D space.

Step 1602 may include calculating target locations, within the 2D space, of face landmark points of the face of the person; the calculating of the target locations may be based on one or more images acquired by the 2D camera.

Step 1603 may include calculating correspondences between the current locations and the target locations.

Step 1604 may include calculating, based on the correspondences, locations of the face landmark points within the 3D space.

Step 1605 may include modifying the current avatar based on the locations of the face landmark points within the 3D space.

The current face landmark points may be only edge points of the current face landmarks.

The current face landmark points may include edge points of the current face landmarks and non-edge points of the current face landmarks.

The calculating of the correspondences may include applying an iterative closest point (ICP) process, wherein the current locations may be regarded as source locations.

The locations of the target face landmark points within the 3D space may be represented by barycentric coordinates.

The current avatar may include a reference avatar and a current 3D deformation model, wherein the modifying of the current avatar may include modifying the current 3D deformation model without substantially modifying the reference avatar.

The current 3D deformation model may be a 3D morphable model (3DMM).

The method may include repeating, for a current image and until converging, steps 1601-1605.

Step 1602 may include segmentation.

FIG. 18 also illustrates an example of method 1650 for conducting a 3D video conference between multiple participants.

Method 1650 may include steps 1652, 1654 and 1656.

Step 1652 may include receiving initial 3D participant representation information for generating the 3D representation of the participant under different circumstances. This receiving may be based on videos or images of the participant acquired specifically for video conferencing or for other purposes. The received information may also be retrieved from additional sources such as social networks and the like. The participant information may be related to the participants of a conference call—for example a first participant and a second participant.

Step 1654 may include receiving, by a user device of a first participant and during the 3D video conference call, second participant circumstances metadata indicative of one or more current circumstances regarding a second participant.

Step 1656 may include updating, by the user device of the first participant, a 3D participant representation of the second participant, within a first representation of virtual 3D video conference environment.

The different circumstances may include at least one out of different image acquisition conditions, different directions of gaze, different viewpoints of a viewer, different expressions, and the like.

The initial 3D participant representation information may include an initial 3D model and one or more initial texture maps.

FIG. 18 also illustrates an example of method 1900 for conducting a 3D video conference between multiple participants.

Method 1900 may include steps 1910 and 1920.

Step 1910 may include determining, for each participant and multiple times during the 3D video conference, updated 3D participant representation information within the virtual 3D video conference environment.

Step 1920 may include generating, for at least one participant and multiple times during the 3D video conference, an updated representation of a virtual 3D video conference environment, the updated representation of virtual 3D video conference environment represents the updated 3D participant representation information for at least some of the multiple participants.

The 3D participant representation information may include a 3D model and one or more texture maps.

The 3D model may have separate parameters for shape, pose and expression.

Each texture map may be selected and/or augmented based on at least one out of shape, pose and expression. The augmentation may include, modifying values due to lighting, facial make-up effects (lipstick, blush and the like . . . ), adding or removing facial hair features (such as beard, moustache), accessories (such as eyeglasses, ear buds) and the like.

Each texture map may be selected and/or augmented based on at least one out of shape, pose, expression and angular relationship between a face of the participant and an optical axis of a camera that captures an image of face of the participant.

The method may include repetitively selecting for each participant, a selected 3D model out of multiple 3D models of the participant; and smoothing a transition from one selected 3D model of the participant to another 3D model of the participant.

Step 1910 may include at least one out of:
  a. Using one or more neural network for determining the updated 3D participant representation information.
  b. Using multiple neural networks for determining the updated 3D participant representation information, wherein different neural networks of the multiple neural networks may be associated with different circumstances.
  c. Using multiple neural networks for determining the updated 3D participant representation information, wherein different neural networks of the multiple neural networks may be associated with different resolutions.

The method may include selecting an output of at least one neural network of the multiple neural networks based on a required resolution wherein the multiple neural networks operate on different output resolutions and the one with the resolution that is closest to the required resolution is selected.

FIG. 18 further illustrates an example of method 2000 for conducting a 3D video conference between multiple participants.

Method 20 may include steps 2010 and 2020.

Step 2010 may include determining, for each participant, updated 3D participant representation information within the virtual 3D video conference environment, that represents participant. The determining may include estimating 3D participant representation information of one or more hidden areas of a face of a participant that may be hidden from the camera that captures at least one visible area of the face of the participant.

Step 2020 may include generating, for at least one participant, an updated representation of virtual 3D video conference environment, the updated representation of virtual 3D video conference environment represents the updated 3D participant representation information for at least some of the multiple participants.

The method may include estimating 3D model hidden areas and one or hidden parts texture maps.

The estimating 3D participant representation information of one or more hidden areas may be executed by using one or more generative adversarial networks.

The method may include determining a size of the avatar.

Multi-Resolution Neural Networks for Rendering 3D Models of People.

In a 3D virtual meeting application there may be a need to present participants of the 3D virtual video conference with very high quality in the virtual 3D video conference environment. To achieve a high realism level, neural networks may be used to create a 3D model of the head and body of each participant. A neural network may be also used to create a texture map of the participants and the 3D model and texture maps can then be rendered to create an image of the participants that can be viewed from different angles.

If there are more than two participants in the meeting, then each participant may wish to zoom-in and out in order to see other participants from close-up or rather zoom-put to see many or all of the participants in the meeting.

Using a neural network to create the 3D model and texture maps of the participants may be typically a computationally intensive operation. Running the neural network many times for rendering the images of many participants may not be scalable and may not be possible using a standard computer as the number of needed computations may be high and the computer's resources may be exhausted without achieving real-time rendering. Alternatively, it may be very costly using a network of computers on the cloud.

According to this embodiment, a set of networks may be trained to produce 3D models and texture maps at different levels of detail (number of polygons in the 3D model and number of pixels in the texture map).

For example, very high-resolution networks may create a 3D model with 10,000 polygons and a 2D texture map with 2000×2000 pixels. A high-resolution network may create a 3D model with 2500 polygons and a 2D texture map with 1000×1000 pixels.

A medium-resolution networks may create a 3D model with 1500 polygons and a 2D texture map with 500×500 pixels. A low-resolution network may create a 3D model with 625 polygons and a 2D texture map with 250×250 pixels.

In an embodiment, all these networks can be one network with several outputs after a varying number of layers. For example, the output of the final network would be a texture map with 2000×2000 pixels and the output of the previous layer would be a texture map with 1000×1000 pixels.

During run-time, the software determines what would be the size of the image of each participant in the meeting according to the zoom level that the user may be using.

According to the required size following the zoom level, the method determines which networks should be used to create the 3D model and the 2D texture map with the relevant level of details. In this way, smaller figures require a lower resolution network that results in a lower number of calculations per network. Accordingly, the total number of calculations required to render the images of many people would be reduced compared to the running of many full resolution networks.

According to an embodiment a texture map of a face of the person can be generated based on texture maps of different areas of the face.

One of the texture maps of an area of the face (for example of a face landmark, of an eye, mouth, and the like) may be of a higher resolution (more detailed) than from a texture map of another area of the face (for example the area between the eye and nose may have a higher resolution than the cheeks or forehead). See, for example FIG. 20 in which a higher resolution texture map of the eyes may be added to lower resolution texture maps of other areas of the face to provide a hybrid texture map 2222.

The texture maps of the different areas may be of two or more different resolution levels. The selection of the resolution per texture map may be fixed or may change over time. The selection may be based on priorities of the different areas. The priority may change over time.

According to another embodiment, texture maps of different areas of the face may be updated and/or transmitted at different frequencies according to the frequency of change of those areas. For example eyes and lips may change more frequently than nostrils or eyebrows. Accordingly, the texture maps of the nostrils and eyebrows may be updated less often that those for eyes and lips. This way the number of calculations is further reduced—in comparison to a situation in which the texture maps of the nostrils and eyebrows are updated at the higher frequency of update of the texture maps of the eyes and lips.

The resolutions of the different face area texture maps may be based on an additional parameter such as available computational resources, memory resource status, and the like.

The generating of the texture map of the face from texture maps of different areas of the face may be executed in any manner and may include, for example, smoothing the borders between the different texture maps of the different areas, and the like. Any reference made to the face may be applied mutatis mutandis to the entire person or to any other body organ of the person.

FIG. 18 also illustrates an example of method 2100 for generating a texture map used during a video conference such as a virtual 3D conference.

Method 21 may include steps 2110, 2120 and 2130.

Step 2110 may include obtaining (for example generating or receiving in any manner) multiple texture maps of multiple areas of at least a portion of a 3D object; wherein the multiple texture maps may include a first texture map of a first area and of a first resolution, and a second texture map of a second area and of a second resolution, wherein the first area differs from the first area and the first resolution differs from the second resolution.

Step 2120 may include generating a texture map of the at least portion of the 3D object, the generating may be based on the multiple texture maps.

Step 2130 may include utilizing the visual representation of the at least portion of the 3D object based on the texture map of the at least portion of the 3D object during the video conference.

Multi-View Texture Maps

There may be provided generating highly realistic faces—it may be applicable to other objects.

Generating high-quality and very realistic images and videos or faces and bodies may be a general problem in computer graphics.

This can be applied to the creation of movies or to computer games among other uses.

It can also be applied for creating a 3D video conferencing application in which users may be seated in a common space and 3D avatars represent the participants and move and talk according to the actual movements of the users as captured by a standard webcam.

To create a realistically looking 3D representation of a face, head or body, 3D models and 2D texture maps may be created offline, and then rigged. Rigging means creating handles in the 3D model that enable moving different parts of the model, much like muscles do in a real body.

The 3D model and texture maps should include views of the external parts of the body and face but also internal parts such as the mouth, teeth and tongue. They should enable to move body parts such as the eyelids to present open and closed eyes.

To create highly realistic looking images or videos, very high-level 3D models may be used—typically with up to 100,000 polygons in a model of a head.

In addition, the texture maps should include descriptions of all the internal and external body/head parts in high resolution.

In addition to the texture maps, material maps or reflectivity maps may be needed in order to enable the rendering engine to simulate non uniform (non-Lambertian) reflections of light from the body and face, for example reflections from a moist or oily skin or from the glossy eyes.

Creating such 3D models and 2D texture and material maps typically requires a well-equipped studio with many cameras and controlled lighting. This limits the use of these models to offline and post-production use cases.

Due to all this, rendering a highly realistic body and head may be a complex process that requires many calculations. Such an amount of calculations may not be able to be processed on any standard computer at real time and at a high frame rate (at least 30 frames per second).

This problem becomes even more serious if many bodies and heads need to be rendered in each image, for example, if there may be many participants in a 3D meeting.

Instead of using a 3D model with a very high number of polygons, texture maps with many options for internal and external parts and material/reflection maps, there is provided an alternative solution that would require much fewer calculations and also enable the real-time rendering of many bodies and faces.

The solution may be based on capturing images or videos of a person from various points of view, e.g., from the front, sides, back, top and bottom.

This can be done by scanning the head with a handheld mobile phone camera or by turning the head in front of a fixed camera such as a webcam or a mobile phone camera fixed on a tripod or any other device. Images of the person may also be acquired by other methods and other sources, including extracting from social networks or other Internet resources, using scanned photographs of the person and the like, During the scanning process, the person may be asked to perform different facial expressions and talk. To scan a whole body, the user may be asked to pose in different body poses or to move and change poses continuously.

The images that are collected in this process may be used to train a neural network or several neural networks that produce a 3D model of the head and/or body as a function of the required pose and expression and as a function of the viewpoint.

In addition, a viewpoint dependent texture map may be produced as a function of the required pose and expression and as a function of the viewpoint.

The 3D model and texture map may be used to render an image of the head and/or body or the person.

Since the 2D texture map that is outputted by the neural network may be dependent on at least one of viewpoint, pose and expression, it should only include the information that may be relevant to rendering the image from that at least one of viewpoint, pose and expression. This enables the 3D model of the head or body to be less accurate as missing 3D details such as skin wrinkles may be compensated by the fact that those details appear in the 2D texture image. Similarly, there may be no need to create a rigged model of open or closed eyelids as the texture of an open or closed eyelid may be found in the 2D image and projected on the 3D model.

In fact, the 3D model can be highly inaccurate as it omits many facial details and does not consider small muscles and their movements. It also does not include internals not the moving facial parts as mentioned above, while the 2D image presents the appearance from a certain viewpoint and not from multiple viewpoints. This means that inaccuracies in the 3D model will not reflect in the rendering of the 3D model and the texture map from a certain viewpoint.

As a result, the 3D model used for rendering the images, does not need to be very detailed and does not include many polygons. Typically, it can have several thousand or several hundreds of polygons, compared to tens of thousands or hundreds of thousands of polygons in conventional solutions.

This allows the fast, real-time rendering of a head and/or body in real time on a computational device with an inexpensive processing unit.

Furthermore, the 3D model and 2D texture maps may be outputted by different networks as a function of the resolution of the desired output image. Low resolution images would be rendered based on low resolution polygon 3D models and low-resolution texture maps that may be output by neural networks with fewer coefficients requiring fewer computations.

This further allows the rendering of several heads and/or bodies at once in one image using a low cost and low power computational device such as a laptop without a GPU, a mobile phone or a tablet.

Also note that the solution does not require a studio and may be based on a single camera. It does not require a complex system with many cameras and illumination sources and does not require controlled lighting.

Figure 19:
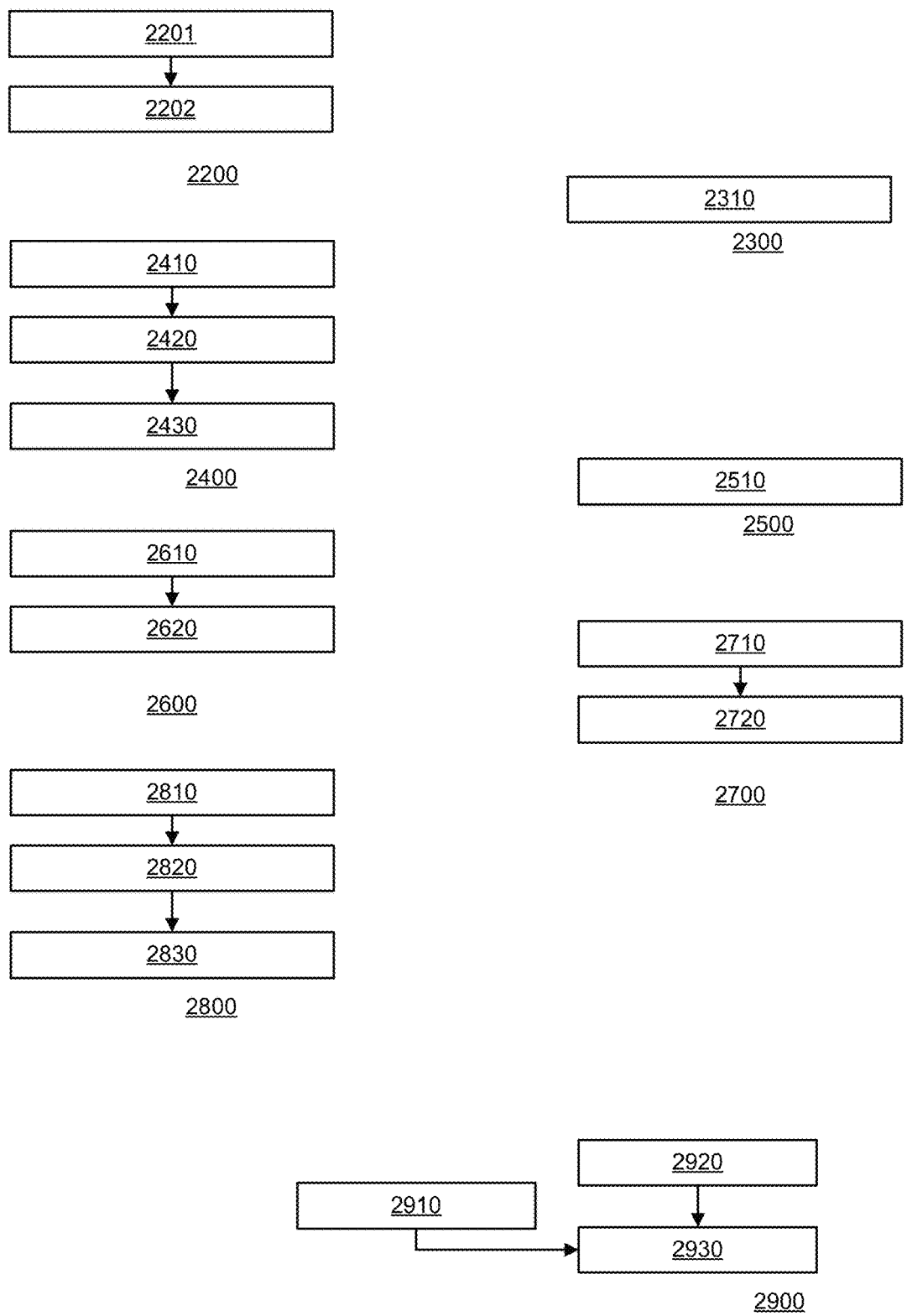
FIG. 19 is an example of methods.

FIG. 19 illustrates an example of method 2200 for 3D video conference.

Method 2200 may include steps 2210 and 2220.

Step 2210 may include determining, for each participant, updated 3D participant representation information within the virtual 3D video conference environment, that represents participant. The determining may include compensating for difference between an actual optical axis of a camera that acquires images of the participant and a desired optical axis of a virtual camera.

Step 2220 may include generating, for at least one participant, an updated representation of virtual 3D video conference environment, the updated representation of virtual 3D video conference environment represents the updated 3D participant representation information for at least some of the multiple participants.

The updated representation of virtual 3D video conference environment may include an avatar per participant of the at least some of the multiple participants.

A direction of gaze of a first avatar within the virtual 3D video conference environment may represent a spatial relationship between a (a) direction of gaze of a first participant that may be represented by the first avatar and (b) a representation of the virtual 3D video conference environment displayed to the first participant.

A direction of gaze of a first avatar within the virtual 3D video conference environment may be agnostic to the actual optical axis of the camera.

A first avatar of a first participant within the updated representation of the virtual 3D video conference environment appears in the updated representation of the virtual 3D video conference environment as being captured by the virtual camera.

The virtual camera may be located at a virtual plane that virtually crosses the eyes of the first participant of the first participant.

The method may include receiving or generating participants appearance information about head poses and expressions of the participants, and determining the updated 3D participant representation information to reflect the participant appearance information.

The method may include determining a shape of each of the avatars.

FIG. 19 also illustrates an example of method 2300 for generating an image from a certain viewpoint of an object that may be three dimensional.

Method 2300 may include step 2310 of rendering an image of the object, based on a compact 3D model of the object and at least one two-dimensional (2D) texture map associated with the certain viewpoint.

The rendering may include virtually placing texture generated from the at least one 2D texture map on the compact 3D model.

The method may include selecting the at least one 2D texture maps associated with the certain viewpoint out of multiple 2D texture map that may be associated with different texture map viewpoints.

The rendering may be also responsive to a requested appearance of the object.

The object may be a representation of an acquired object that may be acquired by a sensor.

The rendering may be also responsive to an appearance parameter of the acquired object.

The acquired object may be a participant of a three-dimensional (3D) video conference.

The method may include receiving the at least one 2D texture map from one or more neural networks.

FIG. 19 further illustrates an example of method 2400 for for conducting a 3D video conference between multiple participants.

Method 2400 may include steps 2410, 2420 and 2430.

Step 2410 may include receiving second participant metadata and first viewpoint metadata by a first unit that may be associated with a first participant, wherein the second participant metadata may be indicative of a pose of a second participant and an expression of the second participant, wherein the first viewpoint metadata may be indicative of a virtual position from which the first participant requests to view an avatar of the second participant.

Step 2420 may include generating, by the first unit, and based on the second participant metadata and the first viewpoint metadata, a second participant representation information; wherein the second participant representation information may include a compact 3D model of the second participant and a second participant texture map.

Step 2430 may include determining, for the first participant and during the 3D video conference, a representation of virtual 3D video conference environment, wherein the determining may be based on the second participant representation information.

The method may include generating each one of the compact 3D and the second participant texture map in response to the second participant metadata and first viewpoint metadata.

The generating of at least one of the compact 3D model and the second participant texture map may include feeding the second participant metadata and first viewpoint metadata to one or more neural networks trained to output the at least one of the compact 3D model and the second participant texture map based on the second participant metadata and first viewpoint metadata.

The compact 3D model may include less than ten thousand points.

The compact 3D model may consist essentially of five thousand points such as for the FLAME model (https://flame.is.tue.mpg.de/home).

The determining of the representation of the virtual 3D video conference environment may include determining an estimate of an appearance of the second participant in the virtual 3D video conference environment based on the second participant texture map; and amending the estimate based on a compact 3D model of at least the second participant.

The amending may include amending the estimate based on concealment and illumination effects related to compact 3D models of one or more participants of the 3D conference video.

Attentiveness and Mood Estimation from Video

Due to Covid19 many in person meetings have been replaced by video conferencing calls.

Such calls may be lengthy, and participants may lose their attentiveness or focus and may also be tempted to do other things in parallel to the meeting such as browse the internet, read emails or play with their phones.

In many cases, it may be important for some of the meeting participants to know if the other participants may be attentive, (i.e. paying attention to the meeting) and how the other participants feel—they may be, for example, content, sad, angry, stressed, agree or disagree with what is said, etc.

Example cases for such video conferencing call may be associated, for example with school lectures, university lectures, sales meetings, and team meetings managed by a team manager.

There may be provided a solution for analyzing videos and estimating the attentiveness of participants and especially those who may be not actively participating and talking.

A database of videos from video conferencing meetings may be collected.

For every participant (or at least some of the participants) that appear in one or more of the videos, the video may be divided into parts in which the attentiveness and feelings of the user may be estimated to be constant. In each part of each video, the attentiveness level and emotions may be estimated by using several possible means:

The participant may be asked how interested he/she was during that part of the meeting and what was their mood during that time.

a. An external annotator may be asked to estimate the attentiveness and mood based on the appearance of the participant, such as the head pose, eye movements and facial expressions.

b. External devices may be used to measure the participants heartbeat and other biological signals, as done by a polygraph machine or other less sophisticated methods.

c. A computer software or an observer may verify whether the participant was looking at another window on the computer screen that may be unrelated to the meeting, i.e. not focusing completely on the meeting.

For each part of each video a numerical score for the attentiveness may be created or alternatively, the participant's attentiveness may be classified into several classes such as "highly interested", "interested", "apathetic", "bored", "extremely bored" and "multi-tasking".

In a similar manner, the user's mood may be estimated, e.g., "happy", "content", "sad", "angry", "stressed".

Conversely, numerical values can be given to certain feelings such as happiness, relaxation, interest, etc.

A neural network model may be trained to find the correlation between the appearance of the participant in the video and the level of attentiveness and mood.

In run time, a video may be supplied to the network and it outputs an estimate of the attentiveness level as function of time.

This output may be presented to some participants such as the host or manager of the meeting (teacher, salesperson, manager) in order to improve their performance or to aid certain other participants who may have lost attentiveness.

In an embodiment, the faces detected in the videos may be modelled by a neural network generating a parametric model that includes parameters regarding the head pose, eye gaze direction and facial expressions, as described in previous patents.

Once a parametric model is found, only the parameters may be input to the neural network that estimates the attentiveness level instead of inputting the raw video.

The parameters may be inputted as a temporal series of parameters so that the temporal change in expressions, head and eye movements may be taken into consideration. For example, if there is no change in the parameters coding the facial expression or head and eyes direction for a prolonged period of time, the network may learn that this may be a sign of inattentiveness.

Such a method may be beneficial as it reduces the amount of data that may be input into the network that estimates the level of attentiveness.

In another embodiment, the output of the video analysis network may be combined with data collected by a computer software.

Such additional data can be:
a. Are other windows being viewed on the screen?
b. Is the user typing or may be the mouse clicked during a video-conferencing meeting?
c. Using eye gaze tracking, the direction in which a person may be looking can be estimated.

The method may estimate whether the user may be looking at the person who may be talking in a video conferencing app or at other people or just gazing around.

Using eye gaze detection, the method can also estimate whether the user is looking at areas of the screen that is not occupied by the video conferencing software, such as other open windows.

Using eye gaze detection, the method can estimate whether the user may be reading text during the meeting.

The combination of all the data sources may be used to estimate whether the participant of the meeting may be multi-tasking during the meeting and paying attention to other tasks instead of the video meeting.

Note that the process mentioned above may be not limited to rendering images of people and can be also used to render animals or any other objects.

FIG. 19 further illustrates an example of method 2500 for determining a mental parameter of a participant in video conference video conference.

Method 2500 may include steps 2510 of applying a machine learning process on video of the participant acquired during the video conference to determine the mental state of the participant during the video conference; wherein the mental state may be selected out of mood and attentiveness. The machine learning process was trained by a training process during which it was fed with training video segments of one or more people and training mental state metadata indicative of the mental state of the one or more people participant during each of the training video segments.

The training mental state metadata may be generated in any manner—for example by at least one out of:
a. Querying the one or more people.
b. Generated by an entity (medical staff, expert, and the like) that differs from the one or more people.
c. Measuring one or more physiological parameters of the one or more people during an acquisition of the training video segments.
d. Generated based on interactions of the one or more people, during the acquisition of the training video segments, with components other than a display associated with the one or more people.
e. Generated based on a direction of gaze of the one or more people, during an acquisition of the training videos segments.

The one or more people may be the participant.

The video conference may be a three-dimensional (3D) video conference.

Method 2500 may include the training.

FIG. 18 further illustrates an example of method 2600 for determining a mental state of a participant in video conference video conference.

Method 2600 may include steps 2610 and 2620.

Step 2610 may include obtaining participant appearance parameters during the 3D video conference. An example of such parameters is given in the Flame model (https://flame.is.tue.mpg.de/home).

Step 2620 may include determining the mental state of the participant, wherein the determining may include analyzing, by a machine learning process, the participant appearance parameters.

The machine learning process may be implemented by a thin neural network.

The analyzing occurs repetitively during the 3D video conference.

The analyzing may include tracking after one or more patterns of values of the appearance parameters.

The method may include determining, by the machine learning process, and based on the one or more patterns, the mental state of the participant.

The method may include determining a lack of attentiveness wherein during at least a predetermined period the one or more appearance parameters may be substantially unchanged.

The mental state may be a mood of the participant.

The mental state may be an attentiveness of the participant.

The determining may be further responsive to one or more interaction parameter regarding an interaction of the participant within a device other than a display.

The participant appearance parameters may include a direction of gaze of the participant.

FIG. 19 illustrates an example of method 2700 for determining a mental parameter of a participant in video conference video conference.

Method 2700 may include steps 2710 and 2720.

Step 2710 may include obtaining participant interaction parameters during the 3D video conference.

Step 2720 may include analyzing, by a machine learning process, the participant interaction parameters to determine the mental parameter of the participant.

FIG. 19 also illustrates an example of method 2800 for determining a mental state of a participant in video conference video conference.

Method 2800 may include steps 2810, 2820 and 2830.

Step 2810 may include obtaining participant appearance parameters during the 3D video conference.

Step 2820 may include obtaining participant computer traffic parameters indicative of computer traffic exchanged with a computer of the participant, the computer of the participant being utilized for participating in the 3D video conference.

Step 2830 may include determining the mental state of the participant, wherein the determining may include analyzing, by a machine learning process, the participant appearance parameters, and the participant computer traffic parameters.

FIG. 19 also illustrates an example of method 2900 for determining a mental state of a participant in video conference video conference.

Method 2900 may include steps 2910, 2920 and 2930.

Step 2910 may include obtaining participant appearance parameters during the 3D video conference.

Step 2920 may include obtaining participant computer traffic parameters indicative of computer traffic exchanged with a computer of the participant, the computer of the participant being utilized for participating in the 3D video conference.

Steps 2910 and 2920 may be followed by step 2930 of determining the mental state of the participant, wherein the determining may include analyzing, by a machine learning process, the participant appearance parameters, and the participant computer traffic parameters.

It should be noted that the total number of calculations that may need to be performed may be bounded not by the number of people that appear in the Field Of View (FOV) but rather by the resolution of the view. If the screen resolution remains constant, then, for example, widening the FOV may result in more participants shown but with smaller sizes that need to be captured and rendered.

Multiple Participants in One Visual Sensing Unit

Existing conference call systems assume one participant per camera. Accordingly, one tagged name appears per camera even if more than one person uses it. This can lead to misunderstandings as to who the participants are, especially if other participants can't recognize them.

It may be beneficial to provide accurate representations of each participant that is captured by a camera—even when multiple participants are captured by a single camera or by a visual sensing unit that may include more than a single camera.

Participants may be appear in one or more representations of a virtual 3D video conference environment and each participant may be represented by an avatar.

It should be noted that non-participants may also appear in the one or more representations of a virtual 3D video conference environment. Accordingly—a person that should appear in at least one representation of a virtual 3D video conference environment may be regarded as a relevant person. The relevant person may be a participant or a non-participant.

The method may start by visual information analysis— such as detecting the number of persons that are captured by the visual sensing unit, and attempting to identify the persons. Any identification process may be used. For example, face detection and recognition.

Once a person is detected—the method may determine whether the person is relevant or non-relevant and may be ignored of.

Assuming that a person is relevant—then his/her image (part of the image acquired by the visual sensing unit) may be segmented. The segmentation may include associating different segments with each participant's clothes or other possible accessories (watches, eyeglasses, jewelry, etc.). Optionally the relevant person may be allowed (for example by receiving inputs from the user) to identify the different segments.

In a virtual 3D video conference environment where each participant is represented by an avatar, each one of the relevant persons captured by a the visual sensing unit can be represented by a different avatar. Without identifying that there are multiple relevant persons, such a system would malfunction.

Within this framework, it may occur that one of the relevant persons gestures or possibly looks at another of the relevant persons of the same camera. This could then be reflected by the behavior of the avatars. As an example, if one of the relevant persons hands an object to another relevant person, this action can then be reflected in the virtual 3D video conference environment and the avatar corresponding with the first relevant person could be shown handing a similar object to the avatar corresponding to the second relevant person.

Optionally, the system would also have a temporal tracking mechanism with some temporal memory. This would allow participants to move in and out of the view of the camera while still being identified separately. This tracking may be based on face-recognition, tracking of clothes' colors or similar methods.

Another option is that when more than one person appears in the camera view, the system may be directed to show only a subset of those persons in the video conference. For example, it is quite customary, when video conferences are taken from home, that other household persons and animals—children, pets, spouses—(deemed to be irrelevant) appear occasionally within the view of the camera. In this case, the system would be directed not to show the non-relevant persons or animals within the video conference.

Figure 21:
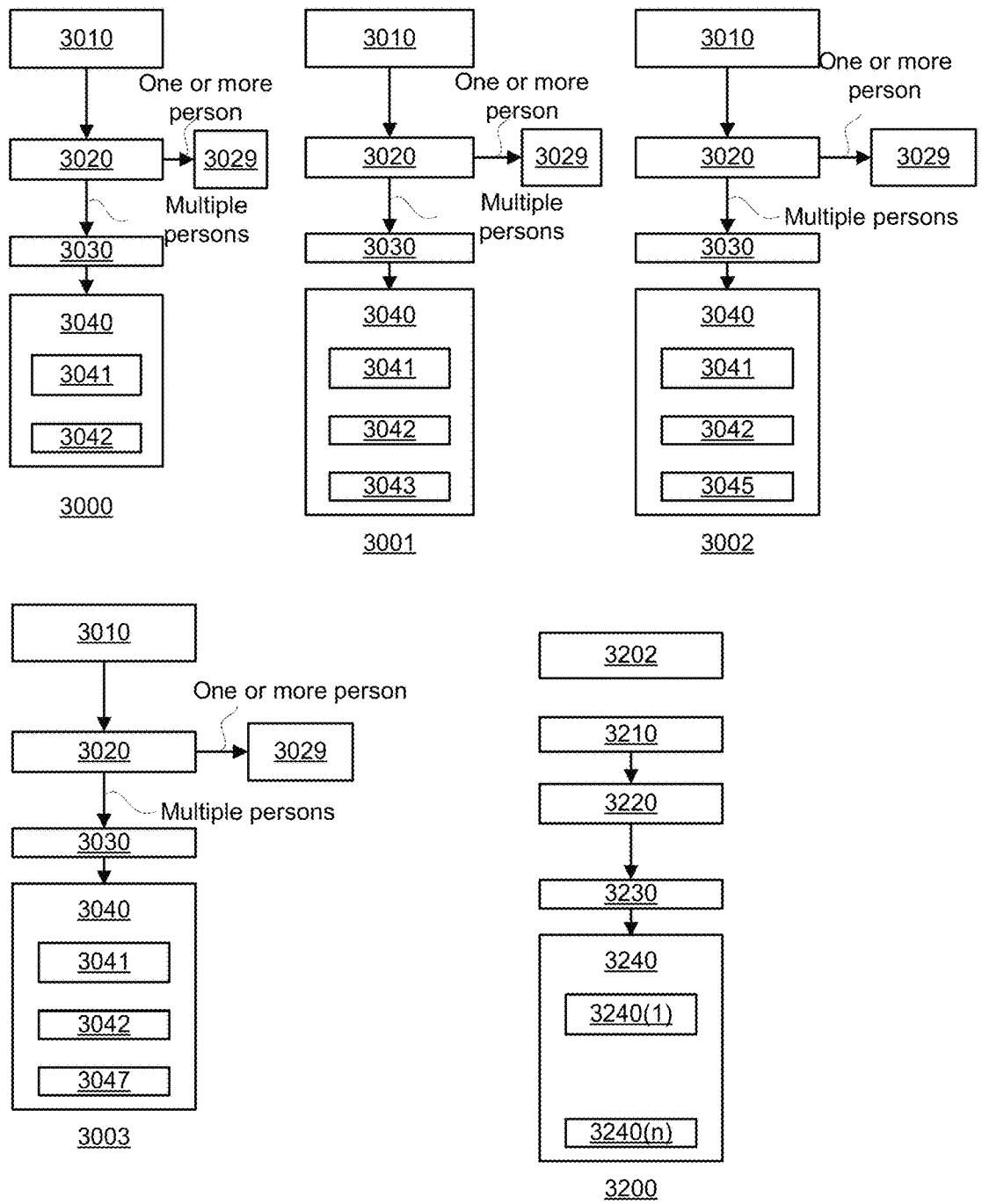
FIG. 21 illustrates examples of methods.

FIG. 21 illustrates examples of multiple methods— method 3000, method 3001, method 3003 and method 3200.

Method 3000 is for conducting a virtual 3D video conference between multiple participants.

The execution of the virtual 3D video conference may include displaying multiple representations of a virtual 3D video conference environment to multiple participants devices. The calculations required for the provision of the virtual 3D video conference may be executed by one or more computational systems other than any of the multiple participants devices, may be executed solely (or almost solely) by the multiple participants devices, may be executed by a combination of one or more participants' devices and one or more other systems.

Information related to the presence of relevant persons within a field of view of a visual sensing unit related to any of the participants may be sent to one or more other participant devices, may be sent to one or more other systems, may be subjected to filtering rules, transmission blocking rules, or any other rules related to the processing and/or transmission and/or display of any indication related to the multiple persons.

The participant devices may display a plurality of representations of virtual 3D video conference environments— usually the representation of virtual 3D video conference environment differs from one participant device to another. The presence of relevant one or more persons may be reflected in at least some of the plurality of representations of virtual 3D video conference environments.

Method 3000 may start by step 3010 of acquiring visual information, by a visual sensing unit related to a certain participant.

Step 3010 may be followed by step 3020 of identifying one or more persons that appear in the visual information. In some cases multiple persons may appear in the visual information. In some other cases only one person appears in the visual information. In some further cases no person appears in the visual information.

If a single person appears or no person appears in the visual information then step 3020 may be followed by step 3029 of responding to the detection or one or no persons.

If multiple persons appear in the visual information, then step 3020 may be followed by step 3030 of finding, out of the multiple persons, at least one relevant person.

A relevant person is a person whose presence may be indicated to at least one participant (or participant device) of the virtual 3D video conference. At least an indication about a presence of a relevant person may be sent outside a participant device of the certain participant.

The presence of a relevant person may be represented (or at least is a candidate for being represented) in a virtual 3D video conference environment displayed to one or more participant of the virtual 3D video conference. A participant may determine not to receive an indication of that person, and/or the display of said presence may be subjected to filtering and/or displaying rules. The relevant person may be a participant or may not be a participant.

Step 3030 may include at least one of the following:
a. Determining which of the multiple persons are participants of the virtual 3D video conference.
b. Determining whether a participant is a relevant person.
c. Determining whether a non-participant of the 3D video conference is a relevant person.
d. Applying a face recognition process. Any known face recognition process can be applied. This may require an initialization process of acquiring an image of a face of a participant.
e. Applying any biometric identification process—even other than the face recognition process. Any known biometric recognition process can be applied. This may require an initialization process of acquiring biometric information of a participant.
f. Storing identification information about the at least one relevant person for at least a certain period of time following an appearance of the certain participant and the person. This may reduce computational resources usage—as there is no need to initiate another relevancy determination process.
g. Identifying any of the at least one relevant persons after the at least one relevant person exited the field of view of the visual sensing unit and then re-entered the field of view of the visual sensing unit, wherein the identifying is based on the identification information. This may provide a certain "memory" as a person identified as relevant may leave the field of view for up to a predefined time and still be regarded as relevant.
h. Continuing to indicate that the relevant person is within the field of view of the visual sensing unit—even during predefined periods in which the relevant person exits the field of view—in order to reduce computational resources and required to re-generate and/or update a virtual 3D video conference environment—and also may reduce communication resources usage (no need to send information regarding the virtual 3D video conference environment updates). This may also provide a smoother virtual 3D video conference environment. The method may use a hysteresis or any other smoothing mechanism when deciding whether to update information related to a presence or absence of a relevant person within the virtual 3D video conference environment. The predefined periods may be of any length—but usually them may be relatively short—for example up to a few seconds, up to a predetermined fraction (for example up to 5, 10, 15, 20, 25, 30 precent of the scheduled duration of the virtual 3D conference), may depend on an availability of computational and/or memory and/or communication resources (for example—may lengthen the predefined period of absence without updating the virtual 3D video conference environment when there are communication problems and/or reduction in communication bandwidth and/or reduction or lack of computational resources and/or of memory resources).

Step 3030 may be followed by step 3040 of responding to the finding, out of the multiple persons, at least one relevant person.

Step 3040 may include step 3041 of determining 3D entity representation information, for each of the at least one relevant person and step 3042 of generating, for at least one participant, a representation of a virtual 3D video conference environment, based on the 3D entity representation information for each of the at least one relevant person.

Steps 3010, 3020, 3030 and 3040 can be executed in relation to visual sensing unit or any of the participants.

Method 3001 is for conducting a virtual 3D video conference between multiple participants.

Method 3001 may start by step 3010 of acquiring visual information, by a visual sensing unit related to a certain participant.

Step 3010 may be followed by step 3020 of identifying one or more persons that appear in the visual information. In some cases multiple persons may appear in the visual information. In some other cases only one person appears in the visual information. In some further cases no person appears in the visual information.

If a single person appears or no person appears in the visual information then step 3020 may be followed by step 3029 of responding to the detection or one or no persons.

If multiple persons appear in the visual information, then step 3020 may be followed by step 3030 of finding, out of the multiple persons, at least one relevant person.

Step 3030 may be followed by step 3040 of responding to the finding, out of the multiple persons, at least one relevant person.

Step 3040 may include step 3041 of determining 3D entity representation information, for each of the at least one relevant person and step 3042 of generating, for at least one participant, a representation of a virtual 3D video conference environment, based on the 3D entity representation information for each of the at least one relevant person.

Step 3040 may include step 3043 of searching for a physical interaction between the relevant persons. When finding the physical interaction—then step 3040 may also include generating of the representation of virtual 3D video conference environment (for the at least one participant) may be responsive to the physical interaction.

Method 3002 is for conducting a virtual 3D video conference between multiple participants.

Method 3002 may start by step 3010 of acquiring visual information, by a visual sensing unit related to a certain participant.

Step 3010 may be followed by step 3020 of identifying one or more persons that appear in the visual information. In some cases multiple persons may appear in the visual information. In some other cases only one person appears in the visual information. In some further cases no person appears in the visual information.

If a single person appears or no person appears in the visual information—then step 3020 may be followed by step 3029 of responding to the detection or one or no persons.

If multiple persons appear in the visual information—then step 3020 may be followed by step 3030 of finding, out of the multiple persons, at least one relevant person.

Step 3030 may be followed by step 3040 of responding to the finding, out of the multiple persons, at least one relevant person.

Step 3040 may include step 3041 of determining 3D entity representation information, for each of the at least one relevant person and step 3042 of generating, for at least one participant, a representation of a virtual 3D video conference environment, based on the 3D entity representation information for each of the at least one relevant person.

Step 3040 may include step 3045 of generating a same-visual-sensing-unit indication that is indicative that the relevant persons are captured by a single visual sensing unit. See, for example, same-visual-sensing-unit indication 3099 of FIG. 23.

The same-visual-sensing-unit indication may be included in the representation of virtual 3D video conference environment (for the at least one participant). The visual sensing unit may include a first camera and a second camera. The same-visual-sensing-unit indication may or may not be generated wherein one of the relevant persons is within a field of view of the first camera, and one other of the relevant persons is within a field of view of the second camera.

Method 3003 is for conducting a virtual 3D video conference between multiple participants.

Method 3003 may start by step 3010 of acquiring visual information, by a visual sensing unit related to a certain participant.

Step 3010 may be followed by step 3020 of identifying one or more persons that appear in the visual information. In some cases multiple persons may appear in the visual information. In some other cases only one person appears in the visual information. In some further cases no person appears in the visual information.

If a single person appears or no person appears in the visual information then step 3020 may be followed by step 3029 of responding to the detection or one or no persons.

If multiple persons appear in the visual information, then step 3020 may be followed by step 3030 of finding, out of the multiple persons, at least one relevant person.

Step 3030 may be followed by step 3040 of responding to the finding, out of the multiple persons, at least one relevant person.

Step 3040 may include step 3041 of determining 3D entity representation information, for each of the at least one relevant person and step 3042 of generating, for at least one participant, a representation of a virtual 3D video conference environment, based on the 3D entity representation information for each of the at least one relevant person.

Step 3040 may include step 3047 of determining for each relevant person of relevant persons captured by a same visual sensing unit, whether the relevant person speaks or not.

Step 3047 may be followed by responding to the determination of whether a relevant person talks or not in the representation of virtual 3D video conference environment displayed to one or more participant.

The responding may include allowing only a single speaking person to be displayed in a virtual 3D environment.

Method 3200 is for conducting a 3D video conference between multiple participants.

Method 3200 may include an initialization step 3202. The initialization step 3202 may include receiving initial 3D participant representation information for generating the 3D representation of the participant under different circumstances. The 3D participant representation information may include a 3D model and one or more texture maps.

Method 3200 may include step 3210 of receiving direction of gaze information regarding a direction of gaze of a participant. The direction of gaze information may represent a detected or estimated direction of gaze of the participant.

Step 3210 may be followed by step 3220 of estimating whether (a) a gaze of a certain participant is aimed towards a person located within a field of view of a visual sensing unit that also captures at least a head of the participant, or whether (b) the gaze of the person is directed towards a representation of a person within a virtual 3D video conference environment.

Step 3220 may be followed by step 3230 of determining whether (i) a 3D representation of the person should appear within the virtual 3D video conference environment, and/or (ii) determining whether to update the direction of gaze of a representation of the participant—to show that he is looking at the person.

The determining may be responsive to different parameters—for example—whether the gaze of the certain participant was directed to the person, whether the gaze of the person is directed towards a representation of a person within a virtual 3D video conference environment, whether the person is a participant of the current virtual 3D conference, whether he/she participated in any previous virtual 3D conference, and the like.

Step 3230 may include at least one of the following:

a. Deciding that the 3D representation of the person should not appear within the virtual 3D video conference environment when the person is not a participant.

b. Allowing a non-participant to appear in the virtual 3D video conference environment.

c. Performing the determining based on a rule or definition provided by the certain participant. It may also be based on rules provided by other participants—the rules may define which persons should appear in their representation of the virtual 3D video conference environment.

d. Performing the determining based on at least a size or an estimated age of the person. For example—children may be excluded from being represented.

e. Performing the determining based on bandwidth of communication and/or computational resource status. For example—when the available bandwidth of a communication link or channel from a certain participant device to another device or system is below a certain threshold—the decision may tend to ignore the person—for example especially if the person is not a participant—yet for another example—when the person is not associated with an existing avatar.

f. Identifying the person using face recognition.

g. Identifying the certain participant and the person using an identification process.

h. Performing the determining based on stored identification information about the person and the certain participant that is stored for at least a certain period of time following an appearance of the certain participant and the person.

i. Identifying the person after the person exited the field of view of the visual sensing unit and then re-entered the field of view of the visual sensing unit. The identifying is based on the identification information.

Step 3230 may be followed by step 3240 of responding to the determination of step 3230.

Step 3240 may include at least one out of steps 3240(*a*)-3240(*n*):

a. Generating person information regarding an appearance of the person—when it is determined that a 3D representation of the person should appear within the virtual 3D video conference environment. The person information may include the 3D representation of the person, or information that may be processed by a rendering engine or other image processor to provide an avatar or any other 3D representation of the person within one or more representations of the virtual 3D video conference environment. The person may or may not be associated with an avatar. When associated with an existing avatar—then the person information may include instructions of how to update the avatar (for example provide circumstance information). When not associated with an existing avatar there may be a need to generate a new avatar or use an existing avatar—even if not initially associated with the person.

b. Updating the direction of gaze of a representation of the participant—to show that he/she is looking at the person—when determining to update the direction of gaze. This may include updating a circumstance regarding the participant and the like.

c. Generating a same visual sensing unit indication that is indicative that the person and the certain participant are captured by the same visual sensing unit. The visual sensing unit may include a first camera and a second camera, wherein the certain participant is within a field of view of the first camera, and the person is within a field of view of the second camera.

d. Searching (when determining that the person should appear) for physical interaction between the person and certain participant.

e. Determining, when a physical interaction is found, whether it should be represented in one or more representations of the virtual 3D video conference environment—and if so—determining how it should appear—and generating information that will cause the physical interaction to be represented in the one or more representations.

f. Generating a 3D person representation information that indicates that the person is not a participant.

g. Maintaining unchanged a direction of gaze of the certain participant within the virtual 3D video conference environment during a change in a direction of gaze of the certain participant from the person to a visual representation of the person within the virtual 3D video conference environment.

h. Generating an updated representation of virtual 3D video conference environment that includes an avatar per participant of the at least some of the multiple participants.

i. Determining relevancy of segments of updated 3D participant representation information, and selecting which segments to transmit, based on the relevancy and available resources.

j. Determining relevancy of segments of updated representation of virtual 3D video conference environment information, and selecting which segments to transmit, based on the relevancy and available resources.

k. Generating a 3D model and one or more texture maps of 3D participant representation information of a participant.

l. Estimating 3D participant representation information of one or more hidden areas of a face of a participant that are located outside a field of view of a camera that captures at least one visible area of the face of the participant.

m. Determining, for each participant, of the updated 3D participant representation information by changing an illumination condition.

n. Determining, for each participant, of the updated 3D participant representation information by adding or changing wearable item information.

All steps 3240(*a*)-3240(*n*) may be executed by the same device or system, but one or more steps of steps 3240(*a*)-3240(*n*) may be executed by different devices and/or systems. For example—step (h) may be generated by a rendering engine located at a computerized system or participant device that differs from the participant device that executes step 3240(*a*).

There are multiple representations of the virtual 3D video conference environment (for example one per participant)—and steps 3230 and/or 3240 may be done per each one of the representations. The update itself (the inclusion of the visual information—for example, the appearance of the person) may differ from one representation to the other.

Multiple participants of the virtual 3D conference are associated with multiple participant devices. There may also be a computerized system that differs from any of the multiple participant devices.

Various steps of method 3200 may be executed by at least one of the computerized systems, and one or more of the multiple participants devices.

FIG. 22 illustrates an image 3009 which is a part of a video acquired by a visual sensing unit. Image 3009 captures first person 3004 and second person 3005. There is a physical interaction between the persons as they hug each other. The physical interaction may be represented in the virtual 3D video conference environment.

In one example both persons are regarded as relevant persons and their avatars 3004' and 3005' appears in a representation 3009' of a virtual 3D video conference environment (only part of the environment is shown).

In another example only the first person is regarded as a relevant person and its avatar 3004' (and not the avatar of the second person) appears in a representation 3009" of a virtual 3D video conference environment (only part of the environment is shown).

FIG. 22 also illustrates an image 3008 which is a part of a video acquired by a visual sensing unit. Image 3008 captures a third person 3007 looking at a fourth person 3008.

In one example both persons are regarded as relevant persons and their avatars 3006' and 3007' appear in a representation 3008" of a virtual 3D video conference environment (only part of the environment is shown). Additional avatars of other relevant persons 51-53 are also shown.

Figure 23:
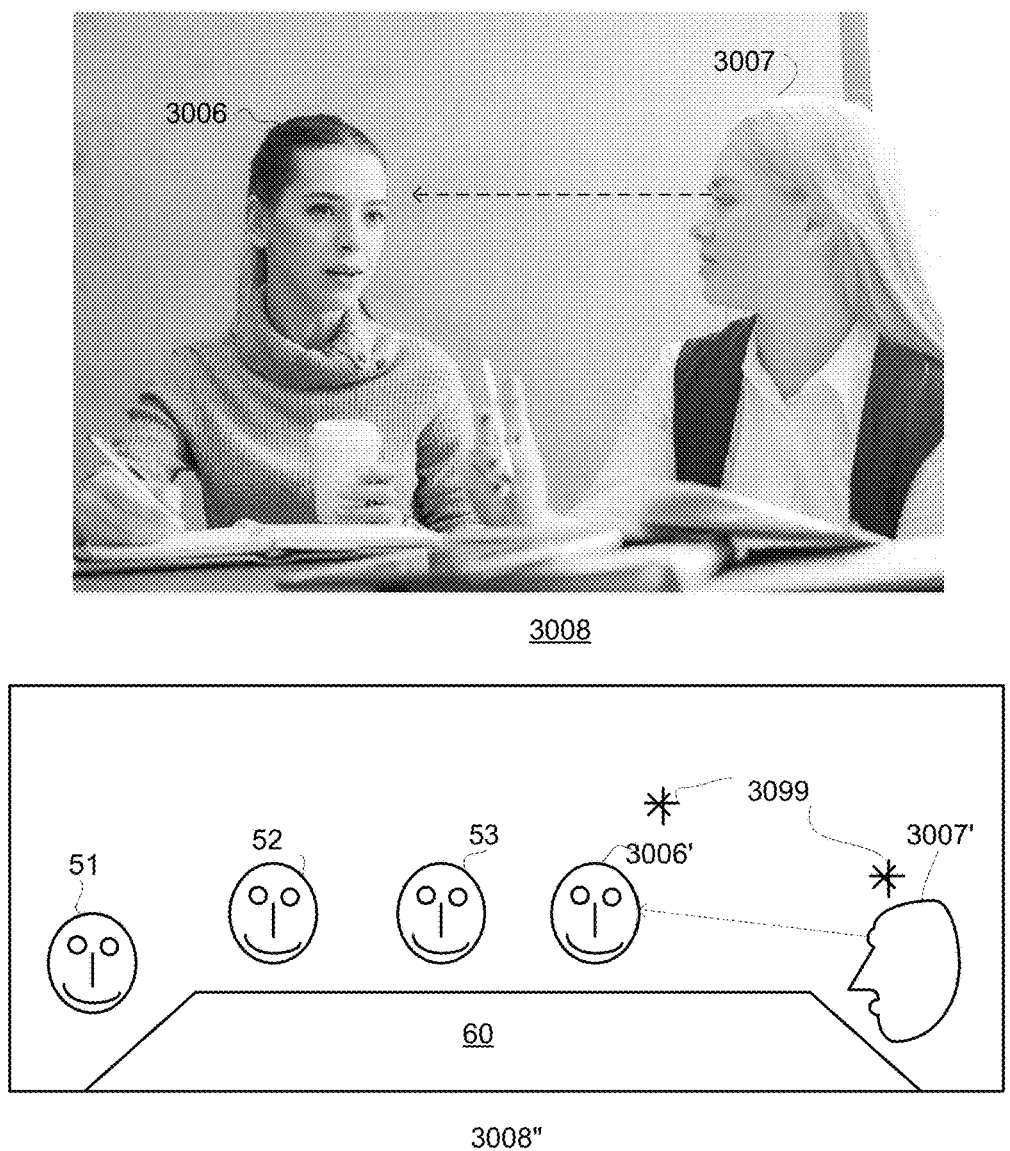
FIG. 23 illustrates examples of directions of gaze of a participant.

FIG. 23 illustrates examples of directions of gaze of a participant. The upper part of the figure illustrates the fifth participant 85 as looking at the 3D visual representation (51) of the first participant 81 within the virtual 3D video conference environment (in panoramic view 41).

A second example illustrates the fifth participant 85 as looking at the first participant 81—as in this example both participants may use the same device and are captured by the same visual capture unit.

In both cases the virtual 3D video conference environment may be updated to indicate that the fifth participant looks at the first participant (actual or 3D participant representation). There may be provided an indication about whether the fifth participant is looking at the actual first participant or at his representation.

Sharing Content

It is important that video conferences be as efficient as possible as they are susceptible to communications issues and lack the benefits of face-to-face meetings. One issue which may limit the efficiency of video conferences has to do with sharing of information usually achieved by sharing files and screens.

Existing solutions such as Zoom, Webex and Microsoft Teams allow users to share an application or their whole screen during a conference. Some of these applications even allow multiple users to share content at the same time. If participants want to share content prior to the meeting in order to help other participants prepare or come informed to the conference, they need to do so over some additional application. For example, they would send out materials over mail to the other participants. If other participants are interested in the material after the meeting, it needs to be sent out to them.

The suggested method, while directed at 3D video conferencing, can also be beneficial to other systems—specifically also to 2D video conferencing environments.

According to the suggested method, it is possible for each participant to share more than one piece of data during a conference call. Moreover, information can be shared easily with other participants prior to their meeting and can be viewed following its end.

According to the suggested method, when a meeting is planned and invitations are sent out, a shared folder is created in the cloud—much like a folder within Google Drive or Microsoft Teams. A link to the drive is sent to the future participant and can be the same link used later for the meeting itself.

The host of the meeting is allowed to set permissions (access control rules) for access to the shared folder. These permissions may include allowing to upload documents, edit them, create subfolders and the like. The following paragraphs detail some possible options assuming they are allowed to the participants.

Participants can upload word processed documents, presentations, spreadsheets and the like (collectively called "documents") to the folder. They can also create sub-folders within the folder based on different criteria. Participants may be able to set specific settings to the documents they uploaded to the same folder.

One possible option is to send notifications to participants when documents are uploaded or when they are modified.

Participants may upload documents to the shared folder during the meeting itself.

An additional option is to create one or more documents collaboratively by one or more of the participants during the meeting (as, for example, Google Drive allows).

During the meeting, participants may decide they want to share one or more of the documents in the shared folder at a specific time.

Having a shared folder allows the following novel benefits: If a participant can't join the meeting or has communication issues, their documents may still be viewed by other participants. It is simple for a single participant to share more than one piece of material at a time. As mentioned above, existing solutions only allow sharing one app, one window or one screen at a time. Sharing information prior to meetings does not require multiple applications as the video conferencing application takes care to update participants when documents are available.

Following the end of the meeting, it is possible not to remove or delete the shared folder for any defined period of time. One additional possibility is to add a recording of the meeting to the same shared folder. This, then, allows participants that may have missed all or part of the meeting to find all the relevant information in one place. It also allows participants that took part in the meeting to go over the information at their own pace after the meeting is over.

The suggested method also enables immediate sharing of the material with other participants without the need to send out the material after the meeting. If a summary and/or action items are captured for the meeting, they can also be placed in the shared folder.

Figure 24:
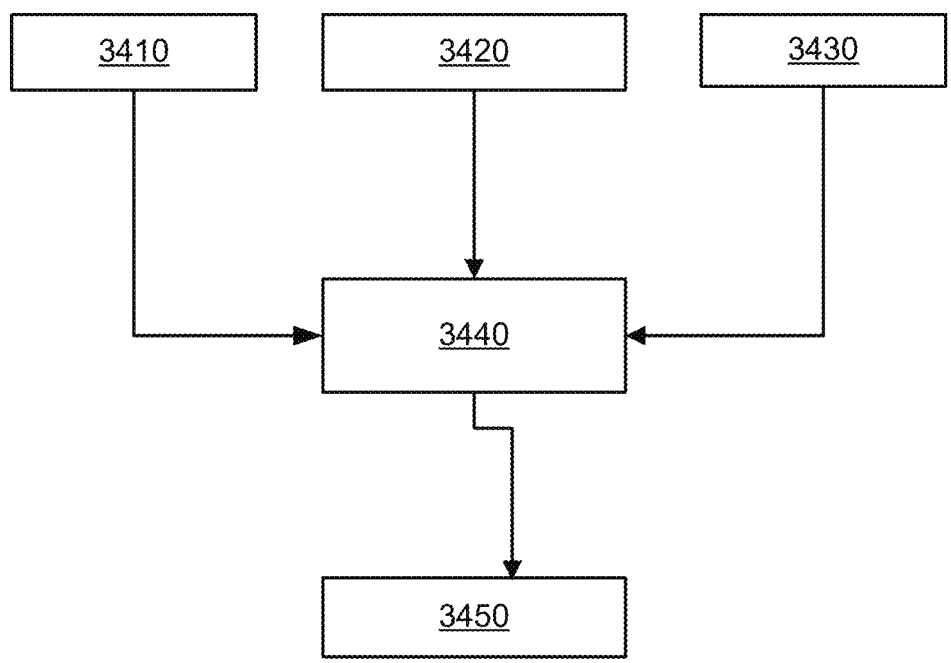
FIG. 24 illustrates an example of a method.

FIG. 24 illustrates method 3400 for sharing content during a virtual 3D video conference.

Method 3400 may start by at least one of steps 3410, 3420 and 3430.

Step 3410 may include inviting multiple participants to join a virtual 3D video conference.

Step 3420 may include creating a shared folder dedicated for storing shared content items, wherein the shared content is accessible during at least during the virtual 3D video conference. The shared content items comprise at least one of text, document, video unit, and audio unit.

Step 3430 may include enabling access, to the multiple participants, to the shared folder; wherein the access is governed by one or more access control rule. This may include adding a link to the invitations of step 3410, or performing any enabling step with, following or regardless of step 3410.

The access control rule may determine retrieval of shared content, uploading of content to the shared folder, and the like.

One or more access control rule may be responsive to the availability of storage resources in the shared folder—for example preventing upload when a size of to content to be uploaded exceeds a first size threshold (the threshold may be determined per participant, per type of participant—organizer, participant, and the like), when the participant reaches a second aggregate size of uploaded content from the participant.

One or more access control rule may be responsive to the bandwidth availability of a communication link to the shared folder and/or from the shared folder.

The access may be enabled—starting before the beginning of the conference call, starting at the conference call, and the like.

The access may be terminated at the end of the conference call, or after the end of the conference call.

Steps 3410, 3420, and 3430 may be followed by step 3440 of conducting the virtual 3D video conference, wherein the conducting includes sharing at least one of the content items.

Step 3440 may include recording the virtual 3D video reference.

The sharing may be executed based, at least in part, on one or more sharing rules. For example, all participants may share any content within the shared folder. Yet for another example—the sharing rules may impose limitations on the manner of sharing by one or more participant.

The one or more sharing rules may be included in the one or more access control rules.

The one or more sharing rules may not be included in the one or more access control rules.

Step 3440 may be followed by an additional step 3450 executed at the end or following the end of the virtual 3D conference.

Step 3450 may include at least one of:
a. Deleting the shared folder dedicated after the completion of the virtual 3D video conference.
b. Maintaining the shared folder dedicated after a completion of the virtual 3D video conference and enabling access to the shared folder after the completion of the virtual 3D video conference.
c. Maintaining the shared folder dedicated until a predefined time period after a completion of the virtual 3D video conference and enabling access to the shared folder until a predefined time period after the completion of the virtual 3D video conference.
d. Maintaining the shared folder dedicated after a completion of the virtual 3D video conference and applying after completion access control rules for accessing the shared folder.
e. Maintaining the shared folder dedicated after a completion of the virtual 3D video conference and adding a recording of the virtual 3D video conference to the shared folder.

One, some or all of steps 3410, 3420, 3430, 3430 and 3450 may be managed by a virtual 3D video conference application.

Figure 25:
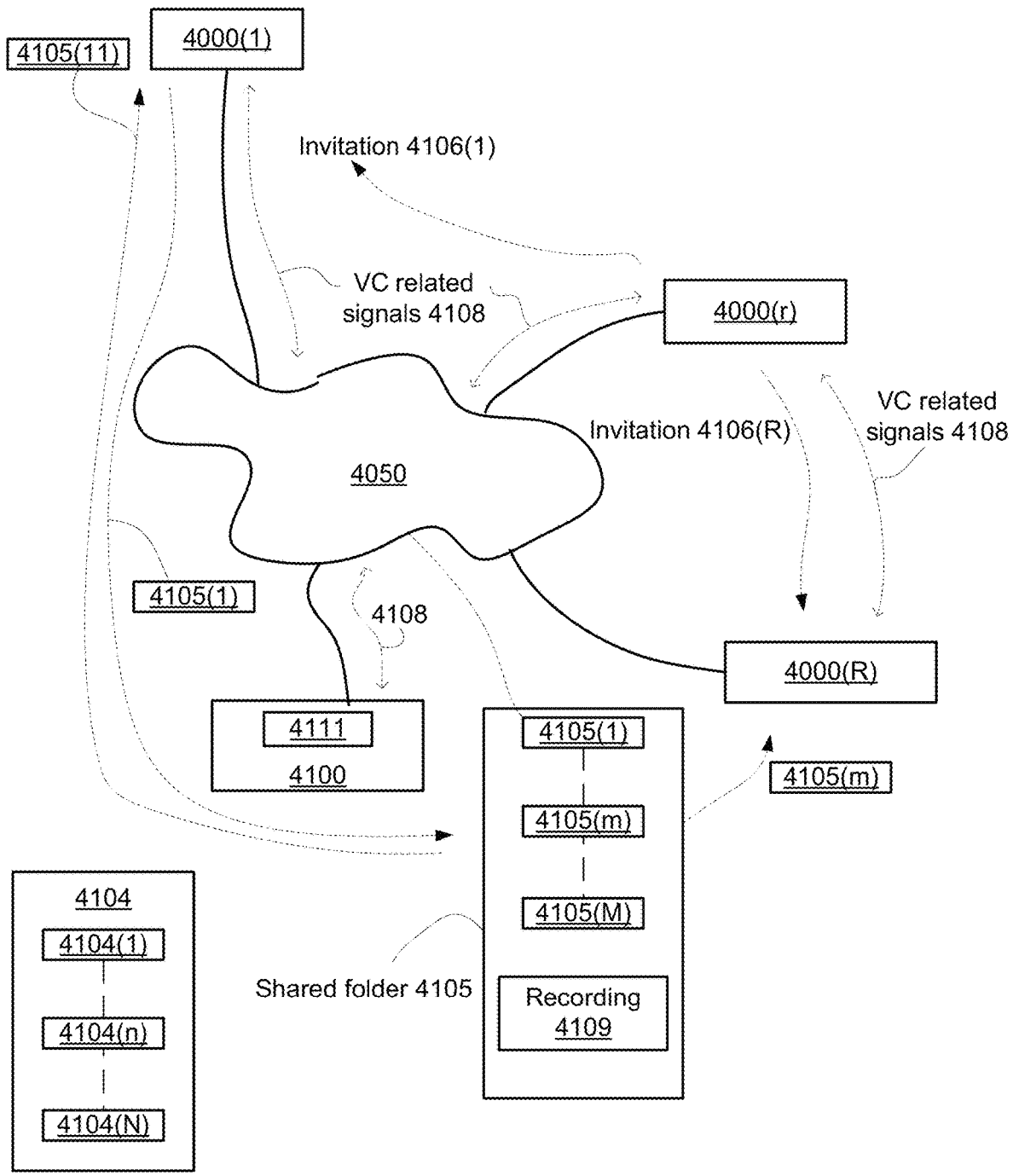
FIG. 25 illustrates an example of a computerized environment, a shared folder and various signals exchanged between user devices.

FIG. 25 illustrates users' devices 4000(1)-4000(R) (and 4000(r), r ranges between 1 and R), network 4050, remote computerized system 4100 (that may include a virtual 3D video conference router 4111), and shared folder 4105 that includes multiple M shared content items 4105(1)-4105(M) (and 4105(m), m ranges between 1 and M). FIG. 25 also illustrates invitations 4106(1)-4106(R) sent by user device 4000(r) that invites other participants to access shared folder and participate in the virtual 3D video conference. During the virtual 3D video conference various signals (VC related signals) 4108 are exchanged with the user devices.

The shared folder may be implemented in any manner—for example by the remote computerized system 4100 or any other unit of system. A recording 4109 of the virtual 3D video conference is illustrated as being stored in the virtual folder.

FIG. 25 also illustrates various rules 4104(1)-4104(N) (collectively denoted 4104) that may include sharing rules, access control rules, and the like.

A rule may be applied on all participants, on some of the participants or only one participant.

Figure 26:
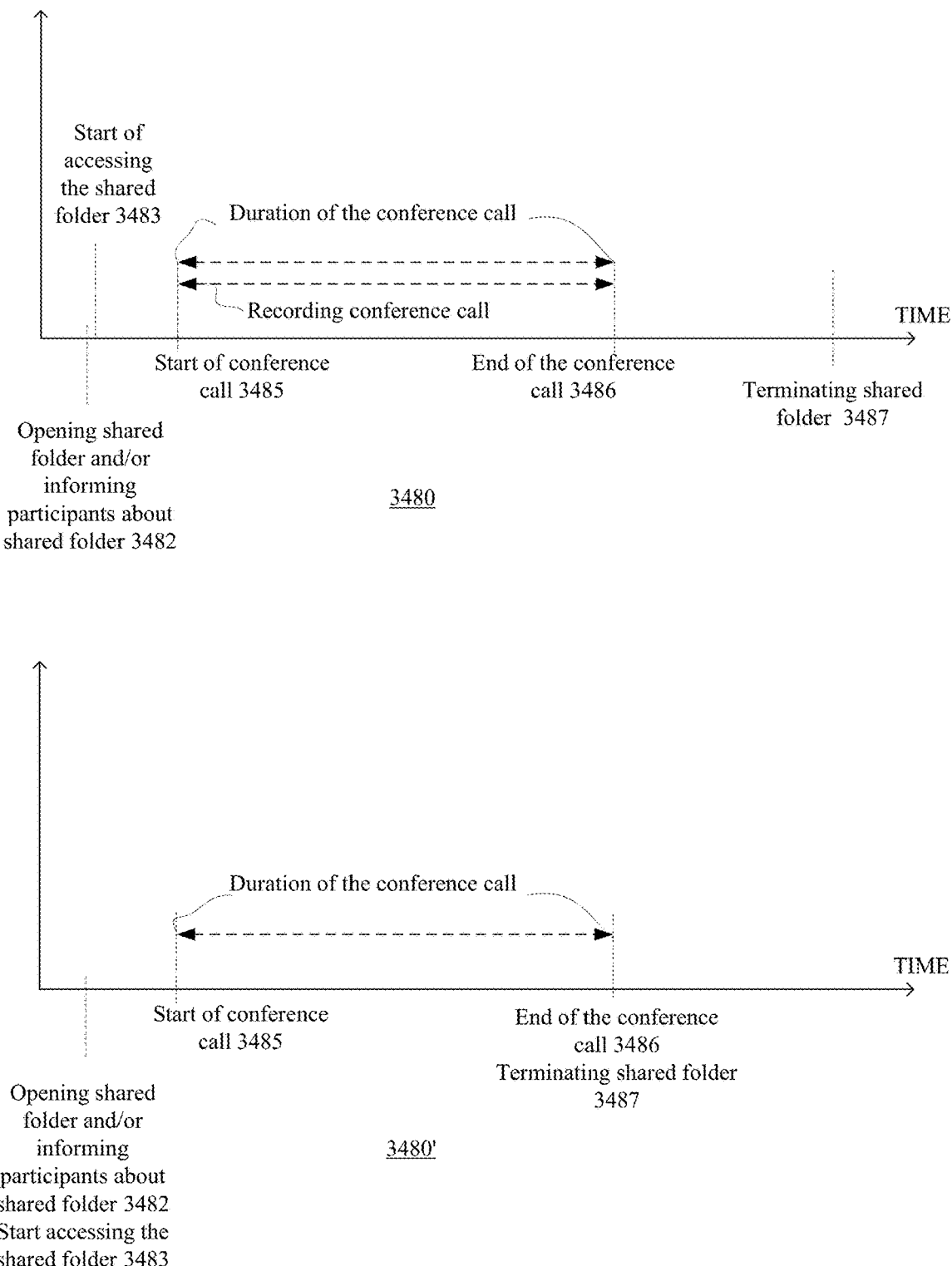
FIG. 26 illustrates examples of timing diagrams.

FIG. 26 illustrates two examples of a first timing diagram 3480 and a second timing diagram 3480'.

First timing diagram 3480 illustrates the following sequence of events: opening shared folder and/or informing participants about the shared folder 3482, starting access to the shared folder 3483, start of the conference call 3485, end of the conference call 3486, and termination of the shared folder 3487.

There may be multiple other timing relationships between these events.

The virtual 3D conference occurs between the start of the conference call 3485 and the end of the conference call 3486.

In first timing diagram, the conference call is recorded and may be available to participants till, for example, the termination of the shared folder 3487. The recording may be available in the shared folder—or may be provided in any other manner.

Second timing diagram 3480 illustrates the following sequence of events: (a) opening shared folder and/or informing participants about the shared folder 3482 that occurs concurrently to the starting access to the shared folder 3483, (a) start of the conference call 3485, and (b) end of the conference call 3486 that occurs concurrently with the termination of the shared folder 3487.

Foreground and Background

It is often important in VC systems to differentiate between the foreground and background. In this context, the background is the part of the scene captured by the participant's camera which has less importance than other parts of the scene. A part with less importance may be modified or removed altogether as its appearance does not have a role in the conference or meeting taking place. In fact, existing solutions often allow the modification of the background.

This is often done in order to replace the apparent background of a participant with a more appeasing background or one that is chosen for a multitude of reasons such as commercial reasons, in order to create a specific ambience or other reasons.

With the increase of importance of video conferencing systems, it is important that this differentiation between foreground and background be as accurate as possible. This task is particularly important in upcoming 3D VC environments where only an avatar of participants and possibly some accessories that they may be using are presented to the other participants.

Some solutions may differentiate between foreground background on a frame-to-frame basis. This method works well when a method known as "green screen" is used. When using the method, the background has a known color (usually green) and it is achieved by placing the screen behind the participant. Each pixel captured by the camera, is inspected. If its color matches that of the known screen color, the pixel is assumed to be a part of the background. This method may be augmented in several ways. Regardless, most environments which host the participant do not have such a screen handy and other methods are used.

Existing methods typically differentiate between foreground and background by first assuming that all humans are part of the foreground. In order to identify humans, they typically look for skin colors first. Then they attempt to find some reasonable surrounding shape or color around the skin color before they determine that they identify people in the captured picture. This often leads to body parts appearing and disappearing in a haphazard way from the presented picture as sometimes they are conceived as being part of the background and are replaced while at other times, they are considered part of the foreground and therefore are not replaced.

Another drawback of this system is that if a participant wants to add some accessories such as an easel or a white board, these would appear to be a part of the background and when it is replaced they would not be shown.

The current method, while directed at 3D video conferencing, can also be beneficial to other systems.

According to the current method, the background and foreground are differentiated based on temporal tracking and are not performed on a frame-by-frame basis.

According to this method, the captured picture is segmented first to identify so called blobs. In addition to identifying if these blobs are part of the foreground or background based on their static characteristics (such as color or surrounding colors) as in today's methods, blobs are also classified based on their temporal or dynamic characteristics. Blobs that move, change their appearance, color or other characteristic may be classified as belonging to the foreground or at least be classified as having a high probability as belonging to the foreground. In some cases, blobs with periodical movements (such as fans, flipping pieces of paper, etc.) can be categorized as belonging the background or as having a high probability of belonging to the background.

An option is to let the user decide at some time—preferably as the user joins the conference but this could be ongoing—to choose whether a blob belongs to the foreground or background. An alternative is to have a machine learning system in place to learn the temporal and spatial behavior of blobs that belong to the foreground and background. This system would learn from user choices as to whether include a blob in the foreground or background. One way of implementing this would be through a Neural Network.

Once the background is known, the participant can add accessories and they would appear to the other viewers in the conference. Additionally, if a whiteboard or similar device is used, the writing on it—and the board itself—would not be classified as part of the background and therefore the system would continuously show it to other participants.

Figure 27:
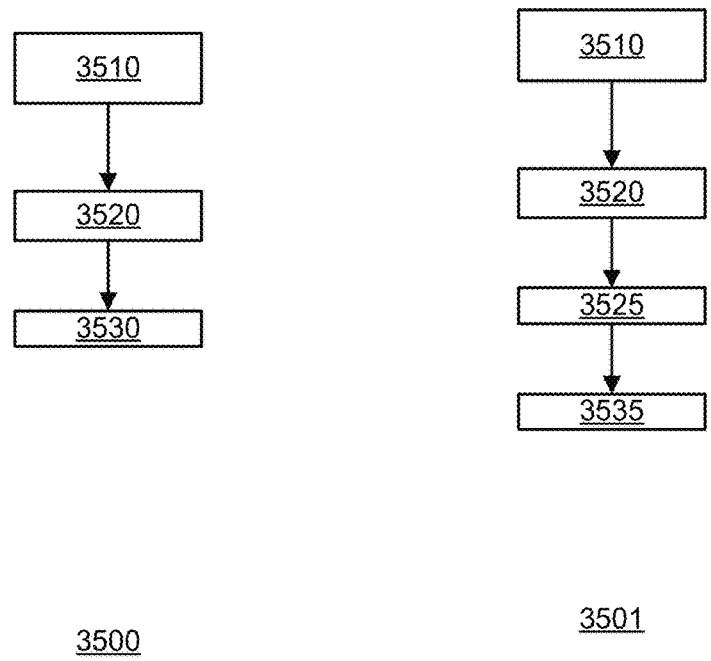
FIG. 27 illustrates examples of methods.

FIG. 27 illustrates method 3500 for foreground and background segmentation related to a virtual three-dimensional (3D) video conference.

Method 3500 may start by step 3510 of segmenting each image of multiple images of a video stream, to segments. Each segment may have one or more properties that are substantially constant.

The segmenting may include applying a blob analysis, wherein the segments are blobs. The segmenting may apply segmenting methods that differ from blob analysis.

Step 3510 may be followed by step 3520 of determining temporal properties of the segments.

Step 3520 may be followed by step 3530 of classifying each segment as a background segment or a foreground segment, based at least in part, on the temporal properties of the segments.

Step 3530 may include at least one out of:
a. Classifying a static segment as a background segment.
b. Classifying a segment that exhibits a periodical change as a background segment.
c. Searching for one or more face segments.
d. Classifying each face segment as a foreground segment.
e. Classifying a segment that is not a face segment and exhibits a periodical change as a background segment.
f. Using a machine learning process to classify each segment as a background segment or a foreground segment; wherein the machine learning process was trained to perform the classifying based on classification inputs received from users.
g. Classifying based, at least in part, on feedback from a user.
h. Displaying to a user segments of at least one of the images; receiving from the user classification inputs relating to at least some of the segments, wherein the classifying is also based on the classification inputs.
i. Classifying, as foreground segments, one or more items added to a virtual 3D video conference environment displayed to at least one participant of the virtual 3D conference.

FIG. 27 also illustrates method 3501 for foreground and background segmentation related to a virtual three-dimensional (3D) video conference.

Method 3501 may start by step 3510 of segmenting each image of multiple images of a video stream, to segments. Each segment may have one or more properties that are substantially constant.

The segmenting may include applying a blob analysis, wherein the segments are blobs. The segmenting may apply segmenting methods that differ from blob analysis.

Step 3510 may be followed by step 3520 of determining temporal properties of the segments.

Method 3520 may be followed by step 3525 of providing to a user information, and receiving feedback from the user.

Step 3525 may include at least one out of:
a. Providing to a user temporal information about temporal properties of the segments.
b. Receiving feedback from the user such as classification inputs relating to at least some of the segments.
c. Displaying to a user the segments and providing to the user temporal information about temporal properties of the segments.
d. Receiving from the user feedback such as classification inputs relating to at least some of the segment.

Step 3525 may be followed by step 3535 of classifying each segment as a background segment or a foreground segment, based at least in part, on the feedback. The feedback may include for example, the classification inputs.

Step 3535 may be responsive to the feedback and to the temporal properties of the segments. Step 3535 may include any sub-steps of step 3530—and each sub-step may be modified based on the feedback—or having its output and the feedback from the user taken into account.

Figure 28:
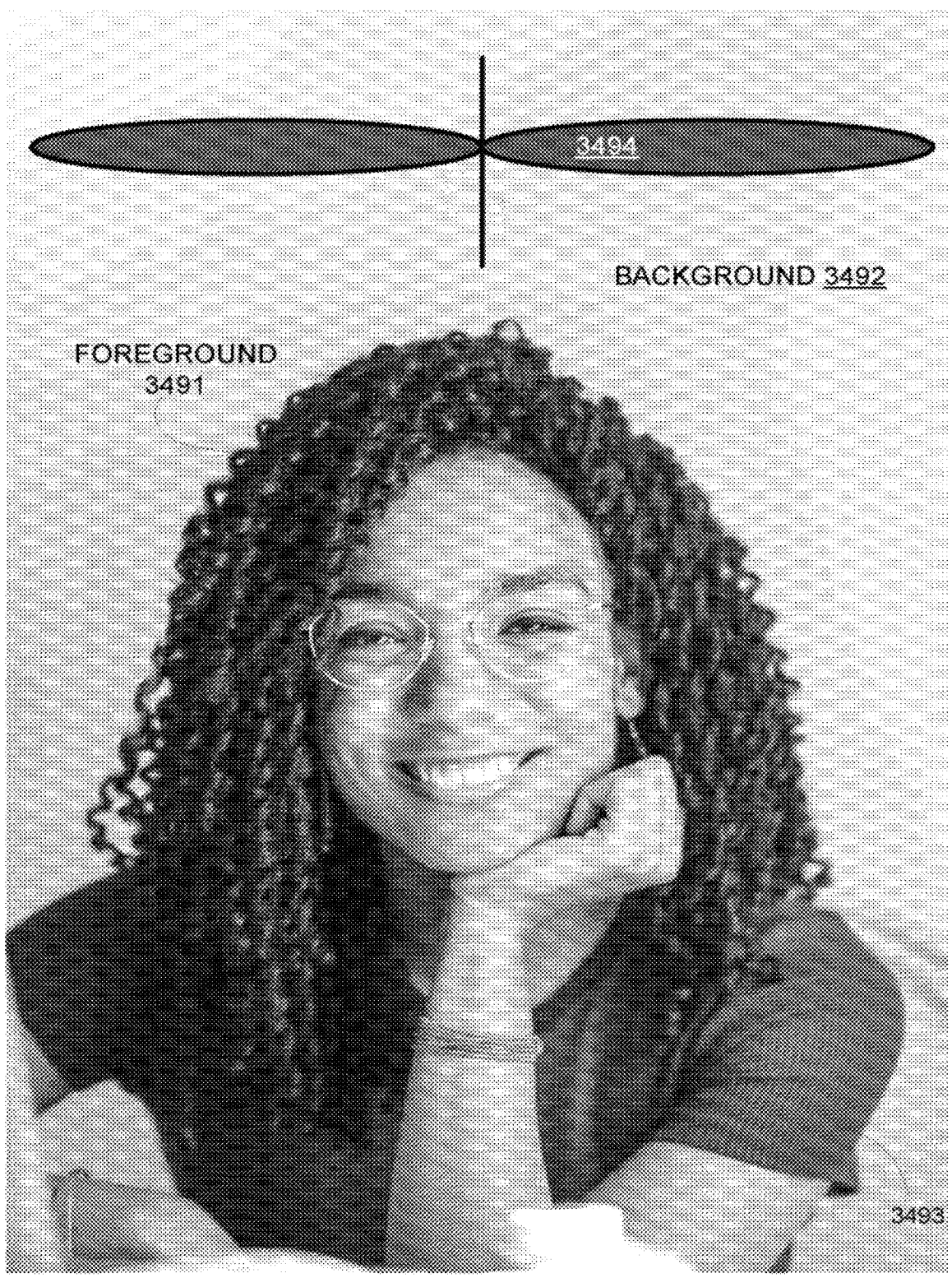
FIG. 28 illustrates an example of an image and foreground and background segmentation.

FIG. 28 illustrates an example of an image segmented to foreground and background.

Image 3490 captures a person 3493, a ventilator 3494, and a grey wall. When operated the ventilator may perform a periodically changing movement and can be regarded as belonging to the background 3492. The person itself forms the foreground 3491.

Touch-Ups—Denoising Makeup

Existing video conference systems, such as Zoom and Microsoft Teams allow participants to add "filters" that improve or otherwise modify their appearance. For example, it is possible to add makeup such as lipstick or blush. It is also possible to add gadgets such as eyeglasses, or appear to add moustaches and beards, modify the hair color and style and so on.

Such filters can be used not only to add makeup or gadgets. They can also be utilized to touch up (such functions known as photoshopping) and denoise the appearance of the participants (so as to reduce noise added by the camera, lighting conditions, etc.).

There is a need to provide an accurate, and efficient (in terms of memory resource usage and/or computational resource usage) method for determining an appearance of participants within a virtual 3D environment.

Performing segmentation on a frame-to-frame basis to identify facial parts in order to enhance them is highly ineffective and suffers from noises introduced to the images. For example, in each frame, the lips are identified and then the relevant color of lipstick is applied. Similarly, the chin is detected and possibly also the inclination of the face and a beard is placed on top of it in the correct angle. This is a costly operation. Specifically, if a person chooses to add lipstick, blush, eyeglasses, a beard and also modify the hair color, this requires that detecting all the relevant facial parts needs to occur tens of times each second (depending on the frame rate which would typically be not less than 30 per second). Once the parts are detected, the touch ups and make up are then added for each frame.

This costly action also limits the possibility of denoising the appearance of the participant. The main reason for this to be performed this way is that the systems do not maintain a model of the specific participant's face.

There is provided a method in which the participant appears in the meeting environment through avatars. Any of the mentioned above methods for generating such representations may be used.

A 3D model of the participant or at least of the participant's head and face and/or torso may be obtained. This model (and one or more texture maps) can be manipulated or used as a basis to create the avatar of the participant.

The different facial parts of the participant are an integral part of the 3D model.

Figure 34:
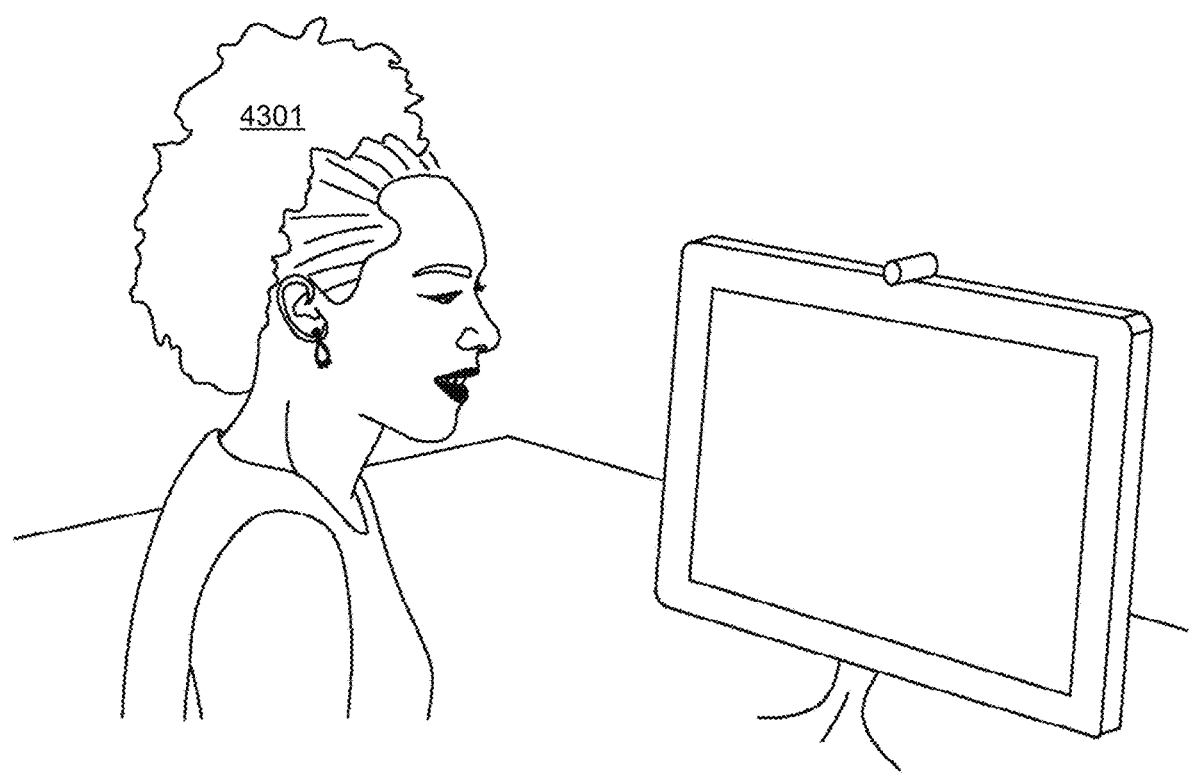
FIG. 34 illustrates an example of a participant having lipstick on its lips.
Figure 35:
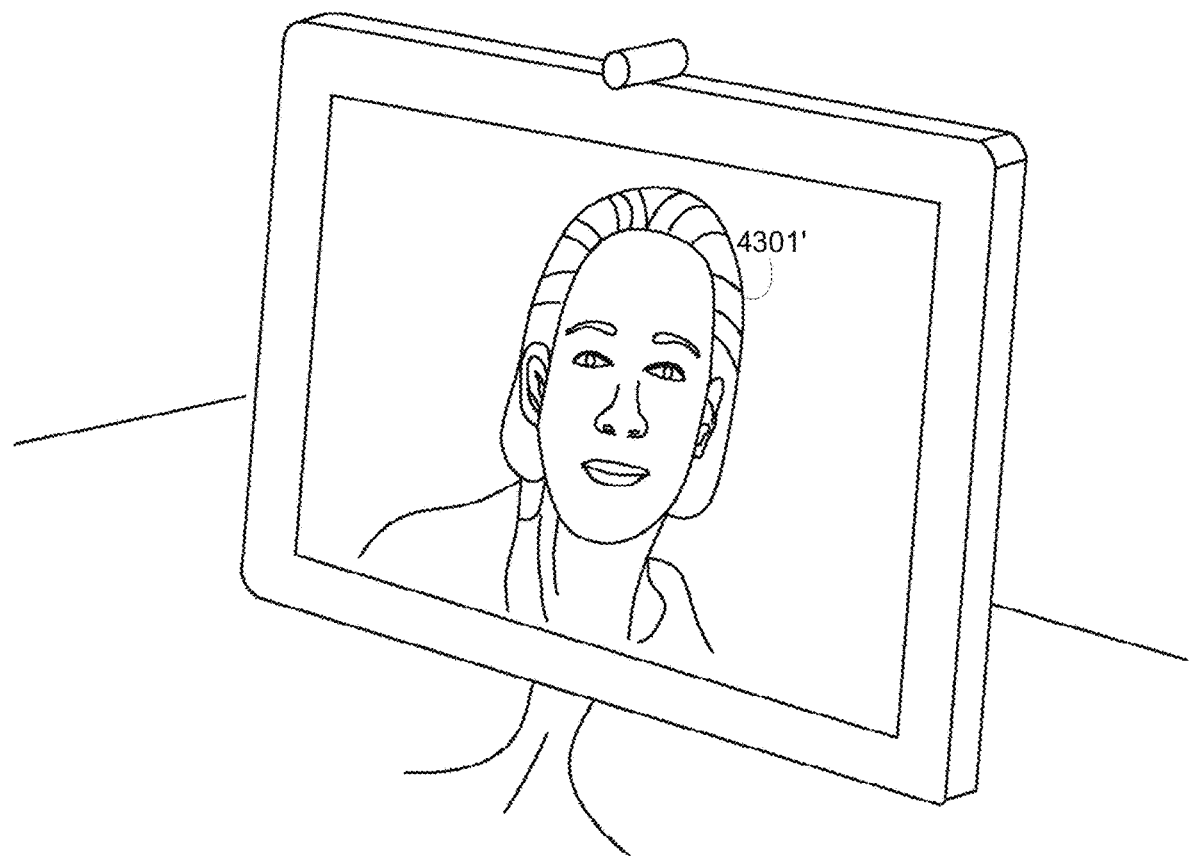
FIGS. 35, 36 and 37 illustrate an avatar of the participant of FIG. 34 without lipstick, the lips of the avatar without lipstick and the avatar with lipstick.
Figure 36:
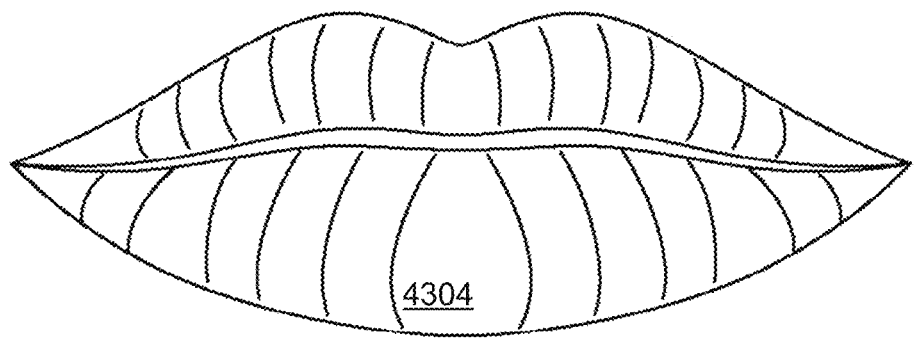
Figure 37:
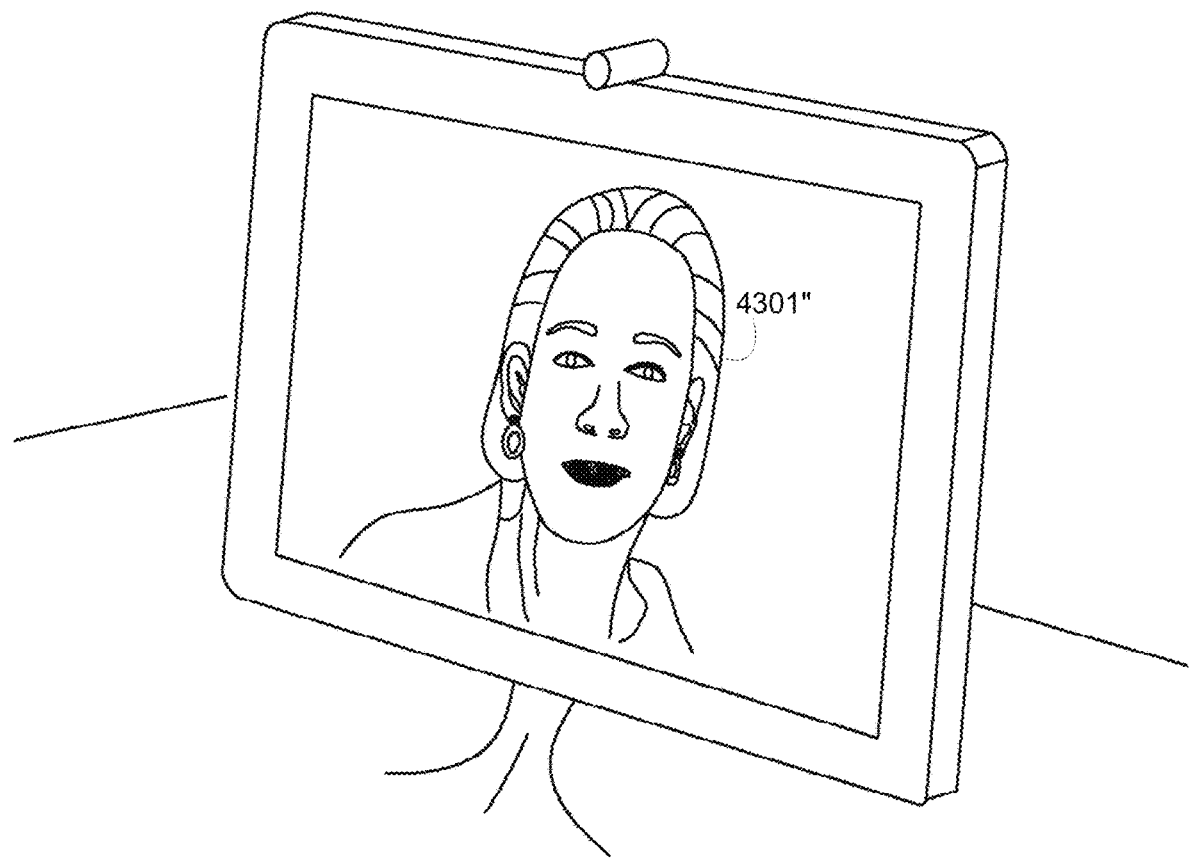

In order to add touch ups and makeup, the 3D model may be updated once. For example, a chosen color is added to the lips as lipstick. Like other parts of the 3D model, the voxels corresponding to the lips then have a reflectance associated with it and as an avatar is rendered, the reflectance allows a realistic appearance of the lips. Similarly, any chosen color is applied to the cheeks to appear as rouge. To make this appear more realistic, the chosen color can be combined with the original skin color in a linear or other way, in intensity or spatially, so that it appears as if the model actually has rouge on its cheeks. Then once the models are manipulated to create the avatar, all the additions are already in place. FIG. 34 illustrates an example of a participant 4301 having lipstick on its lips. FIGS. 35, 36 and 37 illustrate an avatar 4301' of the participant of without lipstick, the lips 4304 of the avatar without lipstick and the avatar 4301" with lipstick, respectively.

Moreover, this method allows easy denoising and "photoshopping". Denoising is possible since the model should not be susceptible to noise introduced by the camera, lighting or other source. Since the model's existence is ongoing, noise introduced during the capture of a single image by the camera, can easily by cleaned by averaging the reflectance value of each point in the model over time.

"Photoshopping" such modifying facial parts (modifying noses, lifting cheekbones, removing "double chins", etc.) is performed once on the 3D model instead of performing these actions again and again for each frame. So once the 3D model is created, all the effects are performed on the model. In other words, the model's cheekbones are lifted or its double chin is removed. These adjustments are then noted and whenever a new image is captured by the camera, all that is needed to create a new avatar is to understand the new position, orientation and gaze of the person. These are then applied to the adjusted 3D model.

Figure 29:
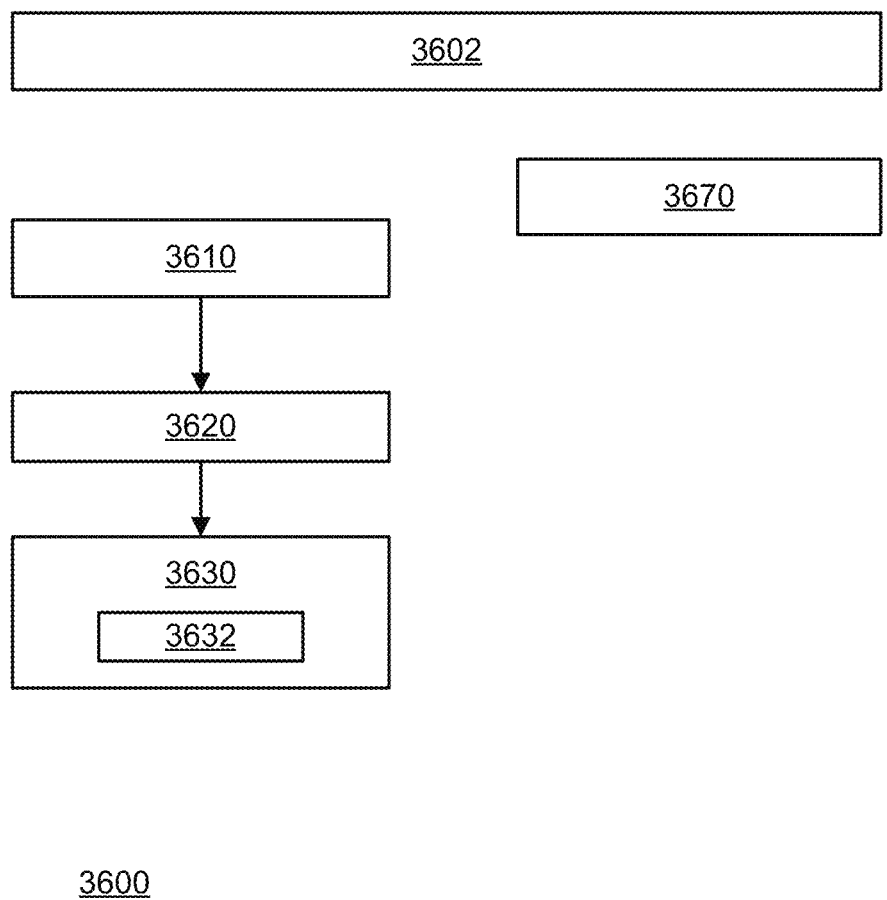
FIGS. 29, 31 and 32 illustrates examples of methods.

FIG. 29 illustrates method 3600.

Method 3600 refers to a first participant and to a second participant. This is for simplicity of explanation. The first and second participants mentioned above may be any pair of participants. Any step of method 3600 may be applied on any combination of participants.

Method 3600 may include an initialization step 3602.

The initialization step 3602 may include receiving, by a user device of a first participant of the virtual 3D video conference, reference second participant 3D representation information for generating a second participant 3D representation under different constraints. wherein the different constraints may include at least one out of (a) a touch up constraint, (b) a makeup constraint, and (c) one or more circumstances constraint.

The constraints—for example makeup and/or touch up may be provided by a participant even when the actual participant does not actually wear the makeup specified in the makeup constraint.

At least one other constraint may be determining by other means—for example image analysis, and the like.

Examples of circumstances constraints are illustrated in method 3200.

For example—the different constraints may include different directions of gaze of the second participant, different expressions of the second participant, different lighting conditions, different fields of view of the camera, and the like.

The initial 3D participant representation information may include an initial 3D model and one or more initial texture maps.

The 3D participant representation information may include a 3D model and one or more texture maps.

The initial second participant 3D representation information may represent a modified representation of the second participant. It is "modified" in the sense that the modified representation differs from an actual appearance of the second participant. The modified representation differs from the actual appearance of the second participant by at least one out of size, shape and location of a face element.

Method 3600 may include step 3610 of receiving, by the user device of the first participant and during the 3D video conference call, second participant constraints metadata indicative of one or more current constraints regarding a second participant. The second constraint metadata may refer to any aspect of the appearance of the avatar and its surroundings—for example makeup, hair appearance (facial hair, head hair, hair on any body part) and/or, inclusion or removal of accessories (for example glasses, sunglasses, earing, neckless, bracelets, piercing) and/or clothes (for example—the user may request that his avatar will include clothes that he does not currently wear, that his avatar will be without clothes that he actually wears, may introduce any other difference between the actual appearance of the user and his avatar's appearance) the shape and/or size and/or colors of the accessories, inclusion or removal of a virtual or actual tattoo and/or a scar, the shape and/or size and/or color of the virtual or actual tattoo, and the like. Any of the above may be implemented by defining the 3D model of the user to include any of the requested constrains metadata—and allowing to render any change with the rest of the 3D model of the user when rendering the avatar of the user. For example—the user may appear in front of a camera, without a shirt and have the system dress that user with a virtual shirt. This virtual shirt may be a part of the 3D model and then would require only rendering with the rest of the model when rendering an avatar of the user.

Step 3610 may be followed by step 3620 of updating, based on the second participant constraints metadata, and by the user device of the first participant, a 3D participant representation of the second participant, within a first representation of virtual 3D video conference environment.

Step 3620 may be followed by step 3630 of generating an avatar of the second participate based on 3D participant representation information of the second participant.

Step 3630 may include step 3632 of generating a makeup version of a face element based on a makeup free appearance of the face element and a selected makeup. Thus—the selected makeup can be virtually added to or placed over or otherwise merged with the makeup free face appearance of the face element. The makeup version of the face element may maintain the same during one or more 3D conference calls, from its definition by the participant until the participant decides to change the makeup version. According to one example the makeup does not change as other parameters such as the direction of gaze change.

Step 3632 may include generating a makeup version of a face element by applying a linear function on voxels of a makeup free appearance of the face element and a selected makeup.

The makeup free version may be replaced by any reference representation of the second participant—which can be modified according to one or more makeup constraints.

Method 3600 may include step 3670 of obtaining an updated reference second participant 3D representation information for generating an updated second participant 3D representation under different constraints. The updated reference second participant 3D representation information may replace the initial reference second participant 3D representation under different constraints.

The updated reference second participant representation information may be generated by performing denoising.

There are multiple representations of the virtual 3D video conference environment (for example one per participant)—and steps 3630 and/or 3670 may be done per each one of the representations. The update itself (the inclusion of the visual information—for example, the appearance of the person) may differ from one representation to the other.

Multiple participants of the virtual 3D conference are associated with multiple participant devices. There may also be a computerized system that differs from any of the multiple participant devices.

Various steps of method 3600 may be executed by at least one of the computerized systems, and one or more of the multiple participants' devices.

Figure 30:
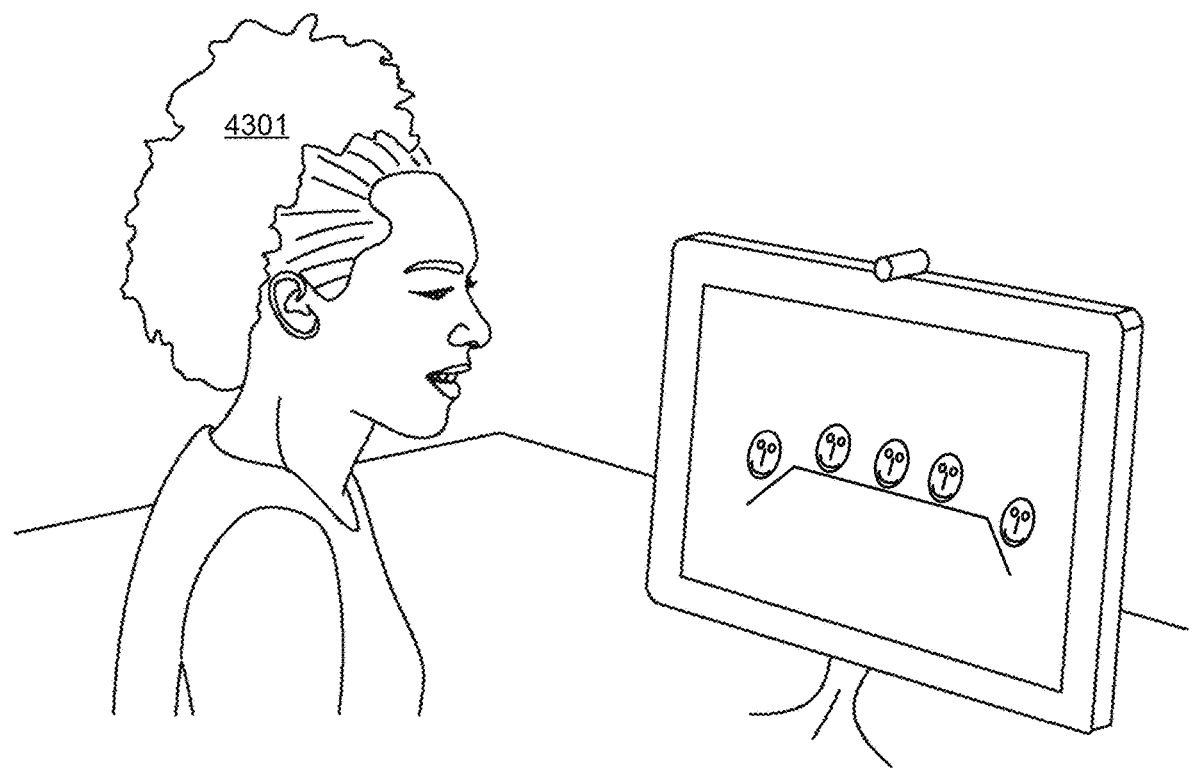
FIG. 30 illustrates an example of an avatar.

FIG. 30 illustrates a women 4301 that is a participant of a virtual 3D conference that views a representation of the virtual 3D conference environment.

Audio Quality Improvement in Video Conferencing

It is important that participants hear each other well and clear within video conferences as these settings are not natural and typically require more extensive attention on the part of participants than in face-to-face meetings. Nevertheless, background noises are often heard during online meetings. In other cases, problems with microphones or other system components reduce the quality and clarity of what is spoken, reducing the effectiveness of such meetings.

Methods of noise cleaning exist today. Some solutions, such as Krisp, clear voices which are not human. This specific application is installed in the client side of the video conference. In other words, participants that do not have it installed do not gain from its benefits. Meanwhile, the noisy or unclear soundtrack is transmitted to all the participants.

The suggested method utilizes image and video processing to enhance the audio in video conferences. This is generally possible because within Video Conferencing environments, participants typically have cameras viewing and capturing them.

In a nutshell, the enhancement is performed by visually analyzing the mouth, lips and tongue movements of the participants—or a subset of those that may appear to a camera viewing a speaker.

Using machine learning techniques, a system is trained to learn how these movements correspond to different sounds. This training can be performed with Neural Networks or other methods.

The training can be performed on whole words and sentences. Additionally, or alternatively, it can be performed only on a subset of "sounds". For example, in the English language, it is generally agreed that there are forty four phonemes or distinct sounds, with some variation based on accent and articulation.

Such a system, when viewing a video conferencing participant speaking, may make educated assumptions regarding the sounds that the speaker is making. These assumptions may then be used in two ways:

a. Clean background noises by removing sounds that do not appear to have come from the speaker.

b. Improve the quality of the audio transmitted from the system, for example, when the participant's microphone is malfunctioning or even if it is muted by mistake. ("Unmuting by force" may be an optional setting of the video conference, set separately by each participant and/or by the meeting's host).

These audio corrections may be performed at the speaker's system or at a central location, depending on available resources or based on other considerations.

It is also possible to have participants say some words or some sounds in order for the system to calibrate itself to the specific participant. This may be performed only one, at the beginning of meetings, when participants join them or once every number of meetings.

Figure 31:
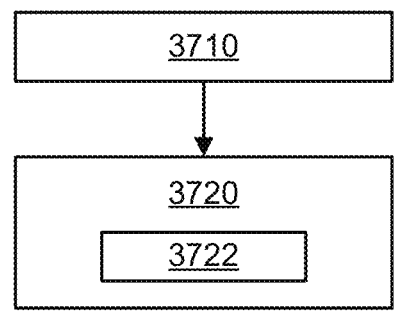

FIG. 31 illustrates method 3700 for audio quality improvement related to a participant of a virtual three dimensional (3D) video conference.

Method 3700 may start by step 3710 of determining participant generated audio, by a machine learning process and based on image analysis of a video of the participant obtained during the virtual 3D video conference.

The machine learning process may be trained to convert image analysis outputs to participant generated audio. The machine learning process may be trained to convert video to participant generated audio.

The method may include training the machine learning process or receiving a trained machine learning process.

Step 3710 may be followed by step 3720 of generating participant related audio information based at least on the participant generated audio. The participant related audio information, once provided to a computerized system of another participant, causes the computerized system of the other participant to generate participant related audio of higher quality (or at least not lower) than participant audio when the participant audio is included in sensed audio that is sensed by an audio sensor that is associated with the participant.

Step 3720 may include at least one out of a. Determining one or more audio processing features of an audio processing algorithm; and applying the audio processing algorithm on the sensed audio. The one or more audio processing features may include any time domain and/or spectral domain audio parameter such as a desired spectral range of the participant related audio.

b. Applying an audio processing algorithm that may include filtering process. The applying of the audio processing algorithm may include filtering the sensed audio.

c. Applying a noise reduction algorithm on the sensed audio.

d. Applying a speech synthesis algorithm.

Step 3710 of determining may be applied even when an audio sensor (such as a microphone) of the participant is mute.

Step 3710 may be preceded by or may include determining that the audio sensor is mute. The determination regarding the mute state of the audio sensor may be based on a comparison between the output of the audio sensor and the estimated audio that is outputted by the user—based on the image analysis of the video of the participant.

When determining that the audio sensor is muted—step 3720 may include applying a speech synthesis algorithm.

Step 3720 may include step 3722 of determining, based on at least one of a presence and a quality of the sensed audio, how to generate the participant related audio information.

Step 3722 may include selecting between (i) applying an audio processing algorithm on the sensed audio, and (ii) applying a speech synthesis algorithm.

Prediction

In a virtual 3D video conference participants may appear as avatars—or have any other 3D representation.

This may involve creating 3D models of the participants. During the meeting, the participants sit in front of cameras. These capture their movement and some analysis is performed to find the participants' pose, orientation and expression. Then for each viewer of the meeting, an avatar of the participant is created so that the pose, orientation and expression of the avatar appears in the viewer's field of view as it would if the participant would physically be located in the meeting's environment.

This real-time process can be viewed as having two components: one does the analysis of the participant, and the other performs the rendering.

These two components may be co-located or not. For example, the analysis needs to be performed only once for each participant but rendering may need to be performed multiple times—once for each viewer. Therefore, one option is to have the analysis performed at the participant's location or at a central location while rendering, or parts of it, may be performed at the location of each viewer. The analyzing component would need to inform the rendering component of the changes in pose, orientation and expression so that the rendering component would render the avatar correctly.

In order to increase efficiency, reduce the possibility of errors and save resources, it is important to reduce the amount of communications between these two components while maintaining a high degree of reliability.

Some changes in movements or other characteristics may be predicted even if for only short periods of time.

Consider the following over-simplified example. Suppose that a participant of a video conference nods and suppose also that images are captured every 33 milliseconds and that is also the interval between renderings of the participant's avatar in the system of a viewer of the meeting. If the participant's head is moving upwards, it may be assumed that this movement would continue for at least a few hundreds of milliseconds—say 200 milliseconds.

Under these assumptions, if the rendering component is able to predict that this movement is occurring, it may be able to continuously render this movement without receiving any additional information from the analyzing component, as long as the prediction is accurate—for example at least for a short period. If the actual movement is different than the predicted one, then the analyzing component may need to update the rendering unit only with corrections to the predicted movement. These corrections would include much less information than actual movement information. Therefore, this would allow much savings in communications.

For example—assuming that there is no prediction in the client. The server would need to send the full values. For example, every frame, the orientation should change upwards by 1 degree. If the client does have prediction capabilities, then the server only needs to send corrections. For example, the client predicted upwards by 1 degree but in reality, the change was 1.0001 degrees, so the client only needs to send the value 0.0001.

If a prediction is good "in general" then if there is a correction to be made, it would be of a lower order of magnitude than the full prediction.

For example, if we predict a value of 100 but it turns out that the real value was 101, then the correction is only 1. Since the corrections typically have much smaller values than the predictions, they can be coded with less bits. Using Huffman or Arithmetic coding would allow to allocate more communication bits if the correction is large, but these would then happen rarely.

If this is not the case, in other words, if the corrections are in the same order of magnitude of the prediction, this practically means that there is no prediction.

A machine learning system may be trained to learn how to predict future pose, orientation and expression based on their recent history. Predicting their near future may be performed for each one separately or based on any combination of their history. A predictive model may be learned for each participant separately or for a "general" participant.

For example—an RNN may receive values of pose, orientation and expression at any given time and learn to predict the next value.

This is much like NN are taught how to create texts by learning existing texts or creating music by learning musical sequences.

Once a model is learned—it is shared with the analyzing and rendering component.

A third component—a decider—may make a decision among three options:
a. Have the analyzing component transmit all the data to the rendering component.
b. Have the rendering component render based only on the predictive model.
c. Have the rendering component render based on the predictive model with corrections sent by the analyzing model It is assumed, for simplicity of explanation that the analyzing component and the decision maker are within a first computerized unit and that the rendering component is within a second computerized unit.

The decision can be made by setting a threshold for the amount of data that needs to be sent, or by setting a threshold on the consecutive number of times that corrections needed to be sent, or a combination thereof.

The analyzing component aware of the predictive model used by the rendering component. Therefore, it can evaluate what the rendering component is doing if it is rendering based on the predictive model.

Figure 32:
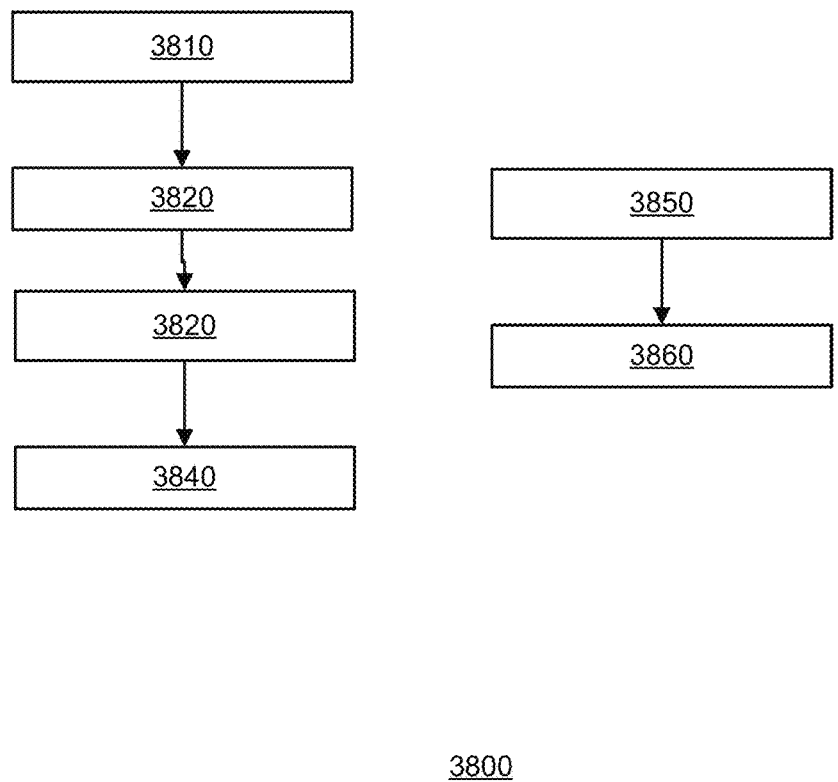

FIG. 32 illustrates method 3800 for predicting behavior changes of a participant of a virtual three dimensional (3D) video conference.

The prediction may reduce the volume of traffic between computerized unit.

Method 3800 may be an iterative method. Each iteration may use a certain behavioral predictor and once there is a need to use another behavior predictor—the next iteration begins. Each iteration is applied on a part of a virtual 3D video conference.

It is assumed that a first computerized unit performs various steps of method 3800 and can be regarded as an analyzer and/or a transmitter.

A second computerized unit may receive information generated by a first computerized unit and may display (or cause a display to show) a representation of the participant within a virtual 3D video conference environment.

The second computerized unit may be regarded as a receiver.

The first computerized entity may have access to a video of the participant, the video is acquired during the virtual 3D video conference. The second computerized entity may not have no access to the video.

The first computerized entity may be an image analyzer. The second computerized unit may be a rendering unit.

Each one of the first and second computerized units may be a participant device, a computerized system other that any participant device, and the like.

Method 3800 may start performing, for each part of multiple parts of the virtual 3D video conference the following steps:
  a. Step 3810 of determining, by a first computerized unit, a participant behavioral predictor to be applied by a second computerized unit during the part of the virtual 3D video conference. Any determination or selection method may be applied—including any method for finding the best estimator, a good enough estimator, and the like may be used.
  b. Step 3820 of determining one or more prediction inaccuracies related to the applying of the participant behavioral predictor during the part of the virtual 3D video conference.
  c. Step 3830 of determining whether to generate and transmit to the second computerized unit prediction inaccuracy metadata that is indicative of at least one prediction inaccuracy that affects a representation of the participant within a virtual 3D video conference environment presented to another participant of the virtual 3D video conference during the part of the virtual 3D video conference.

Step 3830 may be followed by step 3840 of generating and transmitting to the second computerized unit the prediction inaccuracy metadata, when determining to generate and transmit to the second computerized unit prediction inaccuracy metadata.

The participant behavioral predictor may be determined and transmitted at the start of the part or before the part starts.

The one or more prediction inaccuracies may be generated and transmitted (if determined to do so) in real time to second computerized unit—to allow real time amendments to the representation of the participant.

Step 3840 may include transmitting an end of part indicator and/or a next behavioral predictor identifier, and the like.

Step 3480 may include sending to the second computerized entity, information about the participant behavioral predictor to be applied by the second computerized unit.

Step 3810 may be based on a behavior of the participant during a previous part of the virtual 3D video conference.

Step 3810 may include determining when the part ends and a new part starts based on the one or more prediction inaccuracies related to the applying of the participant behavioral predictor during the part.

Step 3810 may include determining when the part ends and a new part starts based on the one or more prediction inaccuracies related to the applying of the participant behavioral predictor during the part.

For example—the determination may be made when a size (Spi) of transmitted information related to the prediction inaccuracies exceeds a threshold, when the Spi exceeds a size (Sdbi) of "direct" behavioral information that directly (without prediction) illustrates the behavior of the participant, when the accuracy of the currently used participant behavioral predictor is below a threshold, and the like.

Step 3830 may be based on the effect of the at least one prediction inaccuracy on the representation of the participant.

At least one of steps 3810, 3820, 3830 and 3840 may be executed by a machine learning process.

Steps 3810, 3820, 3830 and 3840 may be executed by the first computerized unit.

Method 3800 may include step 3850 of determining, by the second computerized unit, at each part, the participant behavioral predictor to be applied by the second computerized unit.

Step 3850 may be followed by step 3860 of applying, by the second computerized unit, at each part, the participant behavioral predictor, wherein the applying is affected by prediction inaccuracies information received in real time from a first computerized unit.

Figure 33:
FIG. 33 illustrates different parts of a virtual 3D video conference.

FIG. 33 illustrates three periods of time within a virtual 3D video conference 4201, 4202 and 4203. During the first period of time 4201, two participants 4211 and 4212 are at a certain position (as illustrated in image 4215)—both are looking at a display of a computer. The participants move and change their direction of gaze (during a second period of time 4202) so that they look at each other as illustrated by image 4216—they may stay at the latter position during the third period of time 4203.

A first behavioral predictor 4241 that was accurate during the first period of time 4201 will not be accurate when the participants start moving—and thus the first part 4231 of the virtual 3D video conference may end (and the second part 4232 may start) at the end of the first period of time—or slightly afterwards (as shown in FIG. 33)—and a second behavioral predictor 4242 may be used.

The second behavioral predictor 4242 that was accurate during the second period of time 4202 will not be accurate when the participants stop moving—and thus the second part 4232 may end (and the third part 4233 may start) at the end of the second period of time—or slightly afterwards (as shown in FIG. 33)—and a third behavioral predictor 4243 may be used.

At least some of the mentioned above methods may be applicable mutatis mutandis to 2D video conferences.

In the foregoing specification, the embodiments of the disclosure have been described with reference to specific examples of embodiments of the disclosure. It will, however, be evident that various modifications and changes may be made therein without departing from the broader spirit and scope of the embodiments of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units, or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

We claim:

1. A method for sharing content during a virtual 3D video conference, the method comprises:
    inviting multiple participants to join a virtual 3D video conference;
    creating a shared folder dedicated for storing shared content items, wherein the shared content is accessible during at least during the virtual 3D video conference;
    enabling access, to the multiple participants, to the shared folder; wherein the access is governed by access control rules that comprise:
        a first access control rule that is responsive to a bandwidth availability of at least one of (a) a communication link to the shared folder, or (b) a communication link from the shared folder; and
        a second access control rule for preventing an upload of content of a size that exceeds a first size threshold, wherein the size threshold depends on whether a participant that request to upload the content is an organizer of the virtual 3D video conference or a participant that is not the organizer of the virtual 3D video conference; and
    conducting the virtual 3D video conference; wherein the conducting comprises sharing at least one of the content items.

2. The method according to claim 1 wherein the sharing is executed based, at least in part, on one or more sharing rules.

3. The method according to claim 1 wherein the one or more sharing rules are included in the access control rules.

4. The method according to claim 1 wherein the one or more sharing rules are not included in the access control rules.

5. The method according to claim 1 wherein the enabling access comprises enabling access to the shared folder even before a start of the virtual 3D video conference.

6. The method according to claim 5 wherein the inviting, creating, enabling and conducting are managed by a virtual 3D video conference application.

7. The method according to claim 1 comprising deleting the shared folder dedicated after the completion of the virtual 3D video conference.

8. The method according to claim 1 comprising maintaining the shared folder dedicated after a completion of the virtual 3D video conference and enabling access to the shared folder after the completion of the virtual 3D video conference.

9. The method according to claim 1 comprising maintaining the shared folder dedicated until a predefined time period after a completion of the virtual 3D video conference and enabling access to the shared folder until a predefined time period after the completion of the virtual 3D video conference.

10. The method according to claim 1 comprising maintaining the shared folder dedicated after a completion of the virtual 3D video conference and applying after completion access control rules for accessing the shared folder.

11. The method according to claim 1 comprising maintaining the shared folder dedicated after a completion of the virtual 3D video conference and adding a recording of the virtual 3D video conference to the shared folder.

12. The method according to claim 1 wherein the second access control rule is for the preventing the upload of the content of the size that exceeds the size threshold, when the participant has reached a second aggregate size of uploaded content.

13. A non-transitory computer readable medium for sharing content during a virtual 3D video conference, the non-transitory computer readable medium stores instructions for:
- inviting multiple participants to join a virtual 3D video conference;
- creating a shared folder dedicated for storing shared content items, wherein the shared content is accessible during at least during the virtual 3D video conference;
- enabling access, to the multiple participants, to the shared folder; wherein the access is governed by access control rules that comprise:
  - a first access control rule that is responsive to a bandwidth availability of at least one of (a) a communication link to the shared folder, or (b) a communication link from the shared folder; and
  - a second access control rule for preventing an upload of content of a size that exceeds a first size threshold, wherein the size threshold depends on whether a participant that request to upload the content is an organizer of the virtual 3D video conference or a participant that is not the organizer of the virtual 3D video conference; and
- conducting the virtual 3D video conference; wherein the conducting comprises sharing at least one of the content items.

14. The non-transitory computer readable medium according to claim 13 wherein the sharing is executed based, at least in part, on one or more sharing rules.

15. The non-transitory computer readable medium according to claim 13 wherein the one or more sharing rules are included in the access control rules.

16. The non-transitory computer readable medium according to claim 13 wherein the one or more sharing rules are not included in the access control rules.

17. The non-transitory computer readable medium according to claim 13 wherein the enabling access comprises enabling access to the shared folder even before a start of the virtual 3D video conference.

18. The non-transitory computer readable medium according to claim 17 wherein the inviting, creating, enabling and conducting are managed by a virtual 3D video conference application.

19. The non-transitory computer readable medium according to claim 13 that stores instructions for deleting the shared folder dedicated after the completion of the virtual 3D video conference.

20. The non-transitory computer readable medium according to claim 13 that stores instructions for maintaining the shared folder dedicated after a completion of the virtual 3D video conference and enabling access to the shared folder after the completion of the virtual 3D video conference.

21. The non-transitory computer readable medium according to claim 13 that stores instructions for maintaining the shared folder dedicated until a predefined time period after a completion of the virtual 3D video conference and enabling access to the shared folder until a predefined time period after the completion of the virtual 3D video conference.

22. The non-transitory computer readable medium according to claim 13 that stores instructions for maintaining the shared folder dedicated after a completion of the virtual 3D video conference and applying after completion access control rules for accessing the shared folder.

23. The non-transitory computer readable medium according to claim 13 that stores instructions for maintaining the shared folder dedicated after a completion of the virtual 3D video conference and adding a recording of the virtual 3D video conference to the shared folder.

24. The non-transitory computer readable medium according to claim 13 wherein the second access control rule is for the preventing the upload of the content of the size that exceeds the size threshold, when the participant has reached a second aggregate size of uploaded content.

* * * * *